US012611871B2

(12) United States Patent
Kitase et al.

(10) Patent No.: US 12,611,871 B2
(45) Date of Patent: Apr. 28, 2026

(54) CIRCULATION UNIT, LIQUID DISCHARGE HEAD, AND LIQUID DISCHARGE APPARATUS

(71) Applicant: CANON KABUSHIKI KAISHA, Tokyo (JP)

(72) Inventors: Yushi Kitase, Tokyo (JP); Kazuya Yoshii, Kanagawa (JP); Naozumi Nabeshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 18/647,685

(22) Filed: Apr. 26, 2024

(65) Prior Publication Data

US 2024/0383259 A1 Nov. 21, 2024

(30) Foreign Application Priority Data

May 16, 2023 (JP) ................................ 2023-080723

(51) Int. Cl.
*B41J 2/175* (2006.01)

(52) U.S. Cl.
CPC ........ *B41J 2/17596* (2013.01); *B41J 2202/05* (2013.01); *B41J 2202/07* (2013.01); *B41J 2202/12* (2013.01)

(58) Field of Classification Search
CPC ...... B41J 2/175; B41J 2/17509; B41J 2/1752; B41J 2/17523; B41J 2/17556; B41J 2/17596; B41J 2205/05; B41J 2205/07; B41J 2205/012
See application file for complete search history.

(56) References Cited

U.S. PATENT DOCUMENTS

| | | | | |
|---|---|---|---|---|
| 11,148,433 | B2 * | 10/2021 | Otsuka | B41J 2/14201 |
| 11,597,212 | B2 | 3/2023 | Yamada | |
| 2015/0224786 | A1 * | 8/2015 | Otsuka | B41J 2/175 347/92 |
| 2015/0352851 | A1 | 12/2015 | Shiba et al. | B65B 3/12 |
| 2015/0375512 | A1 | 12/2015 | Kondo et al. | B41J 2/175 |

(Continued)

FOREIGN PATENT DOCUMENTS

JP 2022-334 A 1/2022

OTHER PUBLICATIONS

U.S. Appl. No. 18/679,179, filed May 30, 2024.

*Primary Examiner* — Anh T Vo
(74) *Attorney, Agent, or Firm* — Venable LLP

(57) ABSTRACT

A circulation unit includes first and second pressure adjusters, each including a valve chamber, a pressure control chamber, a communication port providing communication therebetween, a valve configured to open and to close the communication port, a flexible member, and a pressure plate. The valve is opened when in its pressure control chamber is lower than PX, or closed otherwise. The pressure plate and the valve of the second pressure adjuster are in a contact state when pressure in its pressure control chamber is lower than PY, or in a non-contact state otherwise. Here, PX and PY satisfy $PX-PY<|\Delta P|$ (upper limit value≥zero, with which the pressure plate and the valve of the second pressure adjuster switch to a contact state before a differential pressure between the pressure control chambers reaches that necessary for starting printing after operation of a circulation pump being stopped is resumed).

20 Claims, 44 Drawing Sheets

(56) References Cited

U.S. PATENT DOCUMENTS

| | | | | |
|---|---|---|---|---|
| 2015/0375514 | A1 | 12/2015 | Koshikawa et al. | B41J 2/175 |
| 2015/0375515 | A1 | 12/2015 | Seki et al. | B41J 2/175 |
| 2016/0052290 | A1 | 2/2016 | Takahashi et al. | B41J 2/175 |
| 2016/0200113 | A1 | 7/2016 | Nanjo et al. | B41J 2/175 |
| 2016/0200114 | A1 | 7/2016 | Nanjo et al. | B41J 2/175 |
| 2017/0120606 | A1 | 5/2017 | Koshikawa et al. | B41J 2/175 |
| 2017/0136776 | A1 | 5/2017 | Shiba et al. | B41J 2/175 |
| 2017/0151797 | A1 | 6/2017 | Hayashi et al. | B41J 2/175 |
| 2017/0151803 | A1 | 6/2017 | Yoshii et al. | B41J 2/175 |
| 2017/0305164 | A1 | 10/2017 | Orihara et al. | B41J 2/175 |
| 2017/0305165 | A1 | 10/2017 | Ikebe et al. | B41J 2/175 |
| 2017/0305166 | A1 | 10/2017 | Shimamura et al. | B41J 2/175 |
| 2017/0361619 | A1 | 12/2017 | Arai et al. | B41J 2/175 |
| 2018/0001650 | A1 | 1/2018 | Miyashita et al. | B41J 2/175 |
| 2019/0092036 | A1 | 3/2019 | Yamada et al. | B41J 2/175 |
| 2019/0100024 | A1 | 4/2019 | Yamada et al. | B41J 2/14 |
| 2021/0001631 | A1* | 1/2021 | Shinoda | B41J 2/16532 |
| 2021/0316554 | A1 | 10/2021 | Fukushima et al. | B41J 2/175 |
| 2021/0370680 | A1 | 12/2021 | Miyashita et al. | B41J 2/175 |
| 2024/0198684 | A1 | 6/2024 | Nagai et al. | B41J 2/175 |

* cited by examiner

CIRCULATION UNIT, LIQUID DISCHARGE HEAD, AND LIQUID DISCHARGE APPARATUS

CROSS-REFERENCE TO RELATED APPLICATIONS

This application claims the benefit of Japaneses Patent Application No. 2023-080723,filed on May 16, 2023, which is hereby incorporated by referene herein in its entirety.

BACKGROUND OF THE DISCLOSURE

Field of the Disclosure

The present disclosure relates to a circulation unit, a liquid discharge head, and a liquid discharge apparatus.

Description of the Related Art

A circulation-type liquid discharge apparatus that circulates liquid between a liquid discharge head and a liquid housing unit to discharge air bubbles in a flow path and to prevent ink thickening in the vicinity of discharge ports is known. In some circulation-type liquid discharge apparatuses, liquid is circulated between the liquid discharge head and a body by using a body side pump outside the liquid discharge head, or liquid is circulated in the liquid discharge head by using a pump in the liquid discharge head.

Japanese Patent Laid-Open No. 2022-334 (hereafter referred to as the '334 document) discloses a liquid discharge apparatus in which a circulation pump of a piezoelectric scheme is mounted in a liquid discharge head to circulate ink in the liquid discharge head. In the configuration of the '334 document, ink supplied from the circulation pump to a pressure control mechanism is supplied to a pressure chamber through an ink supply flow path, and ink not discharged is collected to the circulation pump through an ink collection flow path.

In the configuration of the '334 document, the volume of a negative pressure chamber increases after circulation or printing is ended, which leads to a standby state in which a pressure receiving plate and a shaft are separated in some cases. In such a case, a time until the pressure in the negative pressure chamber reaches a desired value when circulation or printing is to be started potentially increases. In a case when the pressure in the negative pressure chamber has not reached the desired value, desired circulation is potentially not performed, and a discharge defect potentially occurs if printing operation is started in such a state. Thus, in such a case, a wait time is sometimes needed until the pressure in the negative pressure chamber reaches the desired value, and, as a result, a first print out time (FPOT) potentially becomes long.

SUMMARY OF THE DISCLOSURE

A circulation unit of the present disclosure includes a first pressure adjuster for adjusting pressure of liquid, the first pressure adjuster including a first valve chamber, a first pressure control chamber, a first communication port, a first valve, a first flexible member, and a first pressure plate, the first communication port providing communication between the first valve chamber and the first pressure control chamber, the first valve being configured to open and to close the first communication port, the first flexible member serving as a surface of the first pressure control chamber and being displaceable, the first pressure plate serving as another surface of the first pressure control chamber and being displaceable in coordination with the first flexible member; a second pressure adjuster for adjusting pressure of liquid, the second pressure adjuster including a second valve chamber, a second pressure control chamber, a second communication port, a second valve, a second flexible member, and a second pressure plate, the second communication port providing communication between the second valve chamber and the second pressure control chamber, the second valve being configured to open and to close the second communication port, the second flexible member serving as a surface of the second pressure control chamber and being displaceable, the second pressure plate serving as another surface of the second pressure control chamber and being displaceable in coordination with the second flexible member; an inflow flow path providing communication between an entrance and the first valve chamber, a first flow path providing communication between a pressure chamber and the first pressure control chamber, a second flow path providing communication between the pressure chamber and the second pressure control chamber, a third flow path providing communication between the second pressure control chamber and a circulation pump for circulating liquid, a fourth flow path providing communication between the circulation pump and the first pressure control chamber, and a bypass flow path providing communication between the first pressure control chamber and the second valve chamber. The first valve is in an opened state in a case when pressure in the first pressure control chamber is lower than PX, the first valve is in a closed state in a case when pressure in the first pressure control chamber is equal to or higher than PX, the second pressure plate and the second valve are in a contact state in a case when pressure in the second pressure control chamber is lower than PY, the second pressure plate and the second valve are in a non-contact state in a case when pressure in the second pressure control chamber is equal to or higher than PY, and PX and PY satisfy a relation $PX-PY<|\Delta P|$. Here, $|\Delta P|$ is an upper limit value of PX−PY, which is equal to or greater than zero and with which the second pressure plate and the second valve switch from a non-contact state to a contact state before differential pressure between the first pressure control chamber and the second pressure control chamber reaches differential pressure necessary for starting printing after operation of the circulation pump being stopped is resumed.

Further features of the present disclosure will become apparent from the following description of embodiments with reference to the attached drawings.

DESCRIPTION OF THE EMBODIMENTS

A preferable embodiment of the present disclosure will be described below in detail with reference to the accompanying drawings. The embodiment below does not limit features of the present disclosure, and not all combinations of characteristics described in the present embodiment necessarily need to be essential for solution of the present disclosure. Identical constituent components are denoted by the same reference number. The present embodiment will be described with reference to an example in which a thermal scheme by which air bubbles are generated by using an electrothermal transducing element and liquid is discharged is employed for a discharge element configured to discharge liquid, but is not limited thereto. The present embodiment is also applicable to a liquid discharge head for which a discharge scheme of discharging liquid by using a piezoelectric element (piezo) or another discharge scheme is employed. Furthermore, pumps, pressure adjusters, and the like described below are not limited to those in the embodiment and configurations illustrated in drawings. The following first describes a basic configuration of the present disclosure and thereafter describes characteristic parts of the present disclosure.

<Liquid Discharge Apparatus>

Figure 1A:
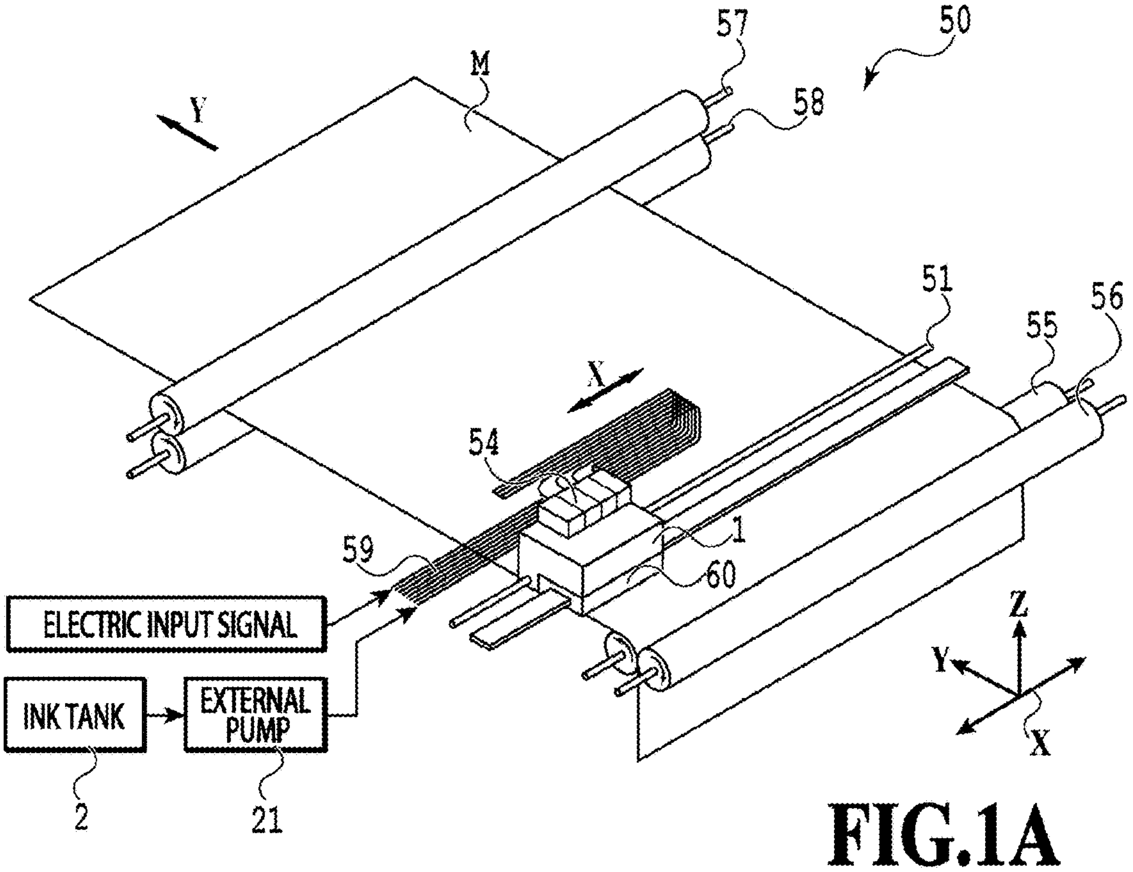
FIGS. 1A and 1B are diagrams for description of a liquid discharge apparatus.
Figure 1B:
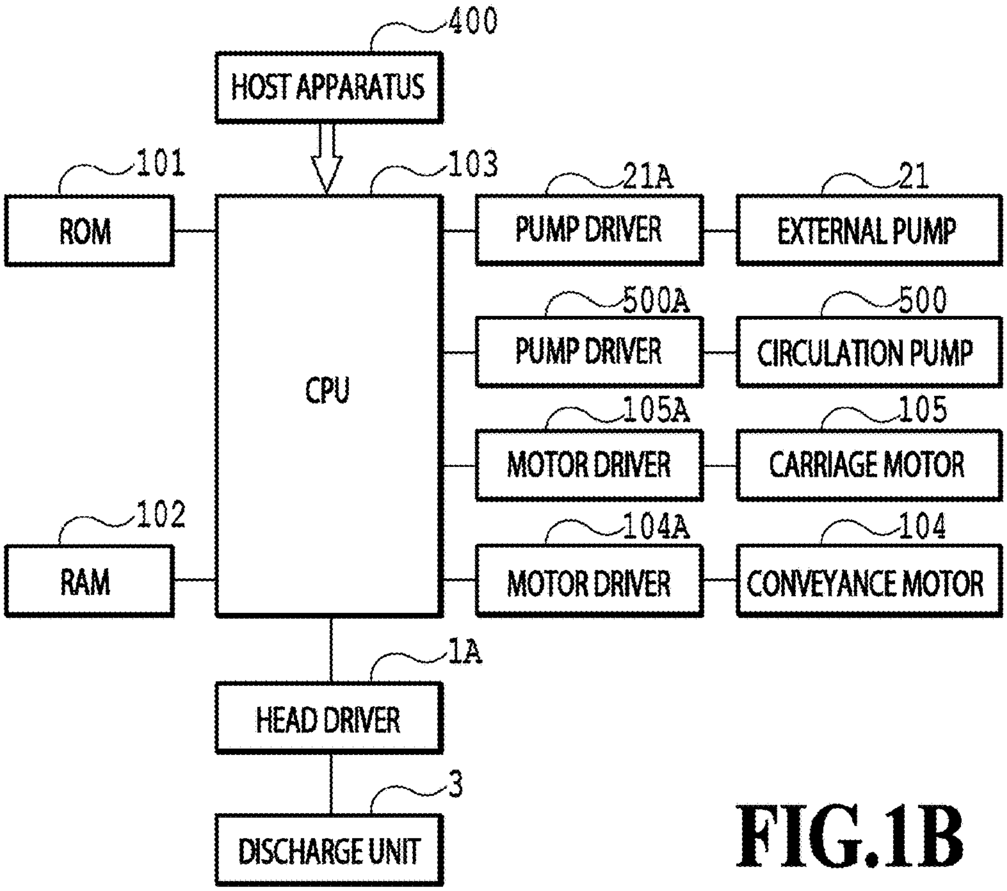

FIGS. 1A and 1B are diagrams for description of a liquid discharge apparatus and are enlarged views of a liquid discharge head of the liquid discharge apparatus and its vicinity. First, a schematic configuration of a liquid discharge apparatus 50 in the present embodiment will be described below with reference to FIGS. 1A and 1B. FIG. 1A is a perspective view schematically illustrating a liquid discharge apparatus including a liquid discharge head 1. The liquid discharge apparatus 50 of the present embodiment serves as a serial-type ink jet printing apparatus configured to perform printing on a print media M by discharging ink as liquid while scanning the liquid discharge head 1.

The liquid discharge head 1 is mounted on a carriage 60. The carriage 60 moves back and forth in a main scanning direction (X direction) along a guide shaft 51. The print media M is conveyed by conveyance rollers 55, 56, 57, and 58 in a sub scanning direction (Y direction) intersecting (in the present embodiment, orthogonal to) the main scanning direction. In each drawing to be referred later, a Z direction is the vertical direction and intersects (in the present embodiment, is orthogonal to) an X-Y plane defined by the X and Y directions. The liquid discharge head 1 can be removed from and attached to the carriage 60 by a user.

The liquid discharge head 1 includes a circulation unit 54 and a discharge unit 3 (refer to FIG. 2) to be described later. Although specific configurations will be described later, the discharge unit 3 is provided with a plurality of discharge ports and an energy generation element (hereafter referred to as a discharge element) configured to generate discharge energy for discharging liquid from each discharge port.

The liquid discharge apparatus 50 is also provided with an ink tank 2 as an ink supply source and an external pump 21, and ink accumulated in the ink tank 2 is supplied to the circulation unit 54 through an ink supply tube 59 by drive power of the external pump 21.

The liquid discharge apparatus 50 forms a certain image on the print media M by repeating print scanning in which the liquid discharge head 1 mounted on the carriage 60 performs printing by discharging ink while moving in the main scanning direction, and a conveyance operation in which the print media M is conveyed in the sub scanning direction. The liquid discharge head 1 in the present embodiment can discharge four kinds of inks in black (K), cyan (C), magenta (M), and yellow (Y) and can print a full-color image with these kinds of ink. However, ink that can be discharged by the liquid discharge head 1 is not limited to the above-described four kinds of ink. The present disclosure is also applicable to a liquid discharge head for discharging another kind of ink. In other words, the kind of ink discharged from a liquid discharge head and the number thereof are not limited.

In the liquid discharge apparatus 50, a cap member (not illustrated) that can cover a discharge port surface of the liquid discharge head at which the discharge ports are formed is provided at a position offset in the X direction from a conveyance path of the print media M. The cap member covers the discharge port surface of the liquid discharge head 1 in non-printing operation and is used for drying prevention and protection of the discharge ports, ink suction operation from the discharge ports, and the like.

The liquid discharge head 1 illustrated in FIG. 1A corresponds to an example in which the liquid discharge head 1 includes four circulation units 54 in accordance with the four kinds of ink, but a circulation unit 54 may be included in accordance with the kind of discharged liquid. A plurality of circulation units 54 may be included for the same kind of liquid. In other words, the liquid discharge head 1 includes one or more circulation units. Not all four kinds of ink necessarily need to be circulated, but only at least one kind of ink may be circulated.

FIG. 1B is a block diagram illustrating a control system of the liquid discharge apparatus 50. A CPU 103 functions as a controller that controls operation of each component of the liquid discharge apparatus 50 based on computer programs such as processing procedures stored in a ROM 101. A RAM 102 is used as a work area or the like when the CPU 103 executes processing. The CPU 103 receives image data from a host apparatus 400 outside the liquid discharge apparatus 50 and controls a head driver 1A and drive of the discharge element provided at the discharge unit 3. The CPU 103 also controls drivers of various kinds of actuators provided at the liquid discharge apparatus. For example, the CPU 103 controls, for example, a motor driver 105A of a carriage motor 105 for moving the carriage 60, and a motor driver 104A of a conveyance motor 104 for conveying the print media M with the conveyance rollers 55, 56, 57, and 58. In addition, the CPU 103 controls, for example, a pump driver 500A configured to drive a circulation pump 500 to be described later, and a pump driver 21A of the external pump 21. FIG. 1B illustrates a form that processing is performed upon reception of image data from the host apparatus 400, but the liquid discharge apparatus 50 may perform processing irrespective of data from the host apparatus 400.

<Basic Configuration of Liquid Discharge Head>

Figure 2:
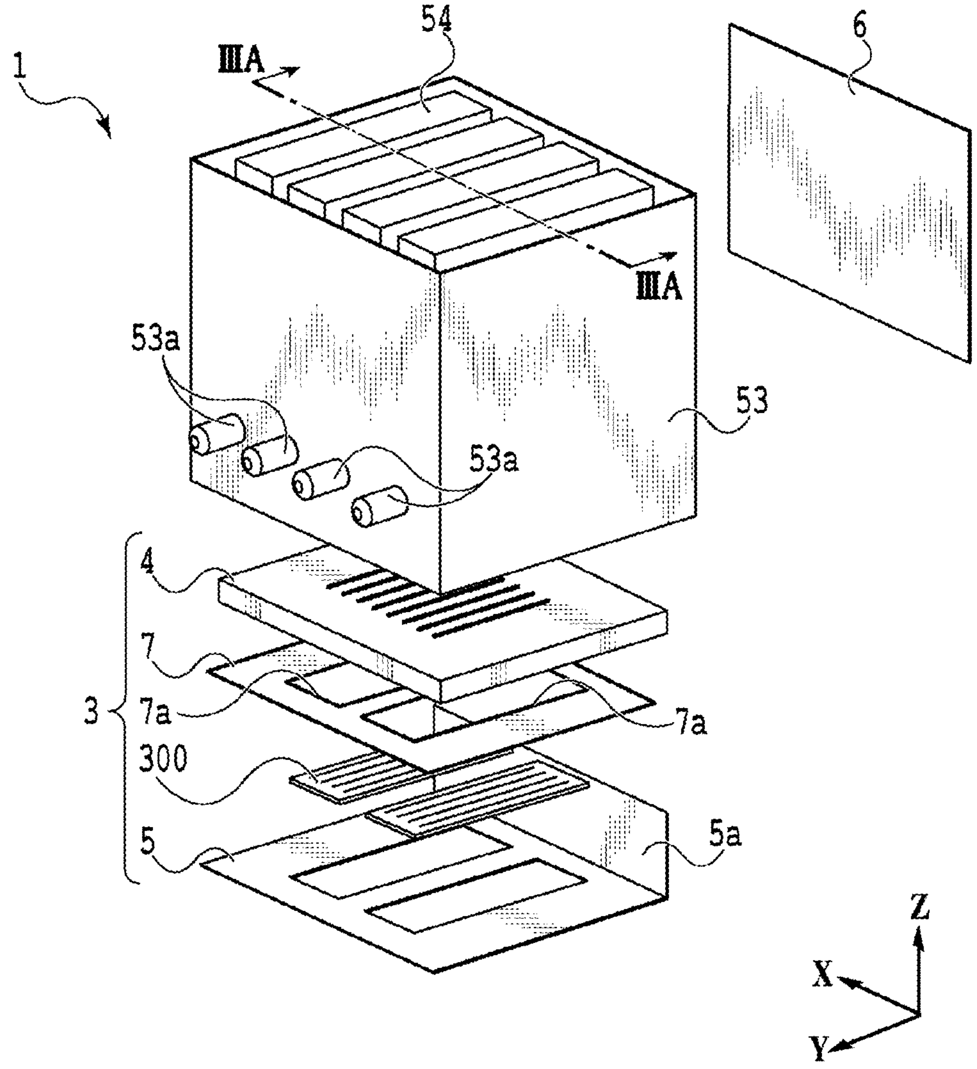
FIG. 2 is an exploded perspective view of a liquid discharge head.
Figure 3A:
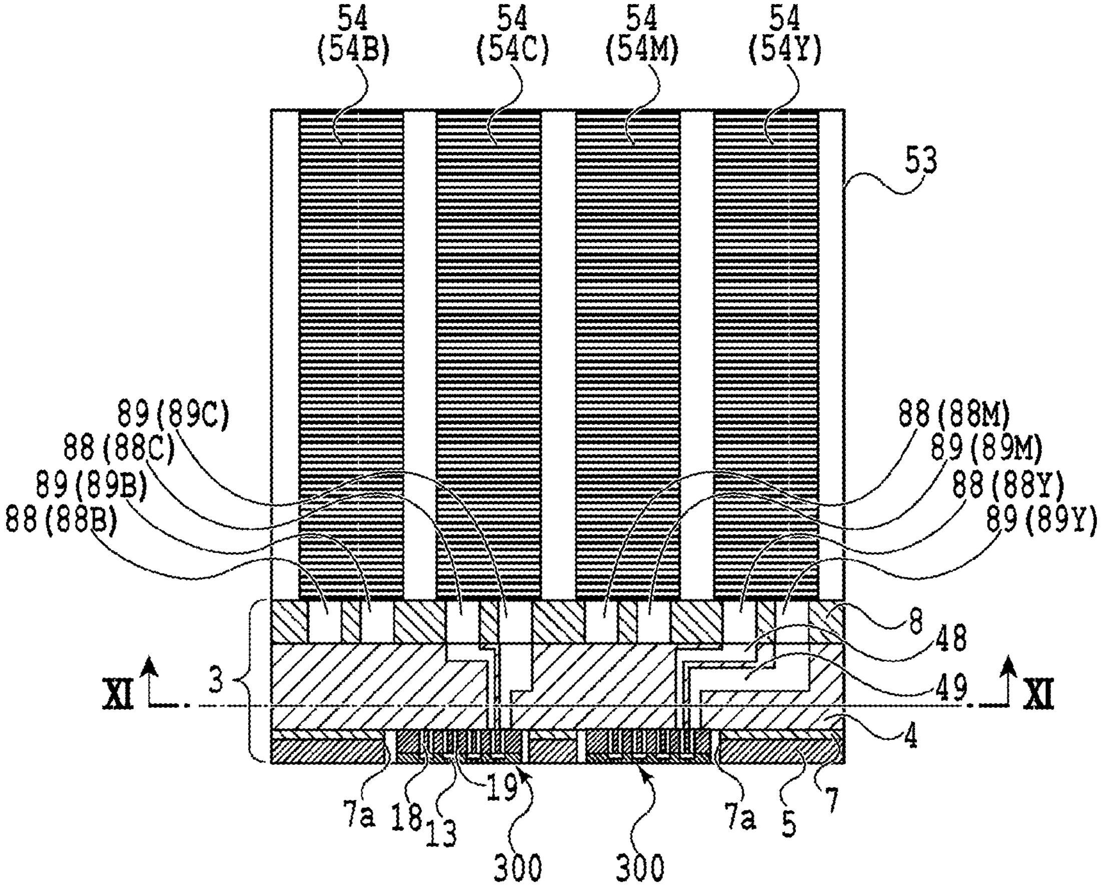
FIG. 3A is a longitudinal sectional view of the liquid discharge head.
Figure 3B:
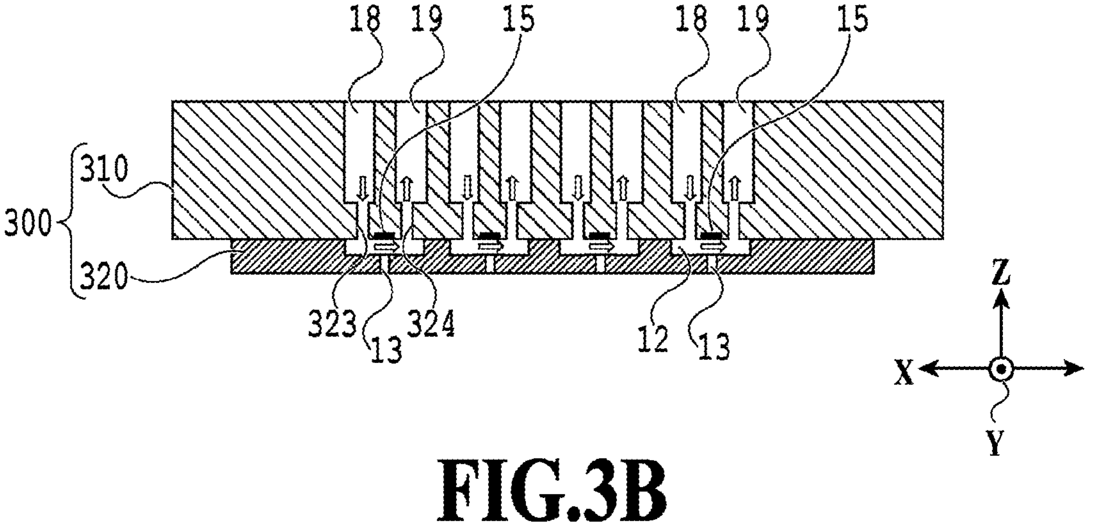
FIG. 3B is an enlarged cross-sectional view of a discharge module.

FIG. 2 is an exploded perspective view of the liquid discharge head 1 of the present embodiment. FIGS. 3A and 3B are cross-sectional views of the liquid discharge head 1 illustrated in FIG. 2 along line IIIA-IIIA. FIG. 3A is a longitudinal sectional view of the entire liquid discharge head 1, and FIG. 3B is an enlarged view of a discharge module illustrated in FIG. 3A. The following describes a basic configuration of the liquid discharge head 1 in the present embodiment mainly with reference to FIGS. 2, 3A, and 3B as well as FIGS. 1A and 1B as appropriate.

As illustrated in FIG. 2, the liquid discharge head 1 includes the circulation unit 54 and the discharge unit 3 for discharging ink supplied from the circulation unit 54 onto the print media M. The liquid discharge head 1 in the present embodiment is fixed and supported to the carriage 60 by a positioning unit and an electric contact point provided at the carriage 60 in the liquid discharge apparatus 50, both not illustrated. The liquid discharge head 1 performs printing on the print media M by discharging ink while moving in the main scanning direction (X direction) illustrated in FIGS. 1A and 1B together with the carriage 60.

The ink supply tube 59 is provided at the external pump 21 connected to the ink tank 2 as an ink supply source (refer to FIGS. 1A and 1B). A non-illustrated liquid connector is provided at a distal end of the ink supply tube 59. When the liquid discharge head 1 is mounted on the liquid discharge apparatus 50, the liquid connector provided at the distal end of the ink supply tube 59 is connected in an airtight manner to a liquid connector insertion port 53*a* as a liquid introduction port provided at a head housing 53 of the liquid discharge head 1. Accordingly, an ink supply path from the ink tank 2 to the liquid discharge head 1 through the external pump 21 is formed. In the present embodiment, since the four kinds of ink are used, four sets of the ink tank 2, the external pump 21, the ink supply tube 59, and the circulation units 54 are provided for the respective kinds of ink, and four ink supply paths corresponding to the respective kinds of ink are independently formed. In this manner, the liquid discharge apparatus 50 of the present embodiment includes an ink supply system through which ink is supplied from each ink tank 2 provided outside the liquid discharge head 1. The liquid discharge apparatus 50 of the present embodiment includes no ink collection system through which ink in the liquid discharge head 1 is collected to each ink tank 2. Thus, the liquid discharge head 1 is provided with the liquid connector insertion port 53*a* for connection to the ink supply tube 59 of each ink tank 2 but is not provided with a connector insertion port for connection to a tube for collecting ink in the liquid discharge head 1 to each ink tank 2. The liquid connector insertion port 53*a* is provided for each kind of ink.

In FIGS. 3A and 3B, 54B denotes a circulation unit for black ink, 54C denotes a circulation unit for cyan ink, 54M denotes a circulation unit for magenta ink, and 54Y denotes an ink circulation unit for yellow ink. Each circulation unit has a substantially same configuration, and the circulation units in the present embodiment are each referred to as a circulation unit 54 when not particularly distinguished from one another.

In FIGS. 2 and 3A, the discharge unit 3 includes two discharge modules 300, a first support member 4, a second support member 7, an electric wiring member (electric wiring tape) 5, and an electric contact substrate 6. As illustrated in FIG. 3B, each discharge module 300 includes a silicon substrate 310 having a thickness of 0.5 to 1 mm and a plurality of discharge elements 15 provided on one surface of the silicon substrate 310. Each discharge element 15 in the present embodiment is constituted by an electricity-heat conversion element (heater) configured to generate thermal energy as discharge energy for discharging liquid. Electric power is supplied to each discharge element 15 through electric wiring formed on the silicon substrate 310 by deposition technology.

A discharge port formation unit material 320 is formed on a front surface (lower surface in FIG. 3B) of the silicon substrate 310. The discharge port formation unit material 320 is formed with a plurality of pressure chambers 12 corresponding to the plurality of discharge elements 15, and a plurality of discharge ports 13 that discharge ink, by photolithography technique. In addition, the silicon substrate 310 is formed with a common supply flow path 18 and a common collection flow path 19. The silicon substrate 310 is also formed with a supply connection flow path 323 providing communication between the common supply flow path 18 and each pressure chamber 12, and a collection connection flow path 324 providing communication between the common collection flow path 19 and each pressure chamber 12. In the present embodiment, each discharge module 300 discharges two kinds of ink. Specifically, among the two discharge modules illustrated in FIG. 3A, the discharge module 300 positioned on the left side in the drawing discharges black ink and cyan ink, and the discharge module 300 positioned on the right side in the drawing discharges magenta ink and yellow ink. This combination is an example and any ink combination is applicable. One discharge module may discharge one kind of ink or discharge three or more kinds of ink. The numbers of kinds of ink discharged by the two discharge modules 300 does not necessarily need to be equal. One discharge module 300 may be included, or three or more discharge modules 300 may be included. In the example illustrated in FIGS. 3A and 3B, two discharge port lines extending in the Y direction are formed for each color of ink. The pressure chamber 12, the common supply flow path 18, and the common collection flow path 19 are formed for each of the plurality of discharge ports 13 of the discharge port lines.

An ink supply port and an ink collection port to be described later are formed on a back surface (upper surface in FIG. 3B) side of the silicon substrate 310. The ink supply port supplies ink from ink supply flow paths 48 to the plurality of common supply flow paths 18, and the ink collection port collects ink from the plurality of common collection flow paths 19 to ink collection flow paths 49.

The ink supply port and the ink collection port are openings for performing ink supply and collection in forward ink circulation to be described later. Specifically, in forward ink circulation, ink is supplied from the ink supply port to each common supply flow path 18 and collected each common collection flow path 19 to the ink collection port. However, ink circulation is performed with ink flow in the opposite direction in some cases. In such a case, ink is supplied from the ink collection port described above to each common collection flow path 19 and collected from each common supply flow path 18 to the ink supply port.

As illustrated in FIG. 3A, a back surface (upper surface in FIG. 3A) of each discharge module 300 is bonded and fixed to one surface (lower surface in FIG. 3A) of the first support member 4. The first support member 4 is formed with the ink supply flow paths 48 and the ink collection flow paths 49 penetrating from one surface thereof to the other surface. One opening of each ink supply flow path 48 communicates with the above-described ink supply port of the silicon substrate 310, and one opening of each ink collection flow path 49 communicates with the above-described ink collection port of the silicon substrate 310. The ink supply flow paths 48 and the ink collection flow paths 49 are independently provided for the respective kinds of ink.

In addition, the second support member 7 having openings 7*a* (refer to FIG. 2), into which the discharge modules 300 are inserted, is bonded and fixed to the one surface (lower surface in FIG. 3A) of the first support member 4. An electric wiring member 5 electrically connected to the discharge modules 300 is held to the second support member 7. The electric wiring member 5 is a member through which electric signals for discharging ink are applied to the discharge modules 300. An electrical connection part of each discharge module 300 and the electric wiring member 5 is sealed by a sealing member (not illustrated) and protected from corrosion due to ink and external impact.

The electric contact substrate 6 is bonded to an end part 5*a* (refer to FIG. 2) of the electric wiring member 5 by heat pressing by using a non-illustrated anisotropic conductive film, and the electric wiring member 5 and the electric contact substrate 6 are electrically connected to each other. The electric contact substrate 6 includes an external signal input terminal (not illustrated) for receiving electric signals from the liquid discharge apparatus 50.

A joint member 8 (FIG. 3A) is provided between the first support member 4 and each circulation unit 54. In the joint member 8, a supply port 88 and a collection port 89 are formed for each kind of ink. The supply port 88 and the collection port 89 provide communication among the corresponding ink supply flow path 48 and the corresponding ink collection flow path 49 of the first support member 4 and a flow path formed in the corresponding circulation unit 54. In FIG. 3A, a supply port 88B and a collection port 89B correspond to black ink, and a supply port 88C and a collection port 89C correspond to cyan ink. A supply port 88M and a collection port 89M correspond to magenta ink, and a supply port 88Y and a collection port 89Y correspond to yellow ink.

An opening at one end part of each of the ink supply flow paths 48 and the ink collection flow paths 49 of the first support member 4 has a small opening area in accordance with the ink supply port or ink collection port of the corresponding silicon substrate 310. An opening at the other end part of each of the ink supply flow paths 48 and the ink collection flow paths 49 of the first support member 4 has a shape expanded to an opening area equal to a large opening area of the joint member 8 formed in accordance with the flow path of the corresponding circulation unit 54. With such a configuration, it is possible to reduce an increase in flow path resistance against ink collected from each collection flow path. However, the shapes of the openings at one and the other end parts of each of the ink supply flow paths 48 and the ink collection flow paths 49 are not limited to the above-described example.

In the liquid discharge head 1 having the above-described configuration, ink supplied to each circulation unit 54 flows through the corresponding supply port 88 of the joint member 8 and the corresponding ink supply flow path 48 of the first support member 4 and flows into the corresponding common supply flow path 18 through the ink supply port of the corresponding discharge module 300. Subsequently, the ink flows from the common supply flow path 18 into the corresponding pressure chamber 12 through the corresponding supply connection flow path 323, and part of the ink having flowed into the pressure chamber is discharged from the corresponding discharge port 13 by drive of the corresponding discharge element 15. The remaining ink not discharged flows from the pressure chamber 12 through the corresponding collection connection flow path 324 and the corresponding common collection flow path 19 and flows into the corresponding ink collection flow path 49 of the first support member 4 through the ink collection port. Then, the ink having flowed into the ink collection flow path 49 flows into the circulation unit 54 through the corresponding collection port 89 of the joint member 8 and is thus collected.

<Constituent Components of Circulation Unit>

Figure 4:
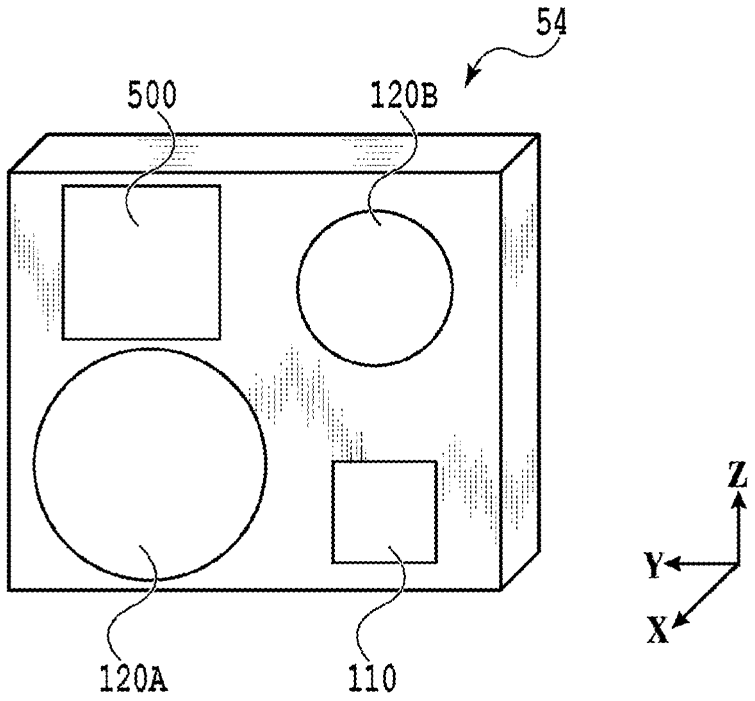
FIG. 4 is an exterior schematic diagram of a circulation unit.

FIG. 4 is an exterior schematic diagram of one circulation unit 54 corresponding to one kind of ink applied to the printing apparatus of the present embodiment. In the circulation unit 54, a filter 110, a first pressure adjuster 120A, a second pressure adjuster 120B, and the circulation pump 500 are disposed. These constituent components are connected to one another through flow paths as illustrated in FIGS. 5 and 6 and constitute a circulation path for performing ink supply and collection for the corresponding discharge module 300 in the liquid discharge head 1.

<Circulation Path in Liquid Discharge Head>

Figure 5:
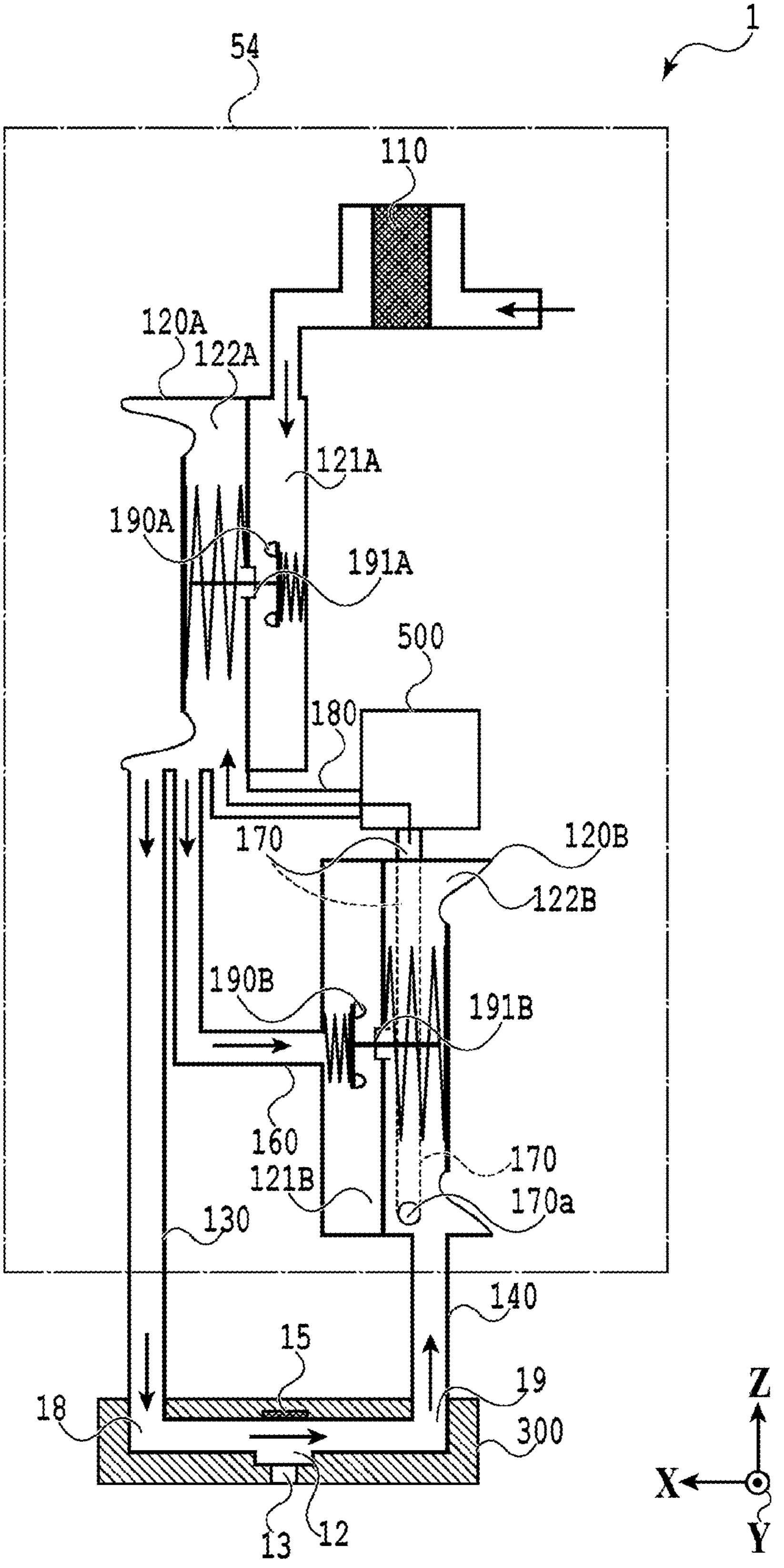
FIG. 5 is a longitudinal sectional view illustrating a circulation path.
Figure 6:
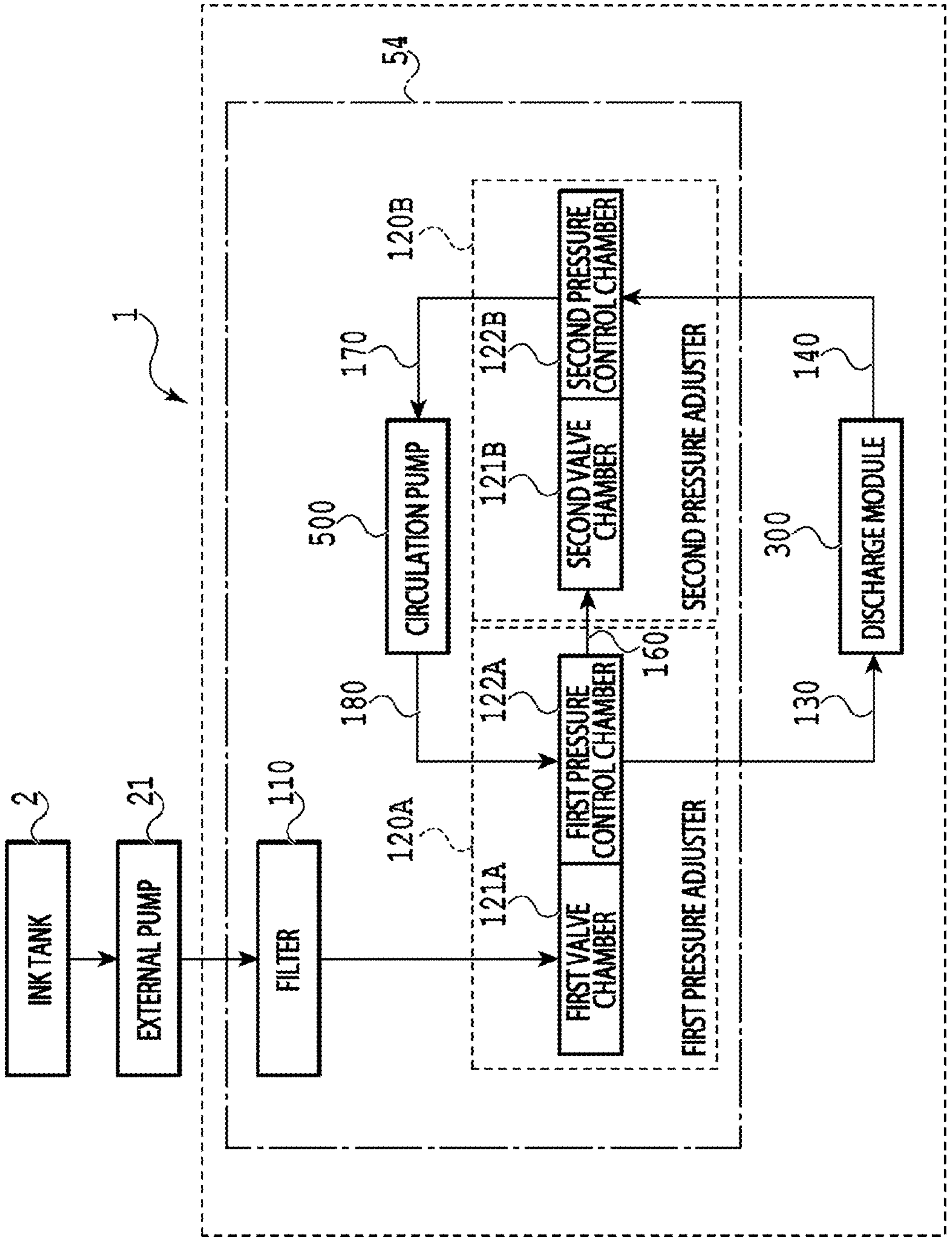
FIG. 6 is a block diagram schematically illustrating the circulation path.

FIG. 5 is a longitudinal sectional view schematically illustrating a circulation path of one kind of ink (one color of ink), which is constituted in the liquid discharge head 1. The relative positions of components (such as the first pressure adjuster 120A, the second pressure adjuster 120B, and the circulation pump 500) in FIG. 5 are simplified to more clearly describe the circulation path. Accordingly, the relative position of each component is different from that in a configuration in FIG. 19 to be described later. FIG. 6 is a block diagram schematically illustrating the circulation path illustrated in FIG. 5. As illustrated in FIGS. 5 and 6, the first pressure adjuster 120A includes a first valve chamber 121A and a first pressure control chamber 122A. The second pressure adjuster 120B includes a second valve chamber 121B and a second pressure control chamber 122B. Control pressure is higher for the first pressure adjuster 120A than for the second pressure adjuster 120B. In the present embodiment, the first pressure adjuster 120A and the second pressure adjuster 120B are used to achieve circulation in a certain pressure range in the circulation path. Ink flows through the corresponding pressure chamber 12 (discharge element 15) at a flow rate in accordance with the differential pressure between the first pressure adjuster 120A and the second pressure adjuster 120B. The following describes the circulation path in the liquid discharge head 1 and ink flow in the circulation path with reference to FIGS. 5 and 6. An arrow in each drawing illustrates a direction in which ink flows.

First, the connection state of constituent components in the liquid discharge head 1 is described.

Each external pump 21 that transfers ink housed in the corresponding ink tank 2 (FIG. 6) provided outside the liquid discharge head 1 to the liquid discharge head 1 is connected to the corresponding circulation unit 54 through the corresponding ink supply tube 59 (FIGS. 1A and 1B). The filter 110 is provided in an ink flow path positioned on the upstream side of the circulation unit 54. An ink supply path positioned on the downstream side of the filter 110 is connected to the first valve chamber 121A of the first pressure adjuster 120A. The first valve chamber 121A communicates with the first pressure control chamber 122A through a first communication port 191A that can be opened and closed by a first valve 190A illustrated in FIG. 5.

The first pressure control chamber 122A is connected to a supply flow path 130, a bypass flow path 160, and a pump exit flow path 180 of the circulation pump 500. The supply flow path 130 is connected to the corresponding common supply flow path 18 through the above-described ink supply port provided at the corresponding discharge module 300. The bypass flow path 160 is connected to the second valve chamber 121B provided in the second pressure adjuster 120B. The second valve chamber 121B communicates with the second pressure control chamber 122B through a second communication port 191B that is opened and closed by a second valve 190B illustrated in FIG. 5. FIGS. 5 and 6 illustrate an example in which one end of the bypass flow path 160 is connected to the first pressure control chamber 122A of the first pressure adjuster 120A and the other end of the bypass flow path 160 is connected to the second valve chamber 121B of the second pressure adjuster 120B. However, one end of the bypass flow path 160 may be connected to the supply flow path 130, and the other end of the bypass flow path may be connected to the second valve chamber 121B.

The second pressure control chamber 122B is connected to a collection flow path 140. The collection flow path 140 is connected to the corresponding common collection flow path 19 through the above-described ink collection port provided at the discharge module 300. In addition, the second pressure control chamber 122B is connected to the circulation pump 500 through a pump entrance flow path 170. In FIG. 5, 170*a* denotes an inflow port of the pump entrance flow path 170.

The following describes ink flow in the liquid discharge head 1 having the above-described configuration. As illustrated in FIG. 6, ink housed in each ink tank 2 is pressurized by the corresponding external pump 21 provided at the liquid discharge apparatus 50 and is supplied as ink flow of positive pressure to the corresponding circulation unit 54 of the liquid discharge head 1.

The ink supplied to the circulation unit 54 passes through the filter 110 where any foreign object such as dust and air bubbles are removed, and then flows into the first valve chamber 121A provided at the first pressure adjuster 120A. The pressure of the ink decreases due to a pressure loss at passing through the filter 110, but is positive pressure at this stage. Thereafter, when the first valve 190A is in an opened state, the ink having flowed into the first valve chamber 121A passes through the first communication port 191A and flows into the first pressure control chamber 122A. The ink having flowed into the first pressure control chamber 122A switches from positive pressure to negative pressure due to a pressure loss at passing through the first communication port 191A.

The following describes ink flow in the circulation path. The circulation pump 500 operates to feed ink sucked from the pump entrance flow path 170 on the upstream side to the pump exit flow path 180 on the downstream side. Thus, as the circulation pump 500 is driven, ink supplied from the ink tank 2 to the first pressure control chamber 122A flows into the supply flow path 130 and the bypass flow path 160 together with ink transferred from the pump exit flow path 180. Although described later in detail, a piezoelectric diaphragm pump provided with a drive source that is a piezoelectric element bonded to a diaphragm is used as a circulation pump capable of transferring liquid in the present embodiment. The piezoelectric diaphragm pump is a pump that changes volume in a pump chamber upon inputting of drive voltage to the piezoelectric element and performs liquid transfer as two check valves alternately move due to pressure variation.

The ink having flowed into the supply flow path 130 flows from the ink supply port of the discharge module 300 into the pressure chamber 12 through the corresponding common supply flow path 18, and part of the ink is discharged from the corresponding discharge port 13 by drive (heat generation) of the discharge element 15. The remaining ink not used for the discharge flows in the pressure chamber 12 and passes through the corresponding common collection flow path 19, and then flows into the collection flow path 140 connected to the discharge module 300. The ink having flowed into the collection flow path 140 flows into the second pressure control chamber 122B of the second pressure adjuster 120B.

The ink having flowed from the first pressure control chamber 122A into the bypass flow path 160 flows into the second valve chamber 121B, and then, passes through the second communication port 191B and flows into the second pressure control chamber 122B. The ink having flowed into the second pressure control chamber 122B through the bypass flow path 160 and ink collected from the collection flow path 140 are sucked into the circulation pump 500 through the pump entrance flow path 170 by drive of the circulation pump 500. Then, the ink sucked into the circulation pump 500 is transferred to the pump exit flow path 180 and flows into the first pressure control chamber 122A again. Subsequently, the ink having flowed from the first pressure control chamber 122A into the second pressure control chamber 122B through the supply flow path 130 and the discharge module 300 and the ink having flowed into the second pressure control chamber 122B through the bypass flow path 160 flow into the circulation pump 500. Then, the ink is transferred from the circulation pump 500 to the first pressure control chamber 122A. Ink circulation in the circulation path is performed in this manner.

Hereafter, a flow path providing communication between the first pressure adjuster 120A and the pressure chamber 12 is referred to as a first flow path, and a flow path providing communication between the pressure chamber 12 and the circulation pump 500 is referred to as a second flow path. In other words, the supply flow path 130 is referred to as the first flow path, and the collection flow path 140, the second pressure adjuster 120B, and the pump entrance flow path 170 are collectively referred to as the second flow path. The second flow path does not necessarily need to include the second pressure adjuster 120B and the pump entrance flow path 170. In addition, the pump exit flow path 180 is also referred to as a third flow path. Accordingly, in the present embodiment, liquid sequentially flow through a circulation path of the circulation pump 500, the third flow path, the first pressure adjuster 120A, the first flow path, pressure chamber 12, the second flow path, and the circulation pump 500.

As described above, in the present embodiment, liquid can be circulated by the circulation pumps 500 along the circulation path formed in the liquid discharge head 1. Thus, it is possible to reduce ink thickening and accumulation of a color material precipitation component in ink in the discharge modules 300, thereby maintaining ink flowability in the discharge modules 300 and discharge characteristics of the discharge ports in favorable states.

Moreover, since the circulation path in the present embodiment has a self-contained configuration in the liquid discharge head 1, it is possible to significantly shorten the length of the circulation path as compared to a case when ink circulation is performed between the liquid discharge head 1 and the ink tanks 2 provided outside the liquid discharge head. Thus, it is possible to perform ink circulation with small-sized circulation pumps.

Furthermore, only a flow path through which ink is supplied is provided as a connection flow path between the liquid discharge head 1 and each ink tank 2. In other words, a flow path for collecting ink from the liquid discharge head 1 to the ink tank 2 is unnecessary. Thus, only a tube for ink supply needs to be provided for connection between the ink tank 2 and the liquid discharge head 1, and no tube for ink collection needs to be provided. Thus, the liquid discharge apparatus 50 can have a simple internal configuration with a reduced number of tubes and can achieve size reduction of the entire apparatus. Moreover, since the number of tubes is reduced, it is possible to reduce ink pressure variation due to tube swing along with main scanning of the liquid discharge head 1. Furthermore, tube swing at main scanning of the liquid discharge head 1 provides a driving load to the carriage motor that drives the carriage 60. Thus, the driving load on the carriage motor is reduced by reduction in the number of tubes, which allows simplification of a main scanning mechanism including the carriage motor and the like. Since ink collection from the liquid discharge head to the ink tank is unnecessary, it is possible to achieve size reduction of the corresponding external pump 21. In this manner, according to the present embodiment, it is possible to achieve size reduction and cost reduction of the liquid discharge apparatus 50.

<Pressure Adjuster>

Figure 7C:
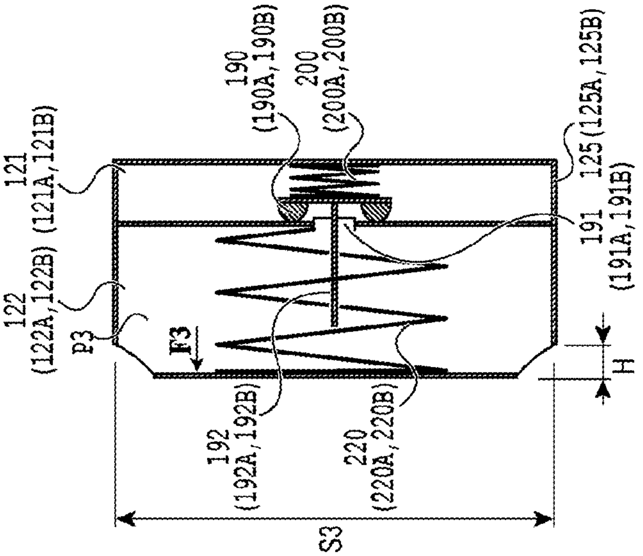
FIGS. 7A, 7B, and 7C are cross-sectional views illustrating an exemplary pressure adjuster.
Figure 7B:
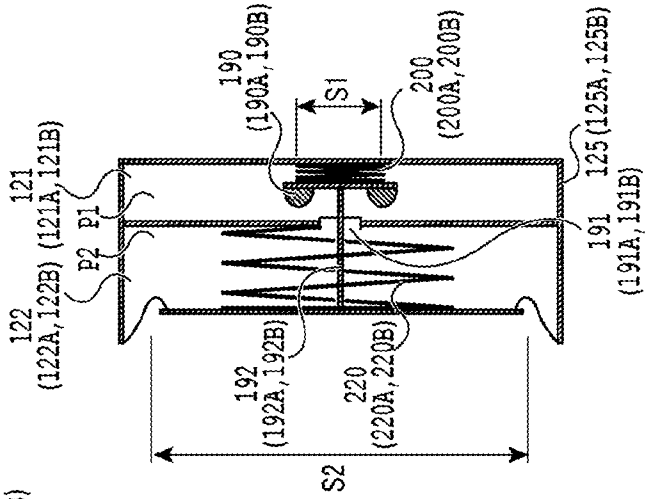
Figure 7A:
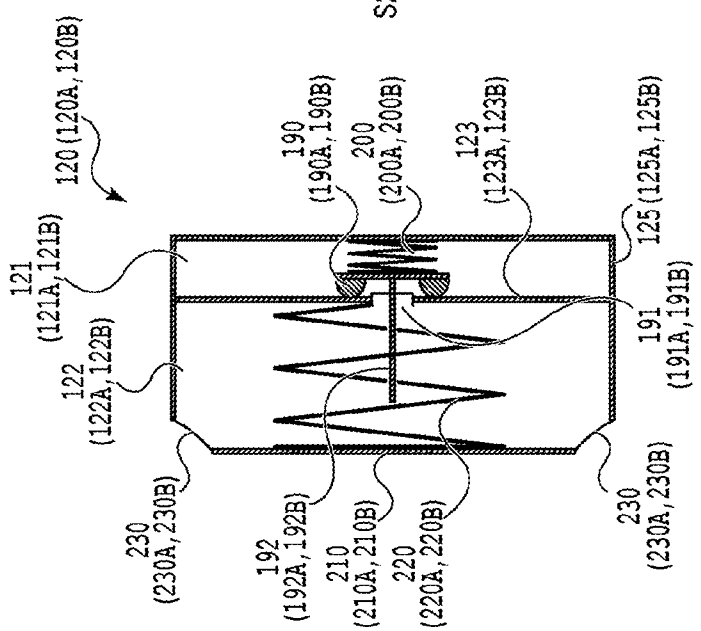

FIGS. 7A, 7B, and 7C are diagrams illustrating an exemplary pressure adjuster. The configuration and effects of each pressure adjuster (the first pressure adjuster 120A or the second pressure adjuster 120B) built in the above-described liquid discharge head 1 will be described below in more detail with reference to FIGS. 7A, 7B, and 7C. The first pressure adjuster 120A and the second pressure adjuster 120B have the same configuration. Thus, the following description is made with the first pressure adjuster 120A as an example and provides, for the second pressure adjuster 120B, only reference signs of parts corresponding to the first pressure adjuster 120A in FIGS. 7A, 7B, and 7C. For the second pressure adjuster 120B, the first valve chamber 121A described below is interpreted as the second valve chamber 121B, and the first pressure control chamber 122A is interpreted as the second pressure control chamber 122B. In addition, the first communication port 191A, a first valve shaft 192A, a first valve spring 200A, and a first pressure plate 210A are interpreted as the second communication port 191B, a second valve shaft 192B, a second valve spring 200B, and a second pressure plate 210B. Further, a first pressure adjustment spring 220A and a first flexible member 230A are interpreted as a second pressure adjustment spring 220B and a second flexible member 230B.

The first pressure adjuster 120A includes the first valve chamber 121A and the first pressure control chamber 122A formed in a cylindrical housing 125. The first valve chamber 121A and the first pressure control chamber 122A are separated from each other by a partition 123 provided in the cylindrical housing 125. The first valve chamber 121A communicates with the first pressure control chamber 122A through the first communication port 191A formed through the partition 123. The first valve chamber 121A is provided with the first valve 190A that switches communication and blockage between the first valve chamber 121A and the first pressure control chamber 122A at the first communication port 191A. The first valve 190A is held at a position facing the first communication port 191A by the first valve spring

200A (first valve pressing member) and can closely contact the partition 123 by spring force (also referred to as "pressing force") of the first valve spring 200A. Ink circulation through the first communication port 191A is blocked when the first valve 190A closely contacts the partition 123. To increase close contact with the partition 123, a contact part of the first valve 190A with the partition 123 is preferably formed of an elastic part having elastic force (also referred to as a "pressing force"). The first valve shaft 192A inserted into the first communication port 191A is provided as an extension at a central part of the first valve 190A. When the first valve shaft 192A is pressed against the spring force of the first valve spring 200A, the first valve 190A separates from the partition 123 and ink circulation through the first communication port 191A becomes possible.

The "state in which ink circulation through the first communication port 191A is blocked by the first valve 190A" is expressed by the phrase "the first valve 190A is in a closed state". The "state in which ink circulation through the first communication port 191A is not blocked by the first valve 190A (state in which ink circulation through the first communication port 191A is possible)" is expressed by the phrase "the first valve 190A is in an opened state".

Since the first valve shaft 192A can be regarded as part of the first valve 190A, "contact of the first pressure plate 210A with the first valve shaft 192A" is also expressed as "the first pressure plate 210A contacts the first valve 190A". "Non-contact of the first pressure plate 210A with the first valve shaft 192A" is also expressed as "the first pressure plate 210A does not contact the first valve 190A". A "contact state of the first valve shaft 192A and the first pressure plate 210A" is also expressed as "the first valve 190A and the first pressure plate 210A are in a contact state". A "non-contact state of the first valve shaft 192A and the first pressure plate 210A" is also expressed as "the first valve 190A and the first pressure plate 210A are in a non-contact state".

An opening part of the cylindrical housing 125 is blocked by the first flexible member 230A and the first pressure plate 210A. The first pressure control chamber 122A is formed of the first flexible member 230A, the first pressure plate 210A, a peripheral wall of the housing 125, and the partition 123. The first pressure plate 210A is displaceable along with displacement of the first flexible member 230A. The materials of the first pressure plate 210A and the first flexible member 230A are not particularly limited, and for example, the first pressure plate 210A may be made of a resin molded component and the first flexible member 230A may be made of a resin film. In this case, the first pressure plate 210A can be fixed to the first flexible member 230A by thermal welding.

The first pressure adjustment spring 220A (first pressure adjustment pressing member) is provided between the first pressure plate 210A and the partition 123. The first pressure plate 210A and the first flexible member 230A are pressed by the spring force of the first pressure adjustment spring 220A in a direction in which the inner capacity of the first pressure control chamber 122A expands as illustrated in FIG. 7A. As the pressure in the first pressure control chamber 122A decreases, the first pressure plate 210A and the first flexible member 230A is displaced in a direction in which the inner capacity of the first pressure control chamber 122A decreases against the pressure of the first pressure adjustment spring 220A. Then, when the inner capacity of the first pressure control chamber 122A decreases to a certain amount, the first pressure plate 210A contacts the first valve shaft 192A of the first valve 190A. Thereafter, when the inner capacity of the first pressure control chamber 122A further decreases, the first valve 190A moves together with the first valve shaft 192A pressed by the first pressure plate 210A against the spring force of the first valve spring 200A and separates from the partition 123. Accordingly, the first communication port 191A becomes an opened state (state in FIG. 7B).

In the present embodiment, a connection setting in the circulation path is performed so that the pressure in the first valve chamber 121A is higher than the pressure in the first pressure control chamber 122A when the first communication port 191A is in an opened state. With this configuration, when the first communication port 191A is in an opened state, ink flows from the first valve chamber 121A into the first pressure control chamber 122A. With this ink inflow, the first flexible member 230A and the first pressure plate 210A are displaced in a direction in which the inner capacity of the first pressure control chamber 122A increases. As a result, the first pressure plate 210A separates from the first valve shaft 192A of the first valve 190A, the first valve 190A closely contacts the partition 123 by the spring force of the first valve spring 200A, and the first communication port 191A becomes a closed state (state in FIG. 7C).

In this manner, in the first pressure adjuster 120A in the present embodiment, when the pressure in the first pressure control chamber 122A decreases to a certain pressure or lower (becomes strong as negative pressure), ink flows in from the first valve chamber 121A through the first communication port 191A. Accordingly, the pressure in the first pressure control chamber 122A does not further decrease. Thus, the pressure of the first pressure control chamber 122A is controlled and maintained in a certain range.

The following describes the pressure in the first pressure control chamber 122A in more detail.

Consider the above-described state (state in FIG. 7B) in which the first flexible member 230A and the first pressure plate 210A are displaced in accordance with the pressure in the first pressure control chamber 122A, the first pressure plate 210A contacts the first valve shaft 192A, and the first communication port 191A is in an opened state. The relation among forces acting on the first pressure plate 210A in this state is expressed by Expression 1 below.

$$P2 \times S2 + F2 + (P1 - P2) \times S1 + F1 = 0 \qquad (1)$$

Expression 1 can be rewritten for P2 as follows.

$$P2 = -(F1 + F2 + P1 \times S1)/(S2 - S1) \qquad (2)$$

P1: pressure (gauge pressure) in the first valve chamber 121A

P2: pressure (gauge pressure) in the first pressure control chamber 122A

F1: spring force of the first valve spring 200A (first valve pressing member)

F2: spring force of the first pressure adjustment spring 220A (first pressure adjustment pressing member)

S1: pressure receiving area of the first valve 190A

S2: pressure receiving area of the first pressure plate 210A

The spring force F1 of the first valve spring 200A and the spring force F2 of the first pressure adjustment spring 220A are positive in the direction of pressing the first valve 190A and the first pressure plate 210A (the left direction in FIGS. 7A, 7B, and 7C). In addition, the relation of $P1 \geq P2$ is satisfied for the pressure P1 in the first valve chamber 121A and the pressure P2 in the first pressure control chamber 122A.

The pressure P2 in the first pressure control chamber 122A when the first communication port 191A becomes an opened state is determined by Expression 2, and ink flows from the first valve chamber 121A into the first pressure control chamber 122A because of the relation of P1≥P2 when the first communication port 191A becomes an opened state. As a result, the pressure P2 in the first pressure control chamber 122A does not further decrease and is maintained in a certain range.

The relation among forces acting on the first pressure plate 210A when the first pressure plate 210A is in a non-contact state with the first valve shaft 192A and the first communication port 191A is in a closed state as illustrated in FIG. 7C is expressed by Expression 3.

$$P3 \times S3 + F3 = 0 \tag{3}$$

Expression 3 can be rewritten for P3 as follows.

$$P3 = -F3/S3 \tag{4}$$

F3: spring force of the first pressure adjustment spring 220A when the first pressure plate 210A and the first valve shaft 192A are in a non-contact state

P3: pressure (gauge pressure) in the first pressure control chamber 122A when the first pressure plate 210A and the first valve shaft 192A are in a non-contact state

S3: pressure receiving area of the first pressure plate 210A when the first pressure plate 210A and the first valve 190A are in a non-contact state FIG. 7C illustrates a state in which the first pressure plate 210A and the first flexible member 230A are displaced to a displaceable threshold in the left direction of the diagram. The pressure P3 in the first pressure control chamber 122A, the spring force F3 of the first pressure adjustment spring 220A, and the pressure receiving area S3 of the first pressure plate 210A change in accordance with the amounts of displacement of the first pressure plate 210A and the first flexible member 230A while being displaced the state in FIG. 7C. Specifically, the pressure receiving area S3 of the first pressure plate 210A decreases and the spring force F3 of the first pressure adjustment spring 220A increases when the first pressure plate 210A and the first flexible member 230A are in the right direction in FIGS. 7A, 7B, and 7C with respect to the state in FIG. 7C. As a result, the pressure P3 in the first pressure control chamber 122A decreases in accordance with the relation of Expression 4. In other words, the pressure P3 becomes strong as negative pressure. Accordingly, the pressure in the first pressure control chamber 122A gradually increases in accordance with Expressions 2 and 4 from the state in FIG. 7B to the state in FIG. 7C. In other words, the pressure becomes weak as negative pressure and approaches the positive pressure side. Specifically, the first pressure plate 210A and the first flexible member 230A are gradually displaced in the left direction from a state in which the first communication port 191A is in an opened state. Then, the pressure in the first pressure control chamber gradually increases until the inner capacity of the first pressure control chamber 122A finally reaches a displaceable threshold. In other words, the negative pressure decreases. In the present embodiment, the first pressure adjuster 120A adjusts the pressure of liquid in the first flow path, and the second pressure adjuster 120B adjusts the pressure of liquid in the pump entrance flow path 170 (entrance flow path).

<Circulation Pump>

Figure 8B:
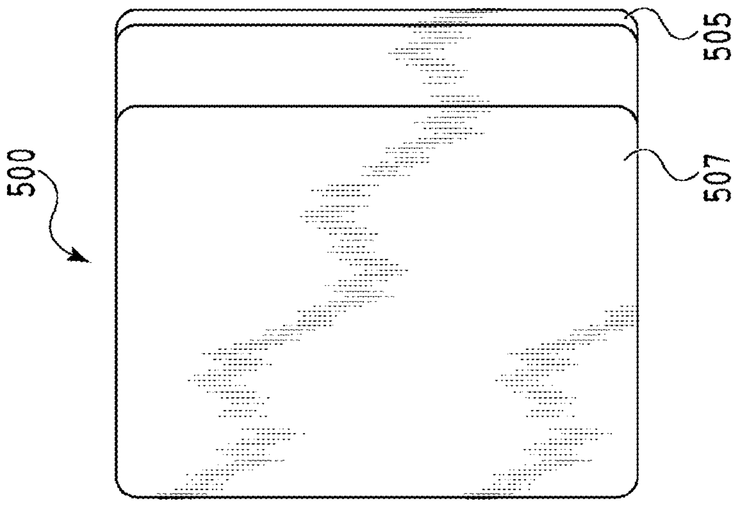
FIGS. 8A and 8B are external perspective views of a circulation pump.
Figure 8A:
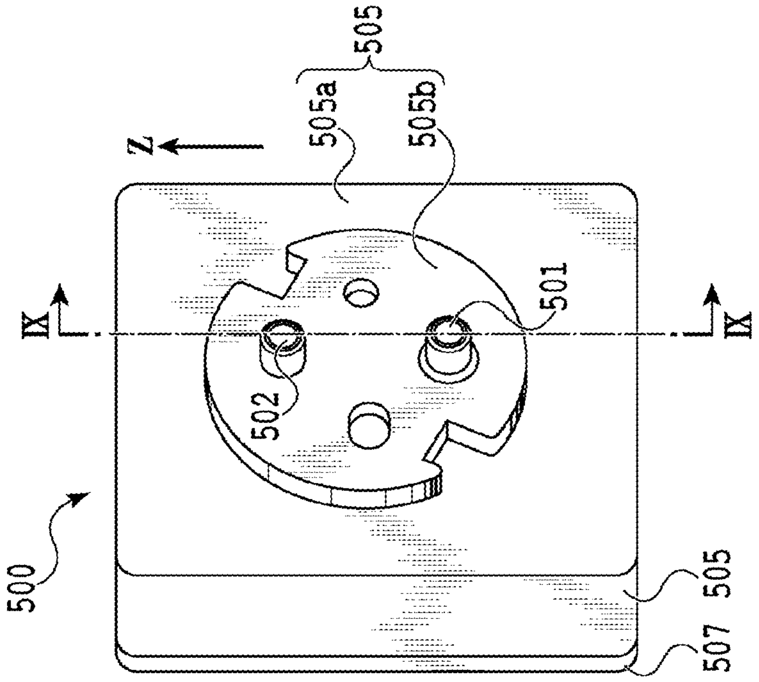
Figure 9:
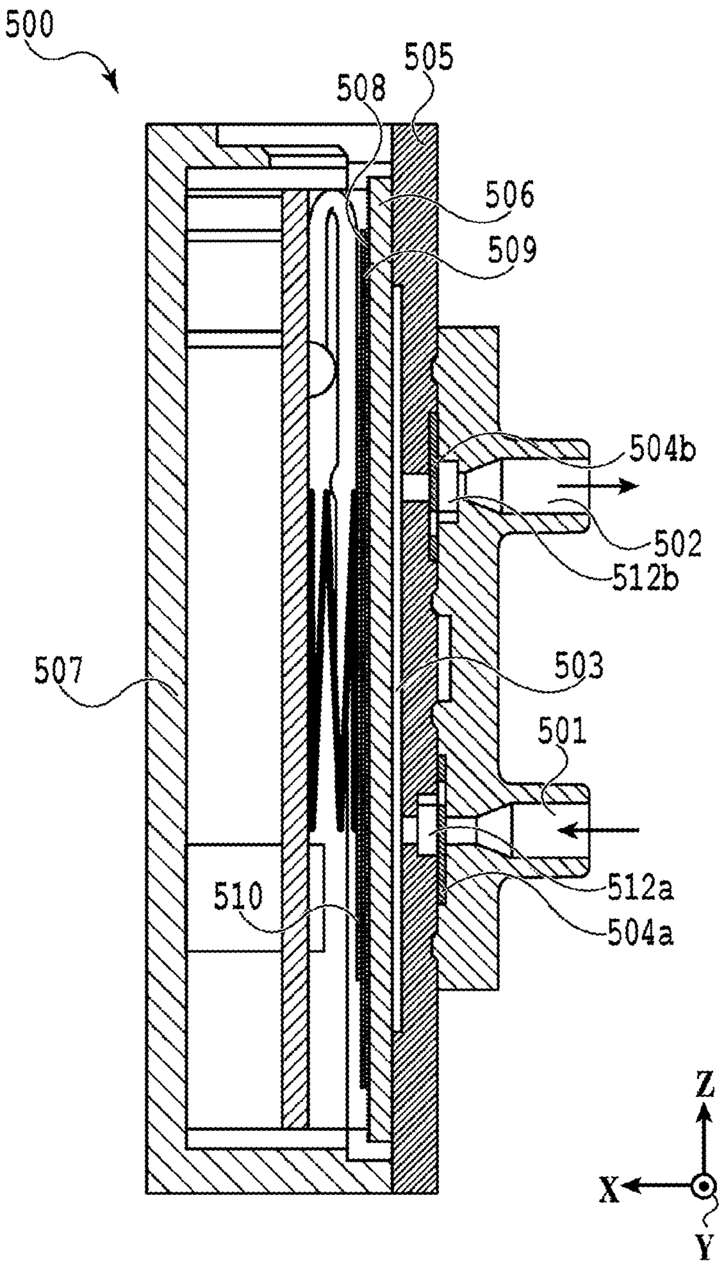
FIG. 9 is a cross-sectional view of the circulation pump illustrated in FIG. 8A along line IX-IX.

The following describes the configuration and effects of each circulation pump 500 built in the above-described liquid discharge head 1 in detail with reference to FIGS. 8 and 9.

FIGS. 8A and 8B are external perspective views of each circulation pump 500. FIG. 8A is an external perspective view illustrating the front surface side of the circulation pump 500, and FIG. 8B is an external perspective view illustrating the back surface side of the circulation pump 500. The circulation pump 500 has an outer shell constituted by a pump housing 505 and a cover 507 fixed to the pump housing 505. The pump housing 505 is constituted by a housing part body 505*a* and a flow path connection member 505*b* bonded and fixed to the outer surface of the housing part body 505*a*. A pair of through-holes communicating with each other are provided at two different positions on each of the housing part body 505*a* and the flow path connection member 505*b*. The pair of through-holes provided at one of the positions form a pump supply hole 501, and the pair of through-holes provided at the other position form a pump discharge hole 502. The pump supply hole 501 is connected to the pump entrance flow path 170 connected to the second pressure control chamber 122B, and the pump discharge hole 502 is connected to the pump exit flow path 180 connected to the first pressure control chamber 122A. Ink supplied from the pump supply hole 501 passes through a pump chamber 503 (refer to FIG. 9) to be described later and is discharged from the pump discharge hole 502.

FIG. 9 is a cross-sectional view of the circulation pump 500 illustrated in FIG. 8A along line IX-IX. A diaphragm 506 is joined to the inner surface of the pump housing 505, and the pump chamber 503 is formed between the diaphragm 506 and a recessed part formed at the inner surface of the pump housing 505. The pump chamber 503 communicates with the pump supply hole 501 and the pump discharge hole 502 formed through the pump housing 505. A check valve 504*a* is provided at a middle part of the pump supply hole 501, and a check valve 504*b* is provided at a middle part of the pump discharge hole 502. In other words, the circulation pump 500 includes a check valve in a flow path providing communication between the second flow path and the third flow path. Specifically, the check valve 504*a* is disposed such that part thereof can move to the left side in the drawing in a space 512*a* formed at the middle part of the pump supply hole 501. The check valve 504*b* is disposed such that part thereof can move to the right side in the drawing in a space 512*b* formed at the middle part of the pump discharge hole 502.

When the pump chamber 503 is depressurized as the diaphragm 506 is displaced to increase the volume of the pump chamber 503, the check valve 504*a* separates from the opening of the pump supply hole 501 in the space 512*a* (in other words, moves to the left side in the drawing). As the check valve 504*a* separates from the opening of the pump supply hole 501 in the space 512*a*, the check valve 504*a* becomes an opened state in which ink circulation through the pump supply hole 501 is enabled. When the pump chamber 503 is pressurized as the diaphragm 506 is displaced to decrease the volume of the pump chamber 503, the check valve 504*a* closely contacts a wall surface around the opening of the pump supply hole 501. As a result, the check valve 504*a* becomes a closed state in which ink circulation through the pump supply hole 501 is blocked.

As the pump chamber 503 is depressurized, the check valve 504*b* closely contacts a wall surface around the opening of the pump housing 505 and becomes a closed state in which ink circulation through the pump discharge hole 502 is blocked. As the pump chamber 503 is pressurized, the check valve 504*b* separates from the opening of the pump housing 505 and moves to the space 512*b* side (in other words, moves to the right side in the drawing), thereby enabling ink circulation through the pump discharge hole 502.

The material of the check valves 504*a* and 504*b* only needs to be deformable in accordance with the pressure in the pump chamber 503 and may be, for example, an elastic part such as EPDM or elastomer, or a film or thin plate of polypropylene or the like. However, the material is not limited to them.

As described above, the pump chamber 503 is formed by joining the pump housing 505 and the diaphragm 506. Accordingly, the pressure in the pump chamber 503 changes as the diaphragm 506 deforms. For example, the pressure in the pump chamber 503 increases as the diaphragm 506 is displaced to the pump housing 505 side (displaced to the right side in the drawing) to decrease the volume of the pump chamber 503. Accordingly, the check valve 504*b* disposed facing the pump discharge hole 502 becomes an opened state and ink in the pump chamber 503 is discharged. Simultaneously, the check valve 504*a* disposed facing the pump supply hole 501 closely contacts a wall surface around the pump supply hole 501, and thus ink backflow from the pump chamber 503 to the pump supply hole 501 is prevented.

The pressure in the pump chamber 503 decreases as the diaphragm 506 is displaced in a direction in which the pump chamber 503 expands. Accordingly, the check valve 504*a* disposed facing the pump supply hole 501 becomes an opened state and ink is supplied to the pump chamber 503. Simultaneously, the check valve 504*b* disposed at the pump discharge hole 502 closely contacts the wall surface around an opening formed through the pump housing 505 and blocks the opening. Thus, ink backflow from the pump discharge hole 502 to the pump chamber 503 is prevented.

In the circulation pump 500 as described above, the diaphragm 506 deforms to change the pressure in the pump chamber 503, thereby performing ink suction and discharge. In this case, when bubbles enter the pump chamber 503, change of the pressure in the pump chamber 503 as the diaphragm 506 is displaced decreases due to expansion and contraction of the bubbles and the amount of transferred fluid decreases. Thus, the pump chamber 503 is disposed in parallel to the gravitational force so that bubbles having entered the pump chamber 503 are likely to gather at an upper part of the pump chamber 503, and the pump discharge hole 502 is disposed higher than the center of the pump chamber 503. Accordingly, the capability of discharging bubbles in the pump can be improved to achieve flow rate stabilization.

<Ink Flow in Liquid Discharge Head>

Figure 10A:
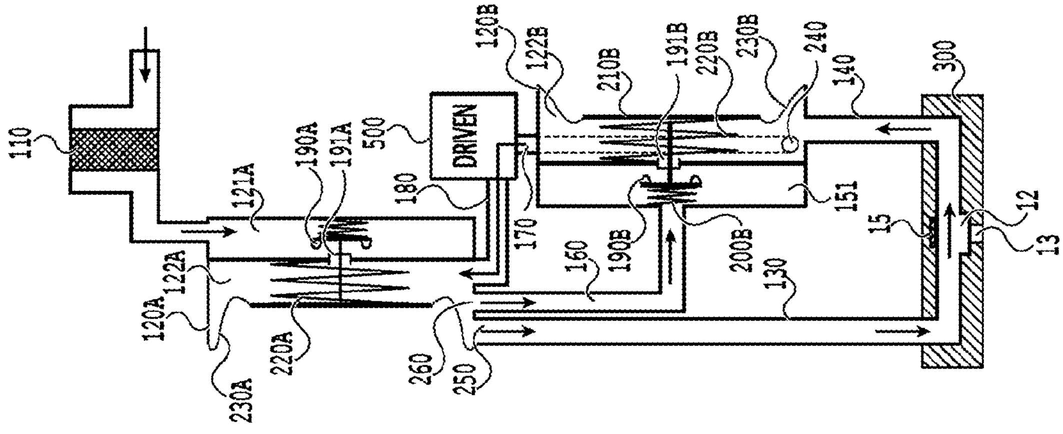
FIGS. 10A to 10F are diagrams for description of the state of the liquid discharge head and ink flow in the liquid discharge head.

FIGS. 10A to 10F are diagrams for description of ink flow in the liquid discharge head. Ink circulation performed in the liquid discharge head 1 will be described below with reference to FIGS. 10A to 10F. The relative positions of components (such as the first pressure adjuster 120A, the second pressure adjuster 120B, and the circulation pump 500) in FIGS. 10A to 10F are simplified to more clearly describe an ink circulation path. Accordingly, the relative position of each component is different from that in the configuration in FIG. 19 to be described later. FIG. 10A schematically illustrates ink flow when print operation that performs printing by discharging ink from the discharge port 13 is performed. Each arrow in the drawing illustrates ink flow. In the present embodiment, the external pump 21 and the circulation pump 500 both start driving when the print operation is performed. The external pump 21 and the circulation pump 500 may be driven irrespective of the print operation. The external pump 21 and the circulation pump 500 do not necessarily need to be driven in a cooperative manner but may be driven separately and independently.

In the print operation, the circulation pump 500 is in an "ON" state (drive state), and ink flowing out of the first pressure control chamber 122A flows into the supply flow path 130 and the bypass flow path 160. The ink having flowed into the supply flow path 130 passes through the discharge module 300, then flows into the collection flow path 140, and thereafter is supplied to the second pressure control chamber 122B.

The ink having flowed from the first pressure control chamber 122A into the bypass flow path 160 flows into the second pressure control chamber 122B through the second valve chamber 121B. The ink having flowed into the second pressure control chamber 122B passes through the pump entrance flow path 170, the circulation pump 500, and the pump exit flow path 180 and then flows into the first pressure control chamber 122A again. The pressure in the first valve chamber 121A is set to be higher than the pressure in the first pressure control chamber 122A based on the above-described relation of Expression 2. Thus, part of the ink in the first pressure control chamber 122A does not flow to the first valve chamber 121A but is supplied to the discharge module 300 through the supply flow path 130 again. The ink having flowed into the discharge module 300 flows into the first pressure control chamber 122A again through the collection flow path 140, the second pressure control chamber 122B, the pump entrance flow path 170, the circulation pump 500, and the pump exit flow path 180. The residue of the ink in the first pressure control chamber 122A flows into the first pressure control chamber 122A again through the bypass flow path 160, the second valve chamber 121B, the second pressure control chamber 122B, the pump entrance flow path 170, the circulation pump 500, and the pump exit flow path 180. In this manner, a self-contained ink circulation is performed in the liquid discharge head 1.

In the above-described ink circulation, the circulation amount (flow rate) of ink in the discharge module 300 is determined by the differential pressure between the control pressures of the first pressure control chamber 122A and the second pressure control chamber 122B. The differential pressure is set to achieve a circulation amount with which ink thickening in the vicinity of each discharge port in the discharge module 300 can be prevented. Ink in an amount of consumption by printing is supplied from the ink tank 2 to the first pressure control chamber 122A through the filter 110 and the first valve chamber 121A. The mechanism of supplying ink corresponding to an amount of consumption is described in detail. As ink in the circulation path decreases by an amount corresponding to the amount of ink consumed by printing, the pressure in the first pressure control chamber decreases, and as a result, ink in the first pressure control chamber 122A decreases as well. The inner capacity of the first pressure control chamber 122A decreases along with the decrease of ink in the first pressure control chamber 122A. Due to the decrease of the inner capacity of the first pressure control chamber 122A, the first communication port 191A becomes an opened state and ink is supplied from the first valve chamber 121A to the first pressure control chamber 122A. The supplied ink receives a pressure loss when passing through the first communication port 191A from the first valve chamber 121A. Then, when flowing into the first pressure control chamber 122A, the ink at positive pressure switches to the state of negative pressure. As the ink flows from the first valve chamber 121A into the first pressure control chamber 122A, the pressure in the first pressure control chamber 122A increases and the inner capacity of the first pressure control chamber 122A increases, and accordingly, the first communication port 191A becomes a closed state. In this manner, the first communication port 191A repeats an opened state and a closed state in accordance with ink consumption. The first communication port 191A is maintained in a closed state when ink is not consumed.

Figure 10B:
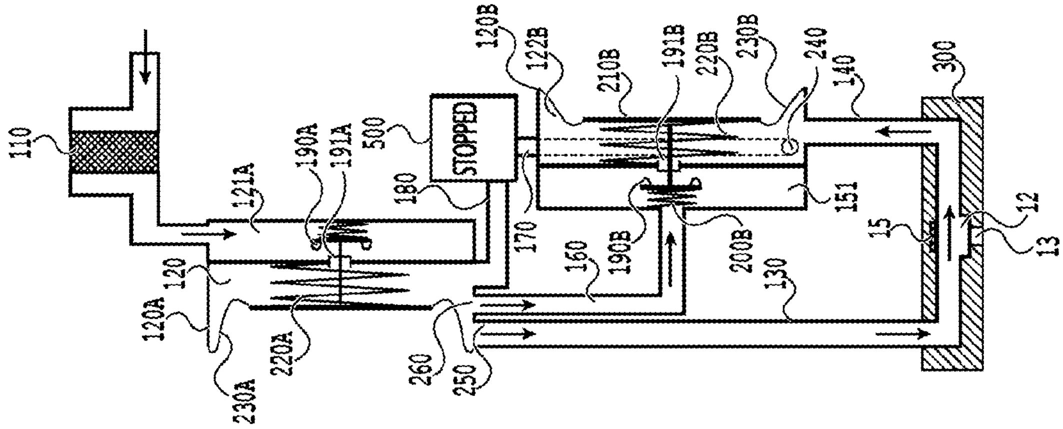

FIG. 10B schematically illustrates ink flow right after the print operation ends and the circulation pump 500 is in an "OFF" state (stop state). At the initial time point when the print operation ends and the circulation pump 500 becomes "OFF", the pressure in the first pressure control chamber 122A and the pressure in the second pressure control chamber 122B are both the control pressure during the print operation. Accordingly, ink movement as illustrated in FIG. 10B occurs in accordance with the differential pressure between the pressure in the first pressure control chamber 122A and the pressure in the second pressure control chamber 122B. Specifically, flow of ink supplied from the first pressure control chamber 122A to the discharge module 300 through the supply flow path 130 and thereafter reaching the second pressure control chamber 122B through the collection flow path 140 continuously occurs. In addition, flow of ink reaching the second pressure control chamber 122B from the first pressure control chamber 122A through the bypass flow path 160 and the second valve chamber 121B continuously occurs.

Ink in an amount equal to the amount of ink having moved from the first pressure control chamber 122A to the second pressure control chamber 122B through the above-described ink flows is supplied from the ink tank 2 to the first pressure control chamber 122A through the filter 110 and the first valve chamber 121A. Accordingly, the amount of content in the first pressure control chamber 122A is maintained constant. According to the above-described relation of Expression 2, when the amount of content in the first pressure control chamber 122A is constant, the spring force F1 of the first valve spring 200A, the spring force F2 of the first pressure adjustment spring 220A, the pressure receiving area S1 of the first valve 190A, and the pressure receiving area S2 of the first pressure plate 210A are maintained constant. Thus, the pressure in the first pressure control chamber 122A is determined in accordance with change of the pressure P1 in the first valve chamber 121A. Accordingly, when there is no change of the pressure P1 in the first valve chamber 121A, the pressure P2 in the first pressure control chamber 122A is maintained at the same pressure as the control pressure during the print operation. In the state illustrated in FIG. 10B, the second communication port 191B is in an opened state and the second pressure plate 210B and the second valve 190B are in a contact state, and thus the pressure in the second pressure control chamber 122B changes in accordance with Expression 2.

Figure 10C:
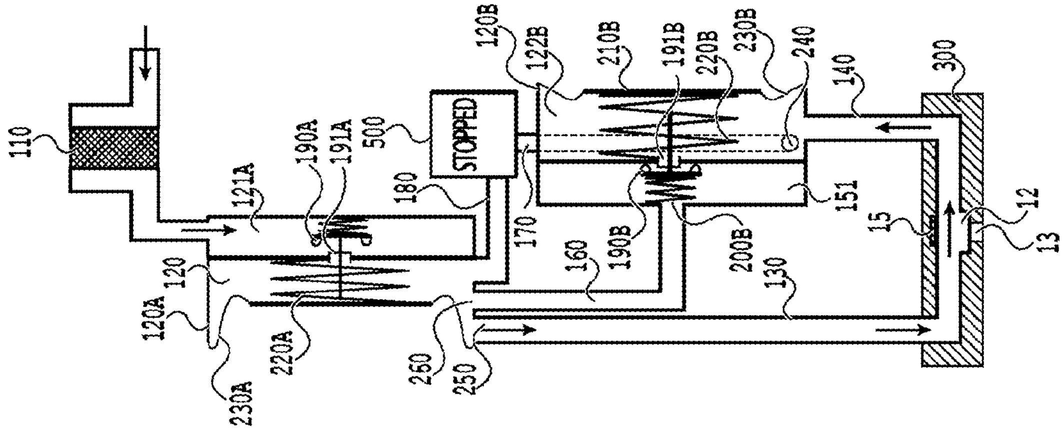

As ink flows into the second pressure control chamber 122B, the state illustrated in FIG. 10B transitions to the state illustrated in FIG. 10C. In the state illustrated in FIG. 10C, the second communication port 191B is in a closed state and the second valve chamber 121B and the second pressure control chamber 122B are in a non-communicating state. After transition to such a state, the pressure in the second pressure control chamber 122B increases in accordance with Expression 4.

Figure 10F:
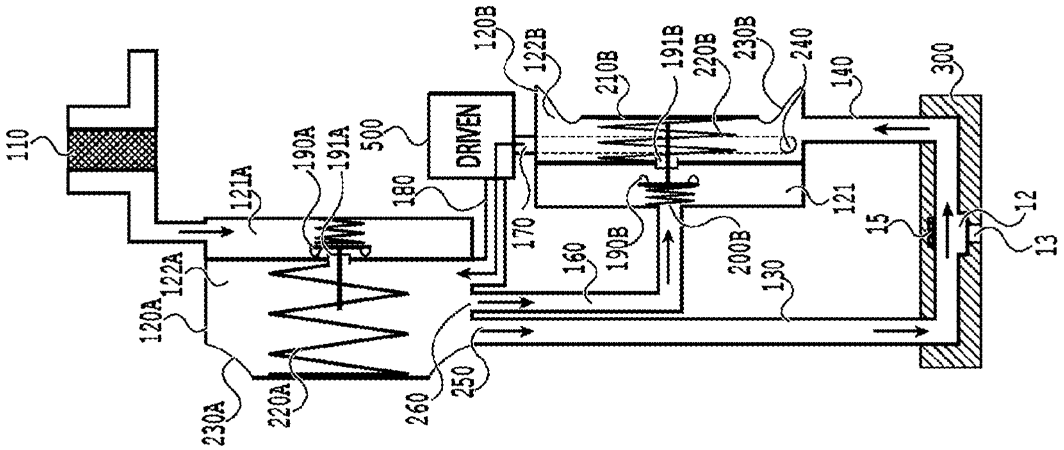

In the state illustrated in FIG. 10C, the first pressure control chamber 122A and the second pressure control chamber 122B have differential pressure therebetween. Thus, ink moves from the first pressure control chamber 122A to the second pressure control chamber 122B, and accordingly, the amount of content in the second pressure control chamber 122B increases as illustrated in FIG. 10D. The first communication port 191A is in an opened state and the amount of content in the first pressure control chamber 122A is maintained. During transition from the state illustrated in FIG. 10C to FIG. 10D to the state illustrated in, as well, the pressure in the second pressure control chamber 122B increases in accordance with Expression 4.

Figure 10E:
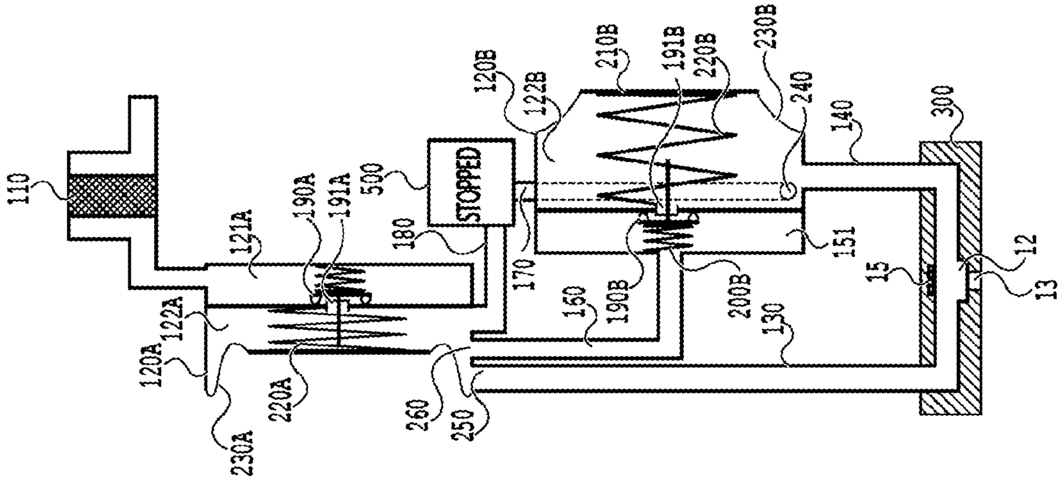
Figure 10D:
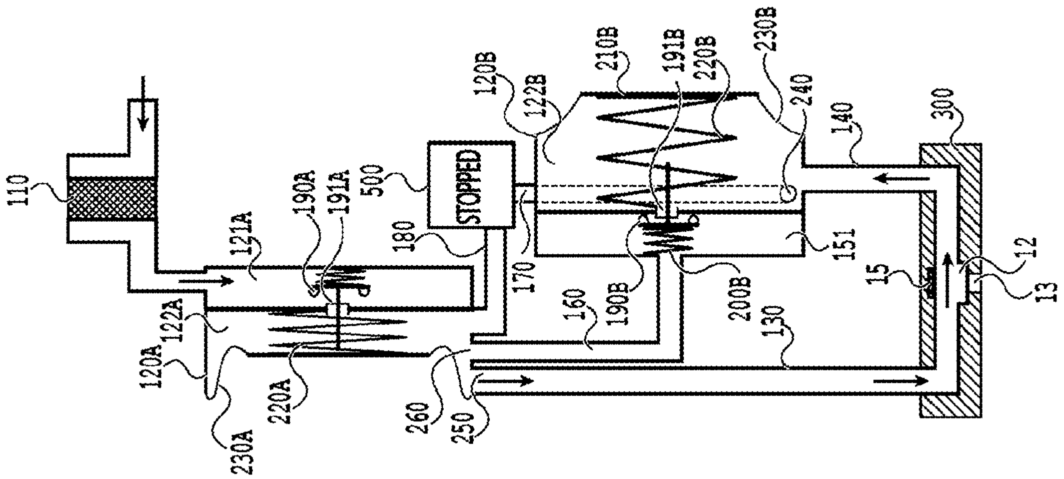

The same operation as the operation from FIG. 10C to FIG. 10D is continued until the pressure in the second pressure control chamber 122B reaches the pressure in the first pressure control chamber 122A and the differential pressure therebetween reaches zero as illustrated in FIG. 10E. In the state illustrated in FIG. 10E, there is no ink inflow from the first pressure control chamber 122A to the second pressure control chamber 122B. In the state illustrated in FIG. 10E, the amount of content in the second pressure control chamber 122B further increases and an accumulation part in which ink can be accumulated is formed, whereas the amount of content in the first pressure control chamber 122A is maintained. In addition, in the state illustrated in FIG. 10E, the second pressure plate 210B and the second valve shaft 192B remain in a non-contact state and the second communication port 191B remains in a closed state. Further, in the state illustrated in FIG. 10E, the first communication port 191A has changed from an opened state to a closed state.

In the state illustrated in FIG. 10C, no ink flow occurs from the first pressure control chamber 122A to the second pressure control chamber 122B through the bypass flow path 160 and the second valve chamber 121B. Accordingly, there only occurs flow that ink in the first pressure control chamber 122A is supplied to the discharge module 300 through the supply flow path 130 and then reaches the second pressure control chamber 122B through the collection flow path 140.

Time of one to two minutes approximately elapses until transition from stop of the circulation pump 500 to the state illustrated in FIG. 10E, although the time can vary in accordance with the shapes and sizes of flow paths and the property of ink.

When the circulation pump 500 is driven in the state illustrated in FIG. 10E in which ink is accumulated in the accumulation part formed in the second pressure control chamber 122B, ink in the accumulation part formed in the second pressure control chamber 122B is supplied to the first pressure control chamber 122A by the circulation pump 500. Accordingly, the amount of ink in the first pressure control chamber 122A increases and the first flexible member 230A and the first pressure plate 210A are displaced in the expanding direction as illustrated in FIG. 10F. Then, as the circulation pump 500 is continuously driven, the state in the circulation path changes to the state illustrated in FIG. 10A.

FIG. 10A is described as an example in the print operation in the above description, but ink circulation may be performed without the print operation as described above. In this case as well, the ink circulation path transitions as illustrated in FIGS. 10A to 10F in accordance with drive and stop of the circulation pump 500.

As described above, the present embodiment uses an example in which the second communication port 191B of the second pressure adjuster 120B becomes an opened state when the circulation pump 500 is driven and ink circulation is performed and the second communication port 191B becomes a closed state when ink circulation is stopped, but the present invention is not limited thereto. The control pressure may be set such that the second communication port 191B of the second pressure adjuster 120B is in a closed state even when the circulation pump 500 is driven and ink circulation is performed. This will be specifically described below together with the function of the bypass flow path 160.

The bypass flow path 160 connecting the first pressure adjuster 120A and the second pressure adjuster 120B is provided so that, for example, the discharge module 300 is not affected by negative pressure generated in the circulation path when the negative pressure becomes higher than a predetermined value. Moreover, the bypass flow path 160 is provided to supply ink from both the supply flow path 130 and the collection flow path 140 to the pressure chamber 12.

The following first describes an example in which, when the negative pressure becomes higher than the predetermined value, its influence on the discharge module 300 is avoided since the bypass flow path 160 is provided. For example, a characteristic (such as viscosity) of ink changes with change in environmental temperature in some cases. As the viscosity of ink changes, a pressure loss in the circulation path changes. For example, as the viscosity of ink decreases, a pressure loss in the circulation path decreases. As a result, the flow rate of the circulation pump 500 being driven with a constant drive amount increases and the flow rate through the discharge module 300 increases. However, the discharge module 300 is maintained at a constant temperature by a non-illustrated temperature adjustment mechanism, and thus the viscosity of ink in the discharge module 300 is maintained constant as environmental temperature changes. Since the flow rate of ink flowing inside the discharge module 300 increases although the viscosity of ink in the discharge module 300 does not change, the negative pressure in the discharge module 300 becomes higher due to flow resistance. When the negative pressure in the discharge module 300 becomes higher the predetermined value in this manner, the meniscus of the discharge port 13 is broken down and external air is drawn into the circulation path, and accordingly, normal discharge potentially cannot be performed. Even when the meniscus is not broken down, the negative pressure in the pressure chamber 12 potentially becomes higher than expected and affects discharge.

Thus, in the present embodiment, the bypass flow path 160 is formed in the circulation path. Since the bypass flow path 160 is provided, ink flows to the bypass flow path 160 as well when the negative pressure becomes higher than the predetermined value, and thus the pressure in the discharge module 300 can be maintained constant. Accordingly, for example, such control pressure may be set that the second communication port 191B of the second pressure adjuster 120B is maintained in a closed state even when the circulation pump 500 is driven. Moreover, the control pressure in the second pressure adjuster 120B may be set so that the second communication port 191B of the second pressure adjuster 120B becomes an opened state when the negative pressure becomes higher than the predetermined value. However, the second communication port 191B may be in a closed state when the circulation pump 500 is driven if the meniscus is not broken or predetermined negative pressure is maintained with change in the pump flow rate due to viscosity change upon environment change or the like.

The following describes an example in which the bypass flow path 160 is provided to supply ink from both the supply flow path 130 and the collection flow path 140 to the pressure chamber 12. Pressure variation in the circulation path can occur also with discharge operation by the discharge element 15. This is because force that draws ink into the pressure chamber 12 is generated along with the discharge operation.

The following describes that ink is supplied to the pressure chamber 12 from both the supply flow path 130 side and the collection flow path 140 side when printing is continued at high duty. The duty is defined differently under various conditions, but in this example, is regarded as 100% in a state in which one ink droplet of 4 Pl is printed on a 1200 dPi lattice. Printing at high duty means that, for example, printing is performed at the duty of 100%.

As printing is continued at high duty, the amount of ink flowing from the pressure chamber 12 into the second pressure control chamber 122B through the collection flow path 140 decreases. Since the circulation pump 500 performs ink outflow at a constant amount, the balance between inflow and outflow in the second pressure control chamber 122B is lost, the amount of ink in the second pressure control chamber 122B decreases, the negative pressure in the second pressure control chamber 122B becomes strong, and the second pressure control chamber 122B contracts. Then, since the negative pressure in the second pressure control chamber 122B becomes strong, the inflow amount of ink flowing into the second pressure control chamber 122B through the bypass flow path 160 increases and the second pressure control chamber 122B is stabilized in a state in which outflow and inflow are balanced. In this manner, the negative pressure in the second pressure control chamber 122B becomes strong in accordance with the duty as a result. In the above-described configuration in which the second communication port 191B is in a closed state when the circulation pump 500 is driven, the second communication port 191B becomes an opened state in accordance with the duty and ink flows from the bypass flow path 160 into the second pressure control chamber 122B.

Then, as printing is further continued at high duty, the amount of flow from the pressure chamber 12 into the second pressure control chamber 122B through the collection flow path 140 decreases, and, instead, the amount of flow from the second communication port 191B into the second pressure control chamber 122B through the bypass flow path 160 increases. As this state further proceeds, the amount of ink flowing from the pressure chamber 12 into the second pressure control chamber 122B through the collection flow path 140 becomes zero and all ink flowing out to the circulation pump 500 is ink flowing in from the second communication port 191B. As this state further proceeds, ink flows from the second pressure control chamber 122B back into the pressure chamber 12 through the collection flow path 140. In this state, ink flowing out from the second pressure control chamber 122B to the circulation pump 500 and ink flowing out to the pressure chamber 12 flow from the bypass flow path 160 into the second pressure control chamber 122B through the second communication port 191B. In this case, ink from the supply flow path 130 and ink from the collection flow path 140 fills the pressure chamber 12 and is discharged.

The ink backflow that occurs when the printing duty is high is a phenomenon that occurs because the bypass flow path 160 is provided. Although the above description is made on the example in which the second communication port 191B of the second pressure adjuster 120B becomes an opened state in accordance with the ink backflow, but the ink backflow may start in a state in which the second communication port 191B of the second pressure adjuster 120B is in an opened state.

In a configuration in which the second pressure adjuster 120B is not provided, as well, the above-described ink backflow can occur since the bypass flow path 160 is provided. The bypass flow path 160 only needs to provide communication between at least one of the first flow path 130 and the first pressure control chamber 122A of the first pressure adjuster 120A and the second flow path 140, 120B, and 170 not through the pressure chamber 12.

<Configuration of Discharge Unit>

Figure 11A:
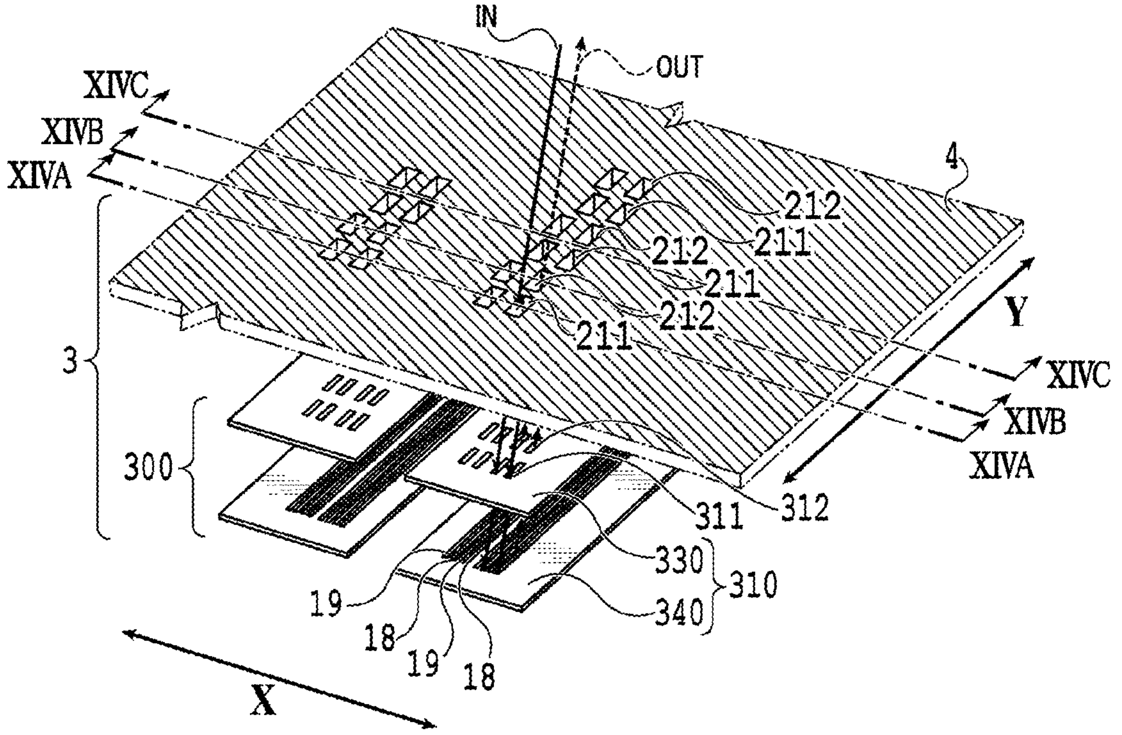
FIGS. 11A and 11B are schematic diagrams illustrating a circulation path in a discharge unit.
Figure 11B:
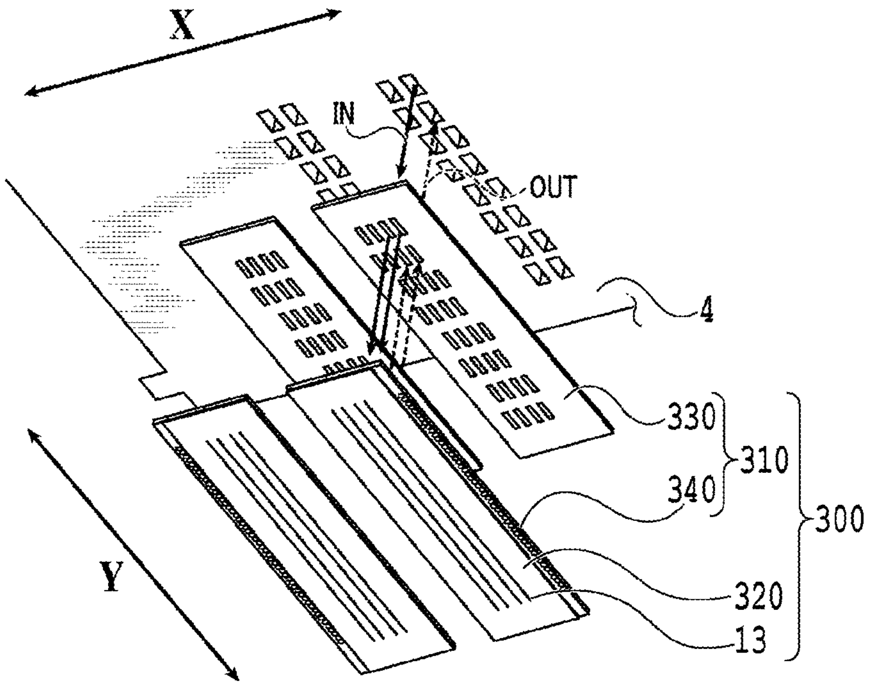
Figure 12:
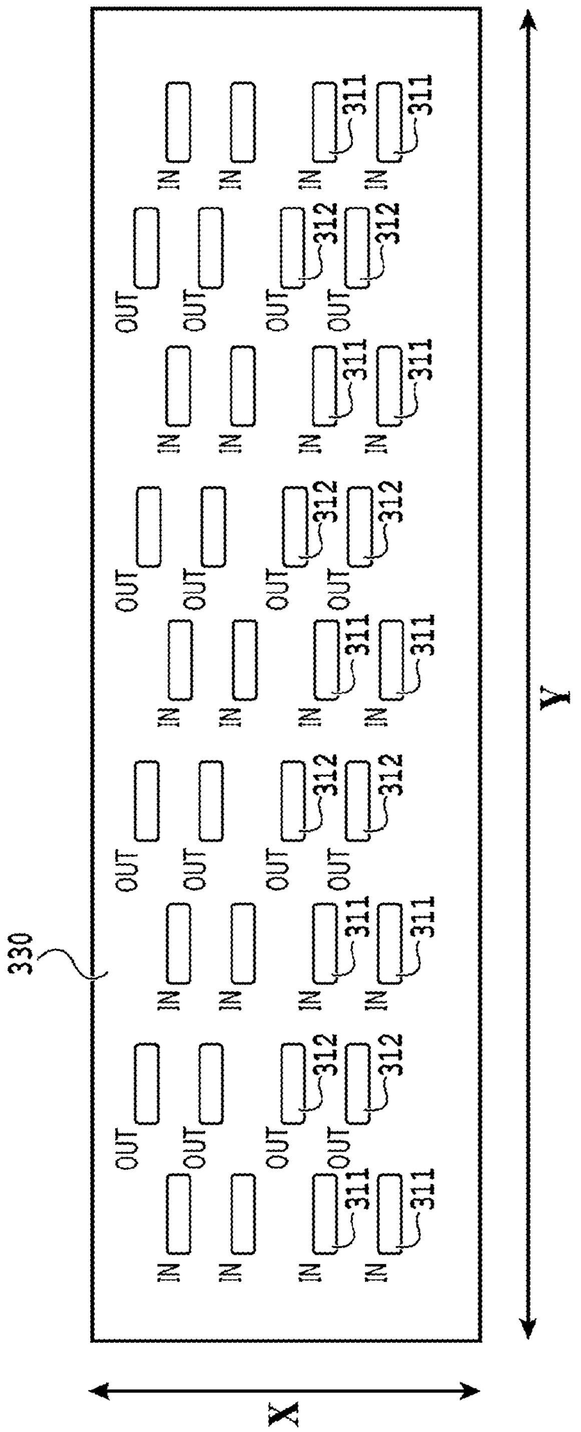
FIG. 12 is a diagram illustrating an opening plate 330.
Figure 13:
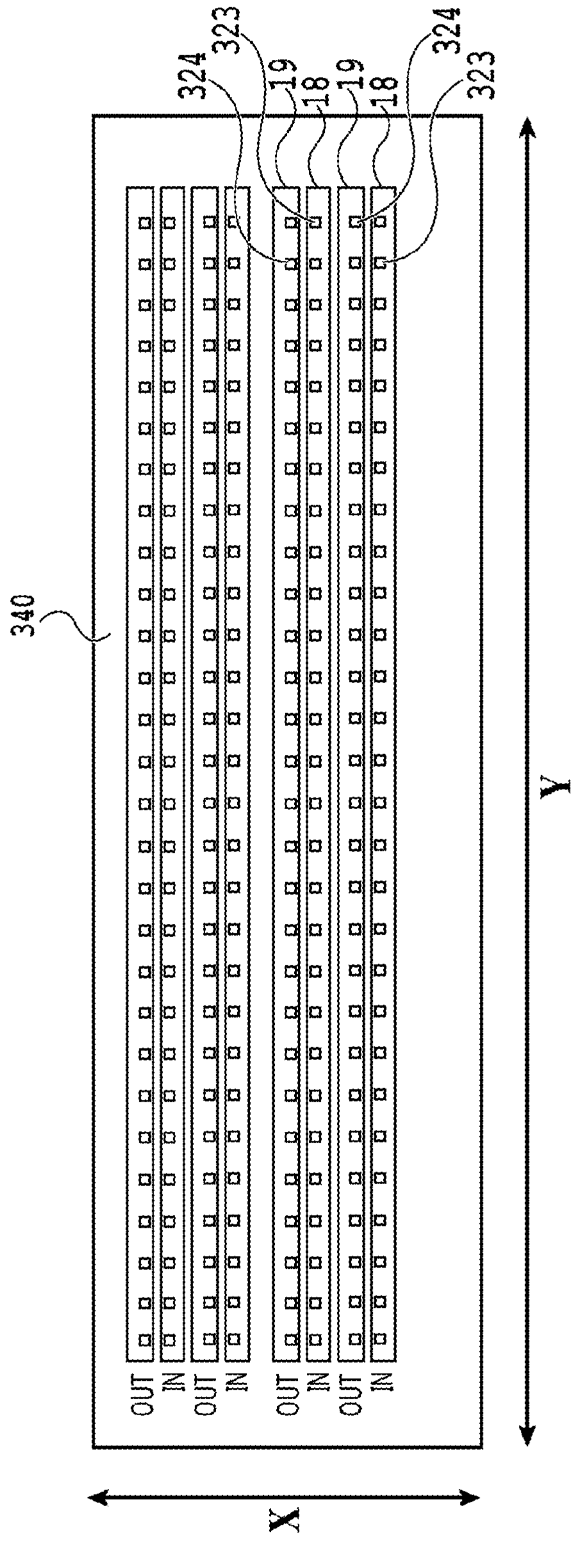
FIG. 13 is a diagram illustrating a discharge element substrate.

FIGS. 11A and 11B are schematic diagrams illustrating the circulation path for one color of ink in the discharge unit 3 of the present embodiment. FIG. 11A is an exploded perspective view of the discharge unit 3 when viewed from the first support member 4 side, and FIG. 11B is an exploded perspective view of the discharge unit 3 when viewed from the discharge module 300 side. Arrows illustrated with IN and OUT in the drawing represent ink flow, and only ink flow of one color will be described, but is the same for the other colors. Illustration of the second support member 7 and the electric wiring member 5 is omitted in FIGS. 11A and 11B, and a description thereof is omitted in the following description of the configuration of the discharge unit. A section along XI-XI in FIGS. 3A and 3B is illustrated for the first support member 4 in FIG. 11A. The discharge module 300 includes a discharge element substrate 340, an opening plate 330, and the discharge port formation unit material 320. FIG. 12 is a diagram illustrating the opening plate 330, and FIG. 13 is a diagram illustrating the discharge element substrate 340.

Ink is supplied to the discharge unit 3 from the circulation unit 54 through the joint member 8 (refer to FIGS. 3A and 3B). The following describes an ink path on which ink returns to the joint member 8 after passing through the joint member 8. Illustration of the joint member 8 is omitted in drawings described below.

As described above, the discharge module 300 includes the discharge element substrate 340, the opening plate 330, and the discharge port formation unit material 320. The discharge element substrate 340 and the opening plate are constituted by the silicon substrate 310. The discharge element substrate 340, the opening plate 330, and the discharge port formation unit material 320 are joined in an overlapping manner such that the flow paths of the respective kinds of ink communicate with each other to form the discharge module 300, and are supported to the first support member 4. The discharge unit 3 is formed when the discharge module 300 is supported to the first support member 4. The discharge element substrate 340 includes the discharge port formation unit material 320, the discharge port formation unit material 320 includes a plurality of discharge port lines in which a plurality of discharge ports 13 are lined, and part of ink supplied through an ink flow path in the discharge module 300 is discharged from the discharge ports 13. The ink not discharged is collected through the ink flow path in the discharge module 300.

As illustrated in FIGS. 11A, 11B, and 12, the opening plate 330 includes a plurality of arrayed ink supply ports 311 and a plurality of arrayed ink collection ports 312. As illustrated in FIGS. 13 and 14A to 14C, the discharge element substrate 340 includes a plurality of arrayed supply connection flow paths 323 and a plurality of arrayed collection connection flow paths 324. The discharge element substrate 340 further includes the common supply flow path 18 communicating with the plurality of supply connection flow paths 323, and the common collection flow path 19 communicating with the plurality of collection connection flow paths 324. The ink flow path in the discharge unit 3 is formed by providing communication between the flow path provided in the discharge module 300 and the corresponding ink supply flow path 48 and the corresponding ink collection flow path 49 (refer to FIGS. 3A and 3B) provided in the first support member 4. A support member supply port 211 (refer to FIGS. 11A and 14A) is a section opening forming the ink supply flow path 48, and a support member collection port 212 (refer to FIGS. 11A and 14B) is a section opening forming the ink collection flow path 49.

Ink supplied to the discharge unit 3 is supplied from the circulation unit 54 (refer to FIG. 3A) side to the ink supply flow path 48 (refer to FIG. 3A) of the first support member 4. The ink flowing through the support member supply port 211 in the ink supply flow path 48 is supplied to the common supply flow path 18 of the discharge element substrate 340 through the ink supply flow path 48 (refer to FIG. 3A) and the ink supply ports 311 of the opening plate 330 and enters the supply connection flow paths 323. The path described up to here forms a supply side flow path. Thereafter, the ink flows to the corresponding collection connection flow path 324 as a collection side flow path through the pressure chamber 12 (refer to FIG. 3B) of the discharge port formation unit material 320. Details of ink flow in the pressure chamber 12 will be described later.

In the collection side flow path, the ink having entered the collection connection flow path 324 flows to the common collection flow path 19. Thereafter, the ink flows from the common collection flow path 19 to the ink collection flow path 49 of the first support member 4 through the ink collection ports 312 of the opening plate 330 and is collected to the circulation unit 54 through the support member collection port 212.

A region in which the ink supply ports 311 and the ink collection ports 312 are not provided in the opening plate 330 corresponds to a region for dividing the support member supply ports 211 and the support member collection port 212 in the first support member 4. In the region, the first support member 4 has no opening. Such a region is used as a bonding region for bonding the discharge module 300 and the first support member 4.

In FIG. 12, a plurality of lines of a plurality of openings arrayed in the X direction are provided in the Y direction in the opening plate 330, and supply (IN) openings and collection (OUT) openings are alternately arrayed in the Y direction with offset of a half pitch in the X direction. In FIG. 13, the common supply flow paths 18 communicating with the plurality of supply connection flow paths 323 arrayed in the Y direction and the common collection flow paths 19 communicating with the plurality of collection connection flow paths 324 arrayed in the Y direction are alternately arrayed in the X direction on the discharge element substrate 340. The common supply flow paths 18 and the common collection flow paths 19 are divided for each kind of ink, and the numbers of disposed common supply flow paths 18 and common collection flow paths 19 are determined in accordance with the number of discharge port lines of each color. The supply connection flow paths 323 and the collection connection flow paths 324 are disposed in numbers corresponding to the number of discharge ports 13. One-to-one correspondence is not necessary, and one supply connection flow path 323 and one collection connection flow path 324 may correspond to a plurality of discharge ports 13.

The opening plate 330 and the discharge element substrate 340 as described above are joined in an overlapping manner such that the flow paths of the respective kinds of ink communicates with one another to form the discharge module 300, and are supported to the first support member 4 to form an ink flow path including supply flow paths and collection flow paths as described above.

Figure 14A:
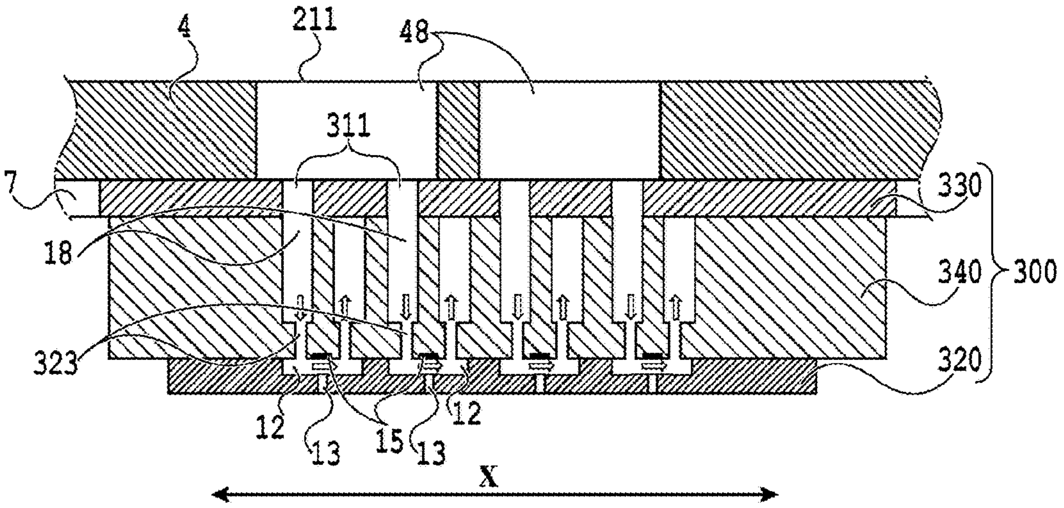
FIGS. 14A, 14B, and 14C are cross-sectional views illustrating ink flow in the discharge unit.
Figure 14B:
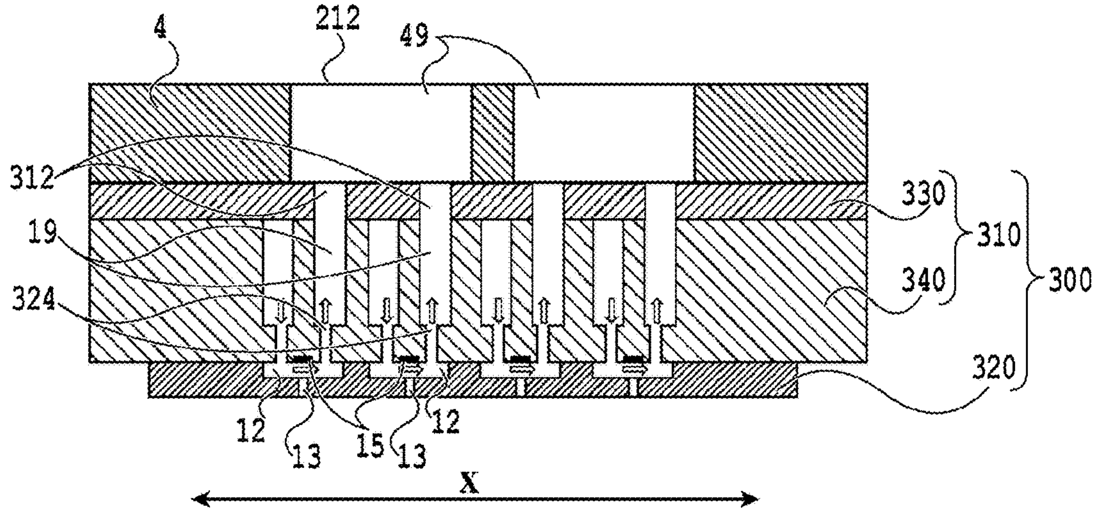
Figure 14C:
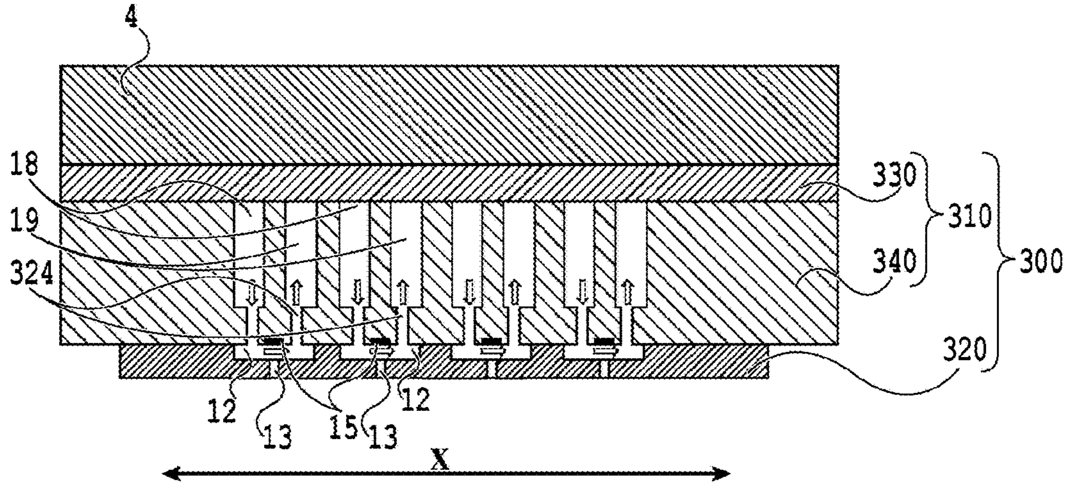

FIGS. 14A to 14C are cross-sectional views illustrating ink flow at different parts of the discharge unit 3. FIG. 14A illustrates a section along line XIVA-XIVA in FIG. 11A, which is a section of a part where the ink supply flow path 48 communicate with the ink supply ports 311 in the discharge unit 3. FIG. 14B illustrates a section along line XIVB-XIVB in FIG. 11A, which is a section of a part where the ink collection flow paths 49 communicate with the ink collection ports 312 in the discharge unit 3. FIG. 14C illustrates a section along line XIVC-XIVC in FIG. 11A, which is a section of a part where the ink supply ports 311 and the ink collection ports 312 do not communicate with flow paths of the first support member 4.

In a supply flow path for supplying ink, as illustrated in FIG. 14A, ink is supplied from a part where the ink supply flow paths 48 of the first support member 4 overlap and communicate with the ink supply ports 311 of the opening plate 330. In a collection flow path for collecting ink, as illustrated in FIG. 14B, ink is collected from a part where the ink collection flow paths 49 of the first support member 4 overlap and communicate with the ink collection ports 312 of the opening plate 330. As illustrated in FIG. 14C, the discharge unit 3 has a partial region where the opening plate 330 is not provided with openings. In such a region, no ink supply nor collection is performed between the discharge element substrate 340 and the first support member 4. Ink supply is performed in a region where the ink supply ports 311 are provided as illustrated in FIG. 14A, and ink collection is performed in a region where the ink collection ports 312 are provided as illustrated in FIG. 14B. In the present embodiment, the configuration including the opening plate 330 is described as an example, but no opening plate 330 may be included. For example, flow paths corresponding to the ink supply flow paths 48 and the ink collection flow paths 49 may be formed in the first support member 4, and the discharge element substrate 340 may be joined to the first support member 4.

Figure 15A:
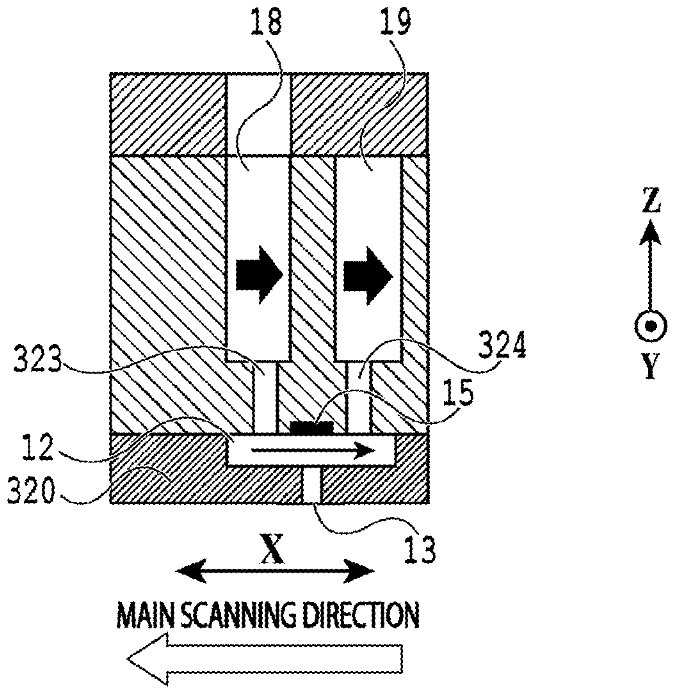
FIGS. 15A and 15B are cross-sectional views illustrating the vicinity of a discharge port.
Figure 15B:
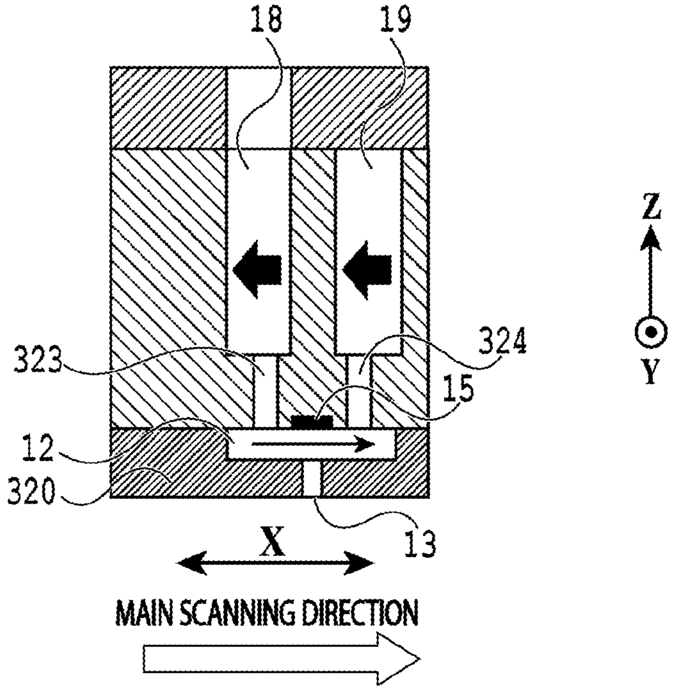
Figure 16A:
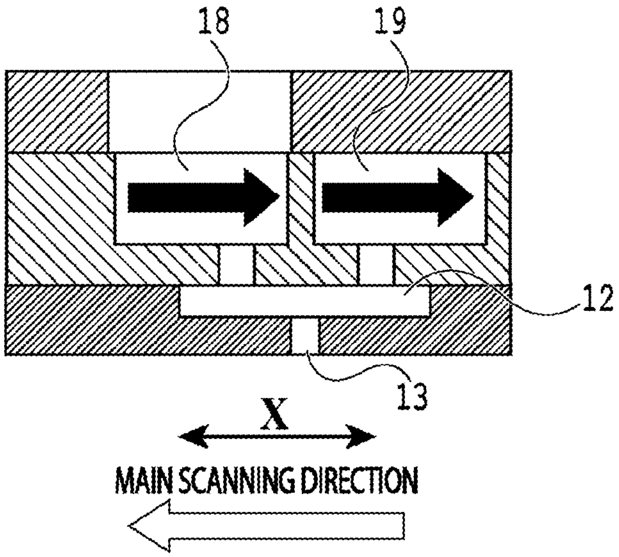
FIGS. 16A and 16B are cross-sectional views illustrating a comparative example of the vicinity of the discharge port.
Figure 16B:
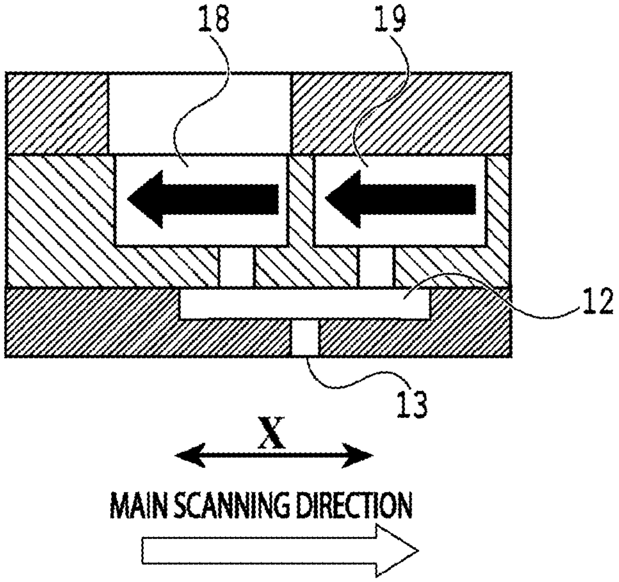

FIGS. 15A and 15B are cross-sectional views illustrating the vicinity of a discharge port 13 in the discharge module 300, and FIGS. 16A and 16B are cross-sectional views illustrating a discharge module of a comparative example having a configuration in which the common supply flow paths 18 and the common collection flow paths 19 are enlarged in the X direction. Thick arrows illustrated in the common supply flow path 18 and the common collection flow path 19 in FIGS. 15A, 15B, 16A, and 16B illustrate ink swing in a form in which the serial-type liquid discharge apparatus 50 is used. Ink supplied to the pressure chamber 12 through the common supply flow path 18 and the supply connection flow path 323 is discharged from the discharge port 13 when the discharge element 15 is driven. When the discharge element 15 is not driven, ink is collected from the pressure chamber 12 to the common collection flow path 19 through the collection connection flow paths 324 as a collection flow path.

In the form in which the serial-type liquid discharge apparatus 50 is used, when circulating ink is discharged in this manner, the ink discharge is more than slightly affected by ink swing in the ink flow path due to main scanning of the liquid discharge head 1. Specifically, influence of ink swing in the ink flow path appears as a difference in the ink discharge amount or difference in the ink discharge direction in some cases. As illustrated in FIGS. 16A and 16B, in a case when the common supply flow path 18 and the common collection flow path 19 have sectional shapes that are wide in the X direction as the main scanning direction, ink in the common supply flow path 18 and the common collection flow path 19 is likely to receive inertial force in the main scanning direction, and a large swing occurs to the ink. As a result, the ink swing potentially affects ink discharge from the discharge port 13. Furthermore, in a case when the common supply flow path 18 and the common collection flow path 19 are enlarged in the X direction, the distance between colors increases and printing efficiency potentially degrades.

Thus, the common supply flow path 18 and the common collection flow path 19 of the present embodiment extend in the Y direction in the sections illustrated in FIGS. 15A and 15B and also extend in the Z direction orthogonal to the X direction as the main scanning direction. With such a configuration, the flow path widths of the common supply flow path 18 and the common collection flow path 19 in the main scanning direction can be reduced. With the reduced flow path widths of the common supply flow path 18 and the common collection flow path 19 in the main scanning direction, ink swing due to inertial force (black thick arrow in the drawing) in a direction opposite the main scanning direction, which acts on ink in the common supply flow path 18 and the common collection flow path 19 during main scanning is reduced. Accordingly, influence of ink swing on ink discharge can be reduced. Moreover, since the common supply flow path 18 and the common collection flow path 19 extend in the Z direction, cross-sectional area is increased to reduce flow path pressure drop.

As described above, the flow path widths of the common supply flow path 18 and the common collection flow path 19 in the main scanning direction are reduced to reduce ink swing in the common supply flow path 18 and the common collection flow path 19 during main scanning, but the swing is not completely eliminated. Thus, in the present embodiment, the common supply flow path 18 and the common collection flow path 19 are disposed at overlapping positions in the X direction to reduce a difference in discharge among the kinds of ink, which is caused by the reduced swing.

As described above, in the present embodiment, there is a correspondence relation that the supply connection flow path 323 and the collection connection flow path 324 are provided for each discharge port 13 and disposed side by side in the X direction with the discharge port 13 interposed therebetween. Thus, the common supply flow path 18 and the common collection flow path 19 do not overlap with each other at some parts in the X direction, and collapse of the correspondence relation between the supply connection flow path 323 and the collection connection flow path 324 in the X direction affects ink flow and discharge in the X direction in the pressure chamber 12. With influence of ink swing as well, ink discharge from each discharge port is potentially further affected.

Thus, the common supply flow path 18 and the common collection flow path 19 are disposed at overlapping positions in the X direction so that ink swing during main scanning is substantially equivalent in the common supply flow path 18 and the common collection flow path 19 at any position in the Y direction in which the discharge ports 13 are arrayed. As a result, a differential pressure that occurs between the common supply flow path 18 side and the common collection flow path 19 side in the pressure chamber 12 is not large and stable discharge can be performed.

In a liquid discharge head in which ink circulates, flow paths for ink supply to and collection from the liquid discharge head are the same flow path, but, in the present embodiment, the common supply flow path 18 and the common collection flow path 19 are separate flow paths. The supply connection flow path 323 communicates with the pressure chamber 12, the pressure chamber 12 communicates with the collection connection flow path 324, and ink is discharged from the discharge port 13 of the pressure chamber 12. Accordingly, the pressure chamber 12 as a path connecting the supply connection flow path 323 and the collection connection flow path 324 includes the discharge port 13. Thus, ink flow that flows from the supply connection flow path 323 side to the collection connection flow path 324 side occurs in the pressure chamber 12, and ink in the pressure chamber 12 is efficiently circulated. Since ink in the pressure chamber 12 is efficiently circulated, ink in the pressure chamber 12, which is likely to be affected by ink evaporation from the discharge port 13, can be maintained in a fresh state.

Since the two flow paths of the common supply flow path 18 and the common collection flow path 19 communicate with the pressure chamber 12, ink can be supplied from both flow paths in a case when discharge needs to be performed at a high flow rate. Specifically, with the configuration in the present embodiment, it is possible not only to efficiently perform circulation as compared to a configuration in which ink supply and collection are achieved by one flow path but also to handle discharge at a high flow rate.

Moreover, influence of ink swing is less likely to occur in a case when the common supply flow path 18 and the common collection flow path 19 are disposed at closer positions in the X direction. The distance between the flow paths is preferably 75 μm to 100 μm.

Figure 17:
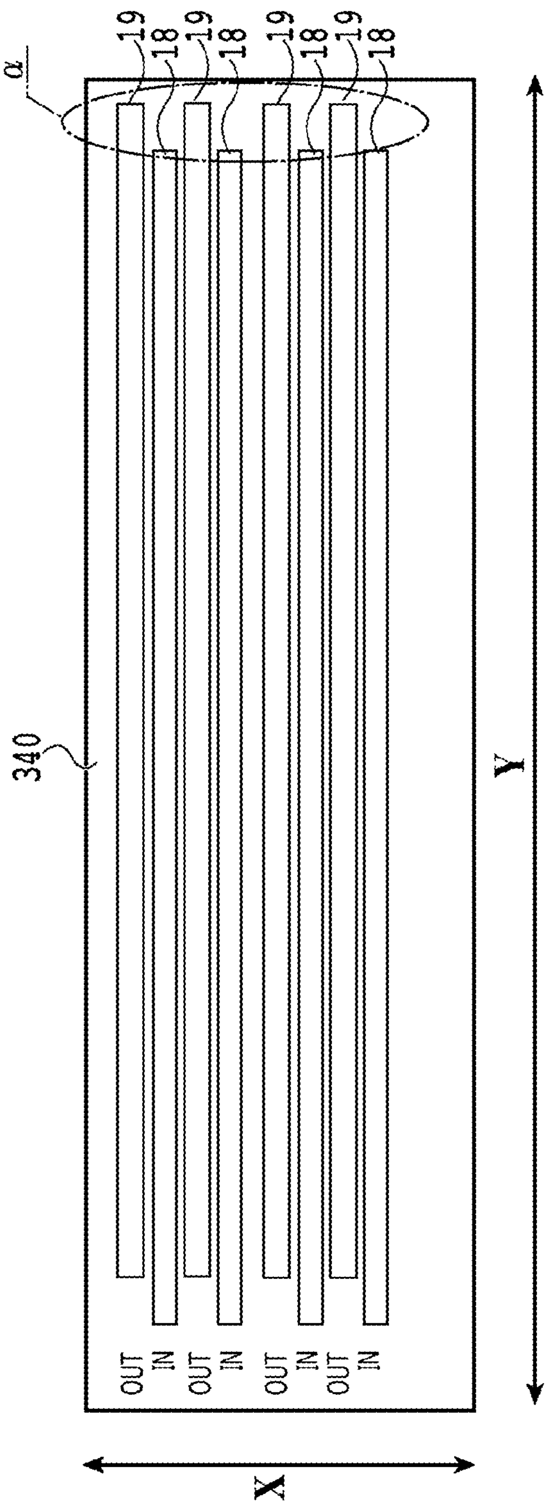
FIG. 17 is a diagram illustrating a comparative example of the discharge element substrate.

FIG. 17 is a diagram illustrating the discharge element substrate 340 as the comparative example. In FIG. 17, illustration of the supply connection flow paths 323 and the collection connection flow paths 324 is omitted. Ink having received thermal energy from the discharge element 15 in the pressure chamber 12 flows into the common collection flow paths 19, and, accordingly, ink having a temperature higher than the temperature of ink in the common supply flow paths 18 flows. In the comparative example, only the common collection flow paths 19 exist at part of the discharge element substrate 340 in the X direction as in an α part surrounded by a dashed and single-dotted line in FIG. 17. In this case, temperature locally increases at the part, and temperature unevenness occurs in the discharge module 300 and potentially affects discharge.

Ink having a temperature lower than that in the common collection flow path 19 flows in the common supply flow path 18. Thus, in a case when a common supply flow path 18 and a common collection flow path 19 are adjacent to each other, temperature in the vicinity thereof is partially compensated for between the common supply flow path 18 and the common collection flow path 19, and, accordingly, temperature increase is reduced. Thus, the common supply flow path 18 and the common collection flow path 19 preferably have substantially equal lengths, exist at positions overlapping with each other in the X direction, and are adjacent to each other.

Figure 18A:
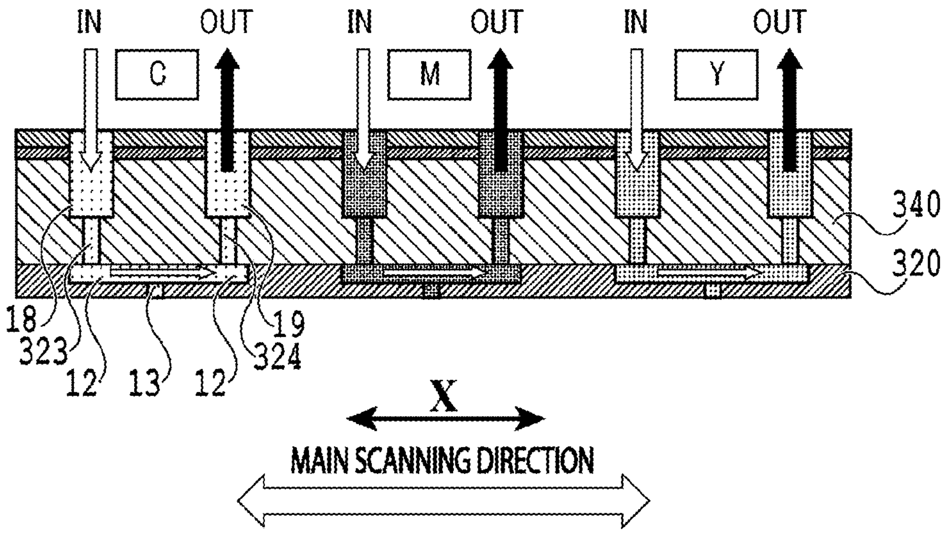
FIGS. 18A and 18B are diagrams illustrating a flow path configuration of the liquid discharge head.
Figure 18B:
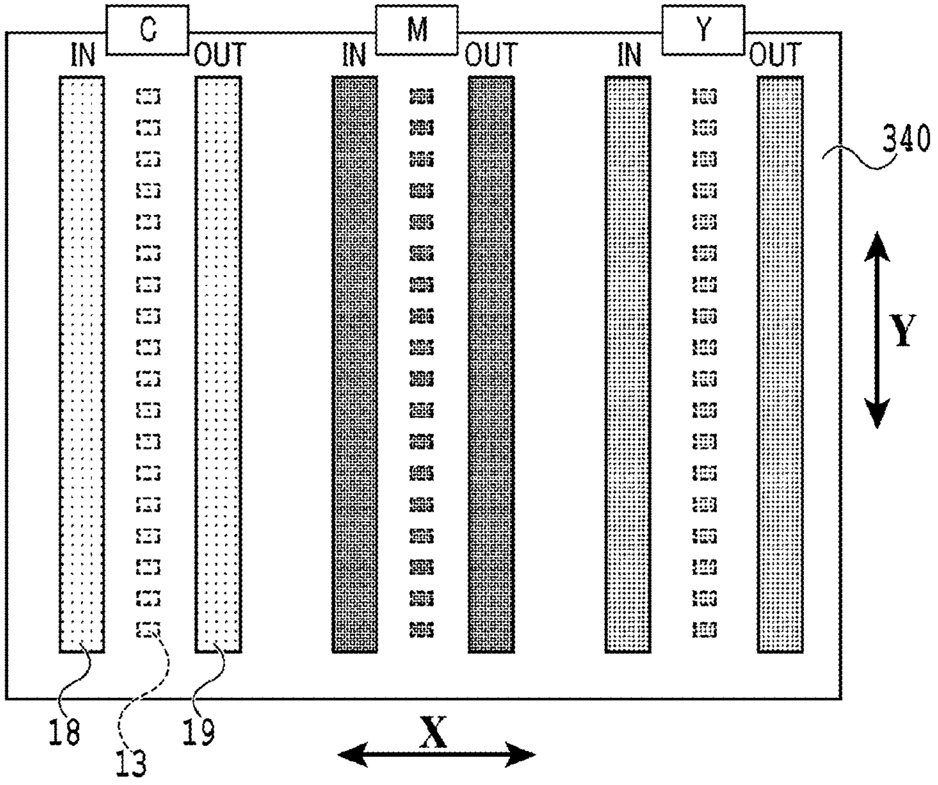

FIGS. 18A and 18B are diagrams illustrating a flow path configuration of the liquid discharge head 1 compatible with ink in three colors of cyan (C), magenta (M), and yellow (Y). In the liquid discharge head 1, a circulation flow path is provided for each kind of ink as illustrated in FIG. 18A. The pressure chambers 12 are provided in the X direction as the main scanning direction of the liquid discharge head 1. As illustrated in FIG. 18B, the common supply flow paths 18 and the common collection flow paths 19 are provided along the discharge port lines in which the discharge ports 13 are arrayed, and the common supply flow paths 18 and the common collection flow paths 19 extend in the Y direction, sandwiching the discharge port lines.

<Connection Between Body Part and Liquid Discharge Head>

Figure 19:
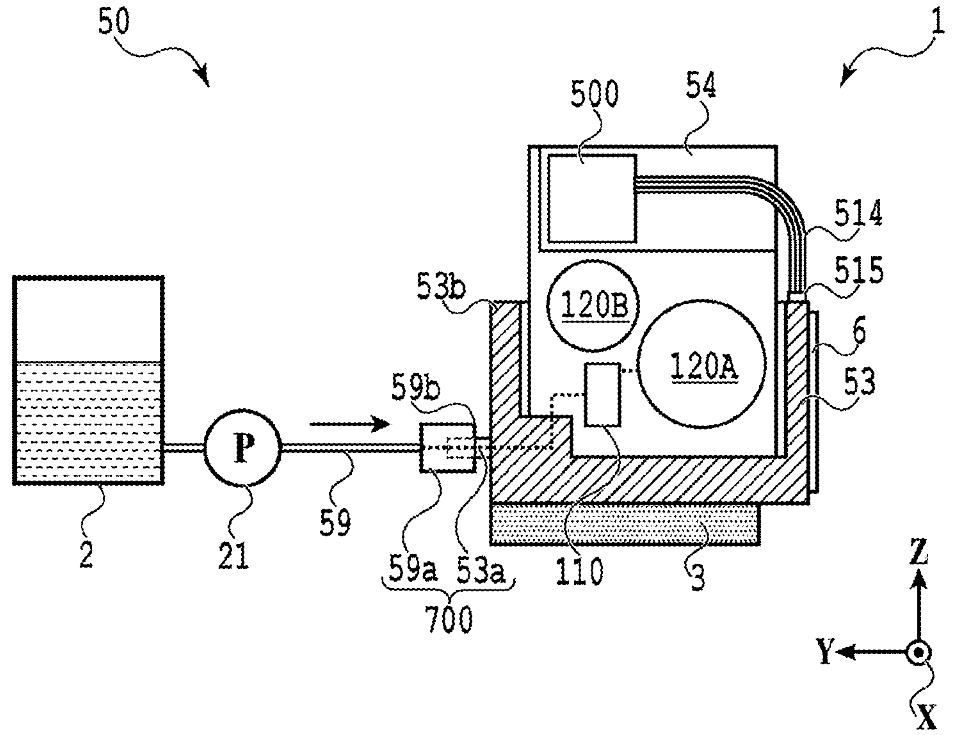
FIG. 19 is a diagram illustrating a connection state of a body part of the liquid discharge apparatus and the liquid discharge head.

FIG. 19 is a schematic configuration diagram illustrating a connection state of an ink tank 2 and an external pump 21, which are provided at a body part of the liquid discharge apparatus 50 of the present embodiment, and the liquid discharge head 1, and disposition of the circulation pump, and the like, in more detail. The liquid discharge apparatus 50 in the present embodiment has a configuration with which only the liquid discharge head 1 can be easily replaced in a case when failure has occurred to the liquid discharge head 1. Specifically, a liquid connection part 700 with which connection and disconnection between an ink supply tube 59 connected to the external pump 21 and the liquid discharge head 1 can be easily performed is included. With this configuration, only the liquid discharge head 1 can be easily connected to and disconnected from the liquid discharge apparatus 50.

As illustrated in FIG. 19, the liquid connection part 700 includes a liquid connector insertion port 53*a* provided as an extension at the head housing 53 of the liquid discharge head 1, and a cylindrical liquid connector 59*a* into which the liquid connector insertion port 53*a* can be inserted. The liquid connector insertion port 53*a* is fluidically connected to an ink supply flow path formed in the liquid discharge head 1 and connected to the first pressure adjuster 120A through the above-described filter 110. The liquid connector 59*a* is provided at the distal end of the ink supply tube 59 connected to the external pump 21 configured to pressurize and supply ink in the ink tank 2 to the liquid discharge head 1.

As described above, connection, disconnection, and replacement work of the liquid discharge head 1 illustrated in FIG. 19 can be easily performed by using the liquid connection part 700. However, ink pressurized and supplied by the external pump 21 potentially leaks from the liquid connection part 700 in a case when sealing of the liquid connector insertion port 53*a* and the liquid connector 59*a* degrades. Failure potentially occurs to an electric system in a case when the leaked ink adheres to the circulation pump 500, or the like. Thus, in the present embodiment, the circulation pump, and the like, are disposed as described below.

<Disposition of Circulation Pump and the Like>

As illustrated in FIG. 19, in the present embodiment, the circulation pump 500 is disposed higher than the liquid connection part 700 in the direction of gravity to avoid ink leaked from the liquid connection part 700 from adhering to the circulation pump 500. Specifically, the circulation pump 500 is disposed higher than the liquid connector insertion port 53*a* as a liquid introduction port of the liquid discharge head 1 in the direction of gravity. Moreover, the circulation pump 500 is disposed at a position contacting no member included in the liquid connection part 700. Accordingly, in a case when ink leaks from the liquid connection part 700, the ink flows in the horizontal direction as an opening direction of the liquid connector 59*a* or downward in the direction of gravity, and thus can be prevented from reaching the circulation pump 500 positioned upward in the direction of gravity. Since the circulation pump 500 is disposed at a position separated from the liquid connection part 700, the probability that the ink reaches the circulation pump 500 through members is lowered.

In addition, an electrical connection part 515 that electrically connects the circulation pump 500 and the electric contact substrate 6 through a flexible wiring member 514 is provided higher than the liquid connection part 700 in the direction of gravity. Thus, the probability that an electric trouble occurs due to ink from the liquid connection part 700 can be lowered.

In the present embodiment, a wall part 52*b* of the head housing 53 is provided. In a case when ink has ejected from an opening 59*b* of the liquid connection part 700, the ink can be blocked by the wall part 52*b*, thereby lowering the probability that the ink reaches the circulation pump 500 and the electrical connection part 515.

<Ink Backflow Near Discharge Port>

Figure 20A:
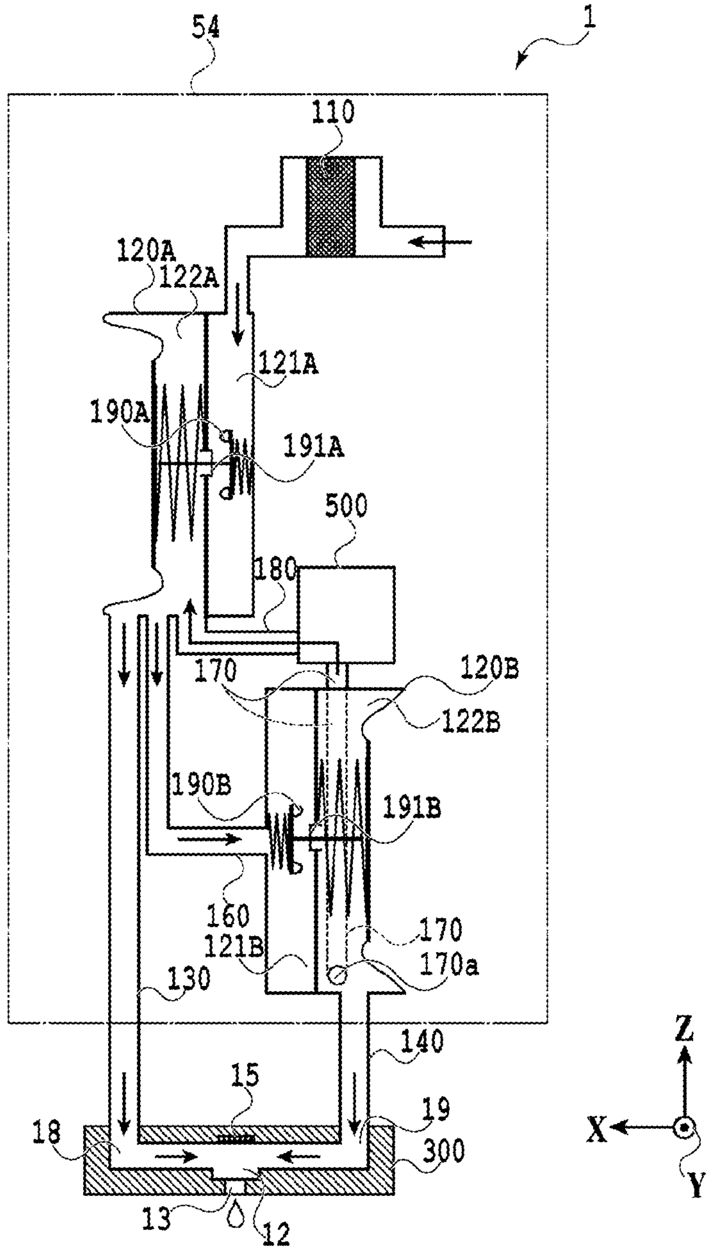
FIGS. 20A and 20B are diagrams schematically illustrating ink backflow near the discharge port.
Figure 20B:
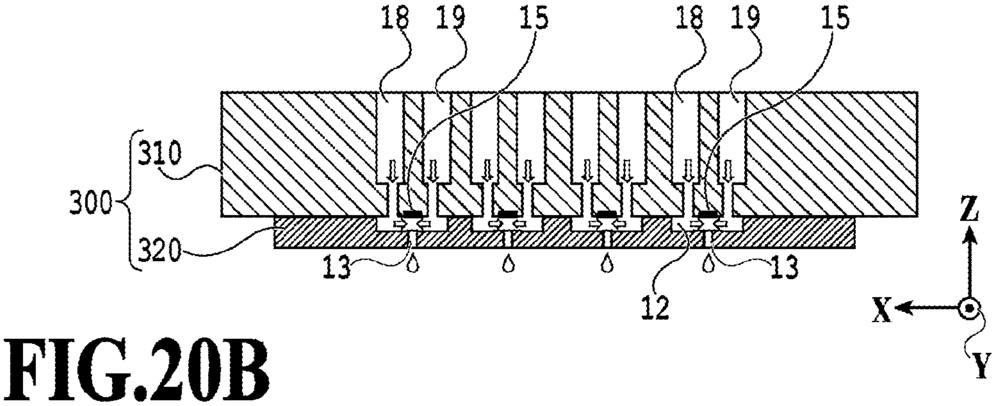

Characteristic parts of the present disclosure will be described below. FIGS. 20A and 20B are diagrams schematically illustrating ink backflow near the discharge ports. FIG. 20A illustrates ink backflow in the longitudinal sectional view illustrating a circulation path in FIG. 5, and FIG. 20B illustrates ink backflow in the enlarged cross-sectional view of a discharge module in FIG. 3B. FIGS. 5 and 3B illustrate flow that ink in the pressure chamber 12 flows in from the common supply flow path 18, passes through the pressure chamber 12, and flows out of the common collection flow path 19. As described above, in a case when printing is continued at high duty, ink flows back to the pressure chamber 12 also from the collection flow path 140 side as illustrated in FIGS. 20A and 20B. Accordingly, the pressure chamber 12 is refilled with ink from both the supply flow path 130 (common supply flow path 18) and the collection flow path 140 (common collection flow path 19) as illustrated in FIGS. 20A and 20B. Specifically, ink supplied from the first pressure control chamber 122A to the bypass flow path 160 is supplied to the second pressure control chamber 122B through the second valve chamber 121B of the second pressure adjuster 120B. Then, part of the ink supplied to the second pressure control chamber 122B is supplied to the collection flow path 140 and supplied to the discharge port 13 through the common collection flow path 19.

Figure 21A:
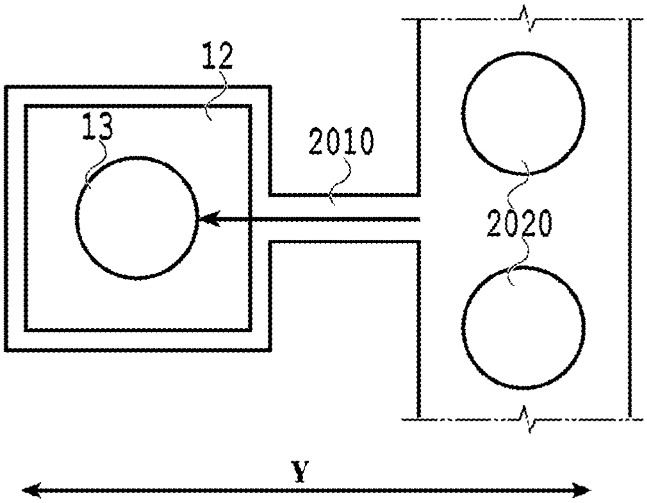
FIGS. 21A and 21B are diagrams for description of ink supply in the discharge module.
Figure 21B:
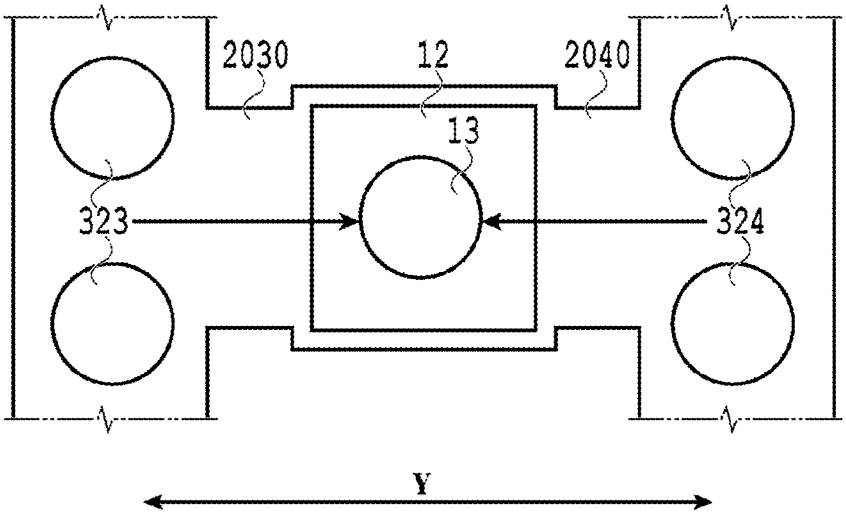

FIGS. 21A and 21B are diagrams for a description of ink supply in the discharge module 300. FIG. 21A is a diagram illustrating a flow path configuration near the pressure chamber 12 and is a diagram illustrating a comparative example different from the present embodiment. In FIG. 21A, only one side of the pressure chamber 12 communicates with a flow path 2010. This configuration corresponds to one-side supply that ink supply to the pressure chamber 12 is performed only from the flow path 2010. In the configuration illustrated in FIG. 21A, an independent supply port 2020 communicating with the pressure chamber 12 is connected to one or both of the common supply flow path 18 and the common collection flow path 19. In a case when a discharge element of a thermal scheme is used as the discharge element 15, in particular, ink is discharged from the discharge port 13 by foaming in the pressure chamber 12. In addition, the pressure chamber 12 is refilled with ink by defoaming in accordance with the foaming. In such a flow path configuration, the width of the flow path 2010 connected to the pressure chamber 12 is decreased or the length thereof is increased to increase backward resistance at the foaming. Accordingly, the foaming approaches symmetric and droplet formation improves. However, with the configuration as illustrated in FIG. 21A, supply easiness at ink refill of the pressure chamber 12 at defoaming after discharge degrades since the backward resistance is increased. Thus, it is typically difficult to improve refill frequency with the flow path configuration illustrated in FIG. 21A. In particular, in a case when the print operation is performed at high duty, the amount of ink supplied to the discharge port 13 decreases and discharge stability potentially decreases.

FIG. 21B is a diagram illustrating a flow path configuration near the pressure chamber 12 in the present embodiment. The supply connection flow paths 323 as first independent supply ports connect a first liquid flow path 2030 communicating with the pressure chamber 12 to the common supply flow path 18. The collection connection flow paths 324 as second independent supply ports connect a second liquid flow path 2040 communicating with the pressure chamber 12 to the common collection flow path 19. As described above, in the present embodiment, refill for ink discharged from the discharge port 13 is performed from the first liquid flow path 2030 and the second liquid flow path 2040. As illustrated in FIG. 21B, the respective sides of the pressure chamber 12 communicate with the first liquid flow path 2030 and the second liquid flow path 2040, which is a both-side supply configuration. In such a configuration, as illustrated in FIG. 21B, foaming is likely to approach symmetric because of the symmetric property of the backward resistance at the foaming even when the width of a flow path communicating with the pressure chamber 12 is increased or the length thereof is decreased. Accordingly, ink droplet formation is likely to improve. Moreover, the backward resistance does not need to be increased at ink refill of the pressure chamber 12 at defoaming after discharge, and thus ink supply easiness can be improved. In this manner, according to the present embodiment, discharge stability can be improved even when the print operation is performed at high duty. In other words, droplet formation improvement and refill frequency improvement can be both achieved.

The above-described embodiment is described mainly for the case where a discharge element of the thermal scheme is used, but a discharge element of a piezo scheme may be used. However, with the thermal scheme, it is more difficult to achieve both droplet formation improvement and refill frequency improvement, and thus the present embodiment is more preferable for the thermal scheme.

<Modifications>

The following describes various modifications of the above-described embodiment. In a configuration in which ink flows back from the collection flow path 140 toward the pressure chamber 12, the bypass flow path 160 needs to be provided and no mechanism that functions as a check valve needs to be provided between the pressure chamber 12 and a merging part of the bypass flow path 160 and the collection flow path 140. In the present embodiment, since the circulation pump 500 is a pump that transfers liquid in one direction as described above, the merging part of the bypass flow path 160 needs to be provided on the upstream side of the circulation pump 500.

<Configuration (1) for Shortening First Print Out Time>

An elastic part of a valve will be described below with reference to FIGS. 7A to 7C, 22A, and 22B. As in <Pressure Adjuster> described above, the following description is made with the first pressure adjuster 120A as an example, but is also applicable to the second pressure adjuster 120B. Thus, for the second pressure adjuster 120B, the first valve chamber 121A described below is interpreted as the second valve chamber 121B, and the first pressure control chamber 122A is interpreted as the second pressure control chamber 122B. In addition, the first communication port 191A, the first valve shaft 192A, the first valve spring 200A, and the first pressure plate 210A are interpreted as the second communication port 191B, the second valve shaft 192B, the second valve spring 200B, and the second pressure plate 210B. Further, the first pressure adjustment spring 220A and the first flexible member 230A are interpreted as the second pressure adjustment spring 220B and the second flexible member 230B. Furthermore, a first elastic part 901A is interpreted as a second elastic part 901B.

The first elastic part 901A of the first valve 190A is disposed to enclose a peripheral part of the first communication port 191A when the first communication port 191A is to be blocked. When the first communication port 191A is to be blocked, the first elastic part 901A of the first valve 190A contacts the peripheral part of the first communication port 191A of the partition 123 by the spring force of the first valve spring 200A, thereby blocking the first communication port 191A. Thus, the first elastic part 901A elastically deforms in a pressing direction by the spring force of the first valve spring 200A to increase close contact with the peripheral part of the first communication port 191A, thereby maintaining the blocking state.

Figure 22B:
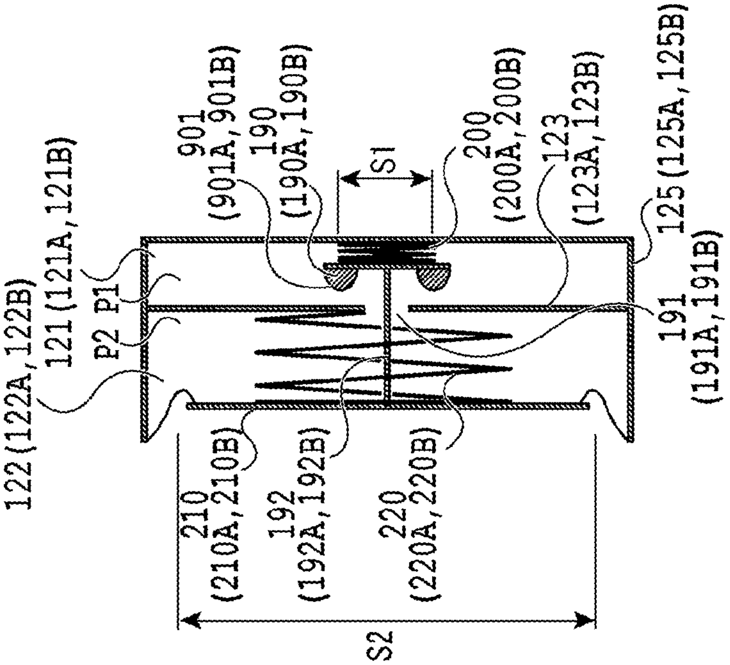
FIGS. 22A and 22B are cross-sectional views illustrating an example of the pressure adjuster.
Figure 22A:
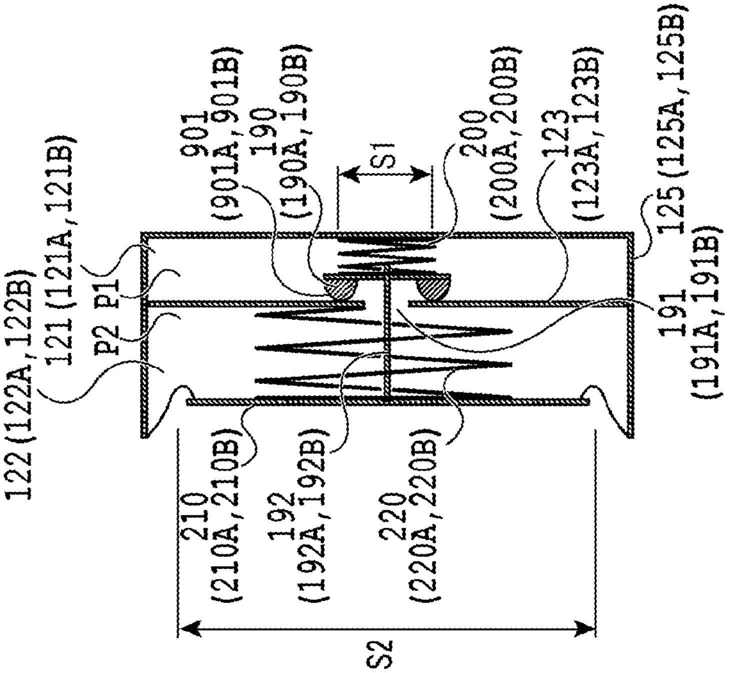

The following describes the pressure P2 in the first pressure control chamber 122A when the first elastic part 901A elastically deforms. As indicated by Expressions 1 to 4 described above, the pressure P2 in the first pressure control chamber 122A is determined by force balance relating to the pressing forces of pressing members such as the first pressure adjustment spring 220A and the first valve spring 200A and the pressure receiving areas S1 and S2. Force balance in a state in which the first pressure plate 210A contacts the first valve 190A and the first elastic part 901A of the first valve 190A contacts the partition 123 at the peripheral part of the first communication port 191A and elastically deforms as illustrated in FIG. 22A is given by an expression below.

$$P2\times S2+F2+(P1-P2)\times S1+F1-F4=0 \tag{5}$$

Expression 5 can be rewritten for P2 as follows.

$$P2=-(F1+F2-F4+P1\times S1)/(S2-S1) \tag{6}$$

- P1: pressure (gauge pressure) in the first valve chamber 121A
- P2: pressure (gauge pressure) in the first pressure control chamber 122A
- F1: spring force of the first valve spring 200A
- F2: spring force of the first pressure adjustment spring 220A
- F4: elastic force of the first elastic part 901A of the first valve 190A
- S1: pressure receiving area of the first valve 190A
- S2: pressure receiving area of the first pressure plate 210A The spring force F1 of the first valve spring 200A, the spring force F2 of the first pressure adjustment spring 220A, and the elastic force F4 of the first elastic part 901A of the first valve 190A are positive in a direction (the left direction in FIGS. 22A and 22B) in which the first valve spring 200A presses the first valve 190A.

The pressure P2 in the first pressure control chamber 122A satisfies the force balance relation of Expression 4 in a state (FIG. 7A) in which the first pressure plate 210A is not in contact with the first valve 190A. The pressure P2 in the first pressure control chamber 122A satisfies the force balance relation of Expression 6 when the first pressure plate 210A is displaced in a direction in which the volume of the first pressure control chamber 122A decreases, and the first pressure plate 210A contacts the first valve 190A (FIG. 22A). Then, when the first pressure plate 210A is further displaced in the direction in which the volume of the first pressure control chamber 122A decreases, transition occurs to a state (FIG. 7B or FIG. 22B) in which the first elastic part 901A of the first valve 190A is separated from the peripheral part of the first communication port 191A. In this state, the pressure P2 in the first pressure control chamber 122A satisfies the force balance relation of Expression 2. Thus, along with transition from the state illustrated in FIG. 7A through the state illustrated in FIG. 22A to the state illustrated in FIG. 7B or FIG. 22B, the pressure P2 in the first pressure control chamber 122A sequentially satisfies Expressions 4, 6, and 2 of the force balance relation. Along with the opposite transition from the state illustrated in FIG. 7B or FIG. 22B through the state illustrated in FIG. 22A to the state illustrated in FIG. 7A, the pressure P2 in the first pressure control chamber 122A sequentially satisfies Expressions 2, 6, and 4 of the force balance relation. This is the same for the second pressure control chamber 122B.

Figure 23:
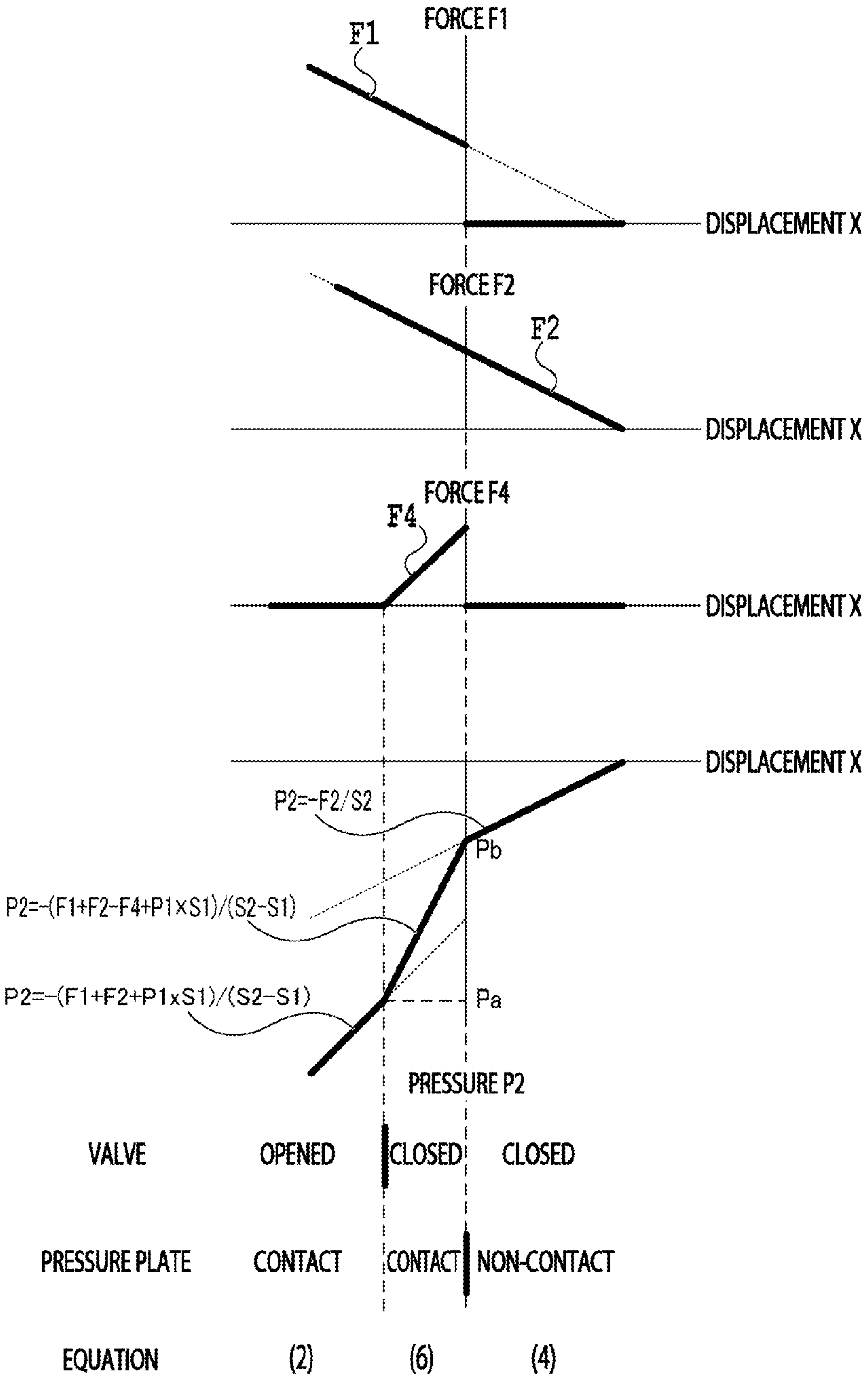
FIG. 23 is a graph illustrating the relation between displacement of a pressure plate and pressure in a pressure control chamber in the pressure adjuster.

FIG. 23 is a collection of the above-described relations. FIG. 23 is described from right to left. The pressure P2 in the first pressure control chamber 122A satisfies the force balance equation of Expression 4 when the pressure P2 in the second pressure control chamber 122B is high (negative pressure is weak), the valve is in a closed state, and the pressure plate 210 is not in contact with the valve 190 as illustrated in FIG. 7A. A state as illustrated in FIG. 22A is reached when the pressure P2 in the second pressure control chamber 122B decreases (negative pressure becomes strong). Specifically, the valve 190 remains in a closed state but the pressure plate 210 is in contact with the valve 190. In this case, the pressure P2 in the first pressure control chamber 122A satisfies the force balance equation of Expression 6. A state as illustrated in FIG. 7B or FIG. 22B is reached when the pressure P2 in the first pressure control chamber 122A further decreases (negative pressure becomes stronger). Specifically, the first pressure plate 210A remains in contact with the first valve 190A but the first valve 190A changes from a closed state to an opened state. In this case, the pressure P2 in the first pressure control chamber 122A satisfies the balance equation of Expression 2.

The first valve spring 200A, the first pressure adjustment spring 220A, and the first elastic part 901A of the first valve 190A have spring characteristics. Thus, these spring characteristics are synthesized so that the pressure P2 in the first pressure control chamber 122A has a characteristic connecting three straight lines with different gradients as illustrated in FIG. 23. The gradient of a straight line is maximum when the pressure P2 in the first pressure control chamber 122A obeys Expression 6, and the gradient decreases in the order of a case Expression 2 is obeyed and a case when Expression 4 is obeyed.

Figure 24A:
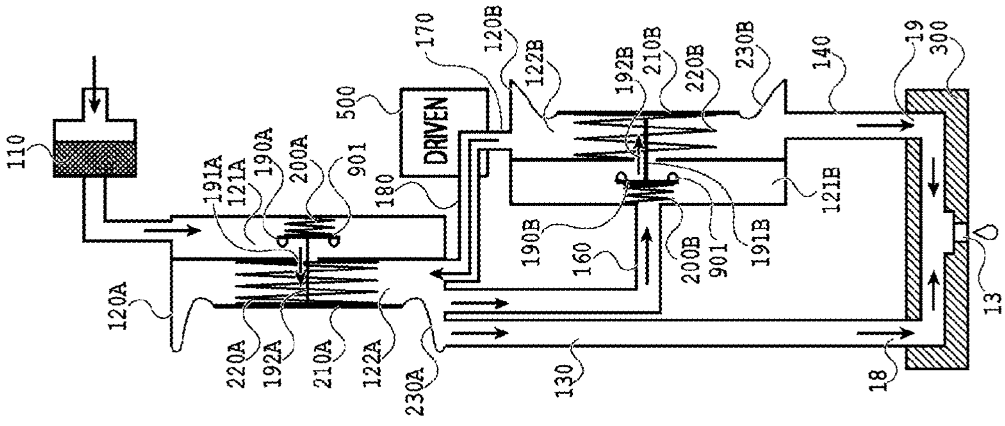
FIGS. 24A, 24B, and 24C are diagrams for description of the state of the liquid discharge head and ink flow in the liquid discharge head.
Figure 24B:
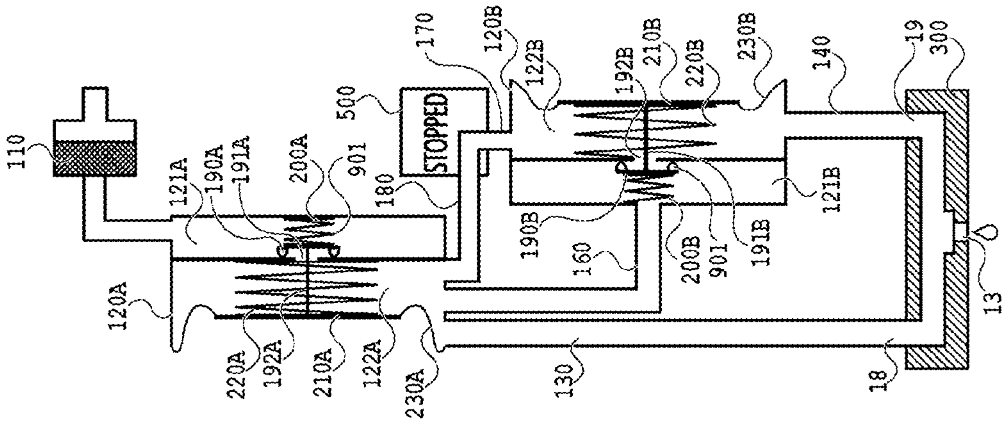
Figure 24C:
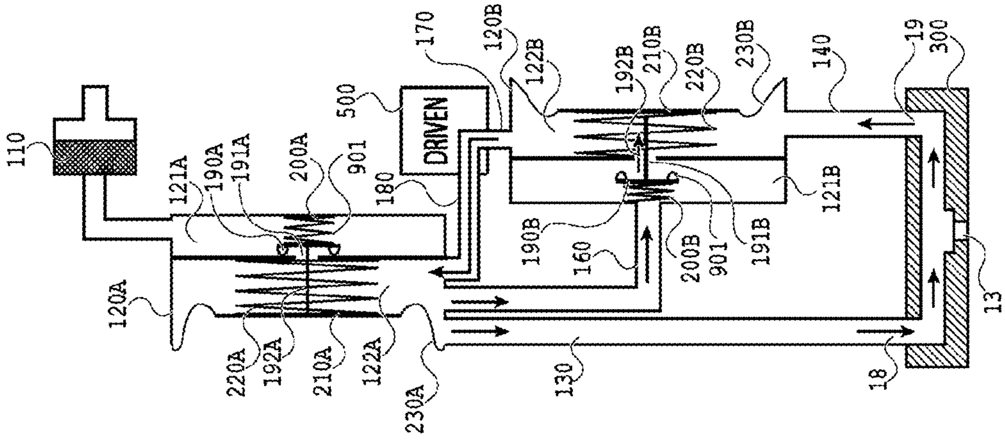

FIG. 24A illustrates the circulation unit 54 in a printing state. FIG. 24B illustrates the circulation unit 54 in a printing stop state and a circulation stop state (standby state). Ink discharge from the discharge port is stopped while printing is stopped. The circulation pump 500 is stopped to set the circulation stop state. FIG. 24C illustrates the circulation unit 54 in a circulation state (printing possible state). The following describes pressure P2$a$ in the first pressure control chamber 122A of the first pressure adjuster 120A and pressure P2$b$ in the second pressure control chamber 122B of the second pressure adjuster 120B with reference to FIGS. 24A to 24C. The following also describes motion of the first pressure plate 210A of the first pressure adjuster 120A and motion of the second pressure plate 210B of the second pressure adjuster 120B with reference to FIGS. 24A to 24C.

As illustrated in FIG. 24A, in the printing state, the circulation pump 500 is in an "ON" state (drive state) as described above, and ink having flowed out of the first pressure control chamber 122A flows into the supply flow path 130 and the bypass flow path 160. The ink having flowed into the supply flow path 130 is supplied to the discharge port 13 through the common supply flow path 18.

The ink having flowed into the bypass flow path 160 from the first pressure control chamber 122A flows into the second pressure control chamber 122B through the second valve chamber 121B. Part of the ink having flowed into the second pressure control chamber 122B passes through the pump entrance flow path 170, the circulation pump 500, and the pump exit flow path 180 and then flows into the first pressure control chamber 122A again. The remaining part flows into the collection flow path 140 and is supplied to the discharge port 13 through the common collection flow path 19. In this state, the first communication port 191A and the second communication port 191B are both in an opened state. In other words, the first valve 190A and the second valve 190B are both in an opened state. Thus, the pressures P2$a$ and P2$b$ of the first pressure control chamber 122A and the second pressure control chamber 122B maintain the balance of Expression 2. In this state, the pressure P2$a$ in the first pressure control chamber 122A and the pressure P2$b$ in the second pressure control chamber 122B have differential pressure therebetween at a certain level or higher. With the differential pressure, ink circulation can be performed from the first pressure control chamber 122A on the high pressure side to the second pressure control chamber 122B on the low pressure side.

When printing is stopped and the circulation pump 500 is stopped, the state illustrated in FIG. 24A becomes the printing stop and circulation stop state (standby state) as illustrated in FIG. 24B. At the initial time point when printing is stopped and the circulation pump 500 becomes "OFF", the pressure P2$a$ in the first pressure control chamber 122A and the pressure P2$b$ in the second pressure control chamber 122B are both control pressure during printing. Accordingly, ink movement occurs from the first pressure control chamber 122A on the high pressure side to the second pressure control chamber 122B on the low pressure side in accordance with the differential pressure between the pressure P2$a$ in the first pressure control chamber 122A and the pressure P2$b$ in the second pressure control chamber 122B. Specifically, ink flow that ink is supplied from the first pressure control chamber 122A to the discharge module 300 through the supply flow path 130 and thereafter reaches the second pressure control chamber 122B through the collection flow path 140 continuously occurs. In addition, ink flow from the first pressure control chamber 122A to the second pressure control chamber 122B through the bypass flow path 160 and the second valve chamber 121B continuously occurs. Ink in an amount equal to the amount of ink having moved from the first pressure control chamber 122A to the second pressure control chamber 122B through these ink flows is supplied from the ink tank 2 to the first pressure control chamber 122A through the filter 110 and the first valve chamber 121A. Accordingly, the amount of content in the first pressure control chamber 122A is maintained constant. In a case when Expression 2 is applied, spring force F1$a$ of the first valve spring 200A, spring force F2$a$ of the first pressure adjustment spring 220A, pressure receiving area S1$a$ of the first valve 190A, and pressure receiving area S2$a$ of the first pressure plate 210A are maintained constant when the amount of content in the first pressure control chamber 122A is constant. Thus, the pressure P2$a$ in the first pressure control chamber 122A is determined in accordance with a change of pressure P1$a$ in the first valve chamber 121A. Accordingly, when there is no change of the pressure P1$a$ in the first valve chamber 121A, the pressure P2$a$ in the first pressure control chamber 122A is maintained at the same pressure as the control pressure during the print operation. The pressure P1$a$ in the first valve chamber 121A is typically constant. Thus, the pressure P2$a$ in the first pressure control chamber 122A is typically maintained at the same pressure as the control pressure during the print operation.

The pressure P2$b$ in the second pressure control chamber 122B temporally changes in accordance with change of the inner capacity of the second pressure control chamber 122B along with ink inflow from the first pressure control chamber 122A. Specifically, the second pressure plate 210B is gradually displaced in a direction in which the inner capacity of the second pressure control chamber 122B increases in accordance with ink inflow from the first pressure control chamber 122A, and, accordingly, the pressure P2$b$ in the second pressure control chamber 122B gradually increases (becomes weaker as negative pressure).

When the pressure P2$b$ in the second pressure control chamber 122B becomes equal to the pressure P2$a$ in the first pressure control chamber 122A, ink inflow from the first pressure control chamber 122A to the second pressure control chamber 122B stops and a stationary state is reached. In a state in which ink inflow to the second pressure control chamber 122B stop, ink inflow from the first valve chamber 121A to the first pressure control chamber 122A stops as well. Thus, the first valve 190A is closed, the first communication port 191A becomes a closed state, and the pressure P2$a$ in the first pressure control chamber 122A becomes a value determined by the above-described relation of Expression 6. In the stationary state, the pressure P2$b$ in the second pressure control chamber 122B is equal to the pressure P2$a$ in the first pressure control chamber 122A when the first valve 190A is closed and the first communication port 191A becomes a closed state.

The pressure P2$b$ in the second pressure control chamber 122B right before the second pressure plate 210B and the second valve 190B become a non-contact state from a contact state is determined by the relation of Expression 6. The pressure P2$b$ in the second pressure control chamber 122B right after the second pressure plate 210B and the second valve 190B becomes a non-contact state from a contact state is determined by the relation of Expression 4. As illustrated in FIG. 23, the pressure P2$b$ determined by Expression 6 and the pressure P2$b$ determined by Expression 4 are continuous at the boundary between the contact and non-contact states of the second pressure plate 210B and the second valve 190B. The pressure P2$b$ in the second pressure control chamber 122B when the second pressure plate 210B and the second valve 190B switch from a contact state to a non-contact state can be adjusted.

Pressure PX can be defined as follows. The first valve 190A is in an opened state in a case where the pressure in the first pressure control chamber 122A is lower than PX, and the first valve 190A satisfies a closed state in a case when the pressure in the first pressure control chamber 122A is equal to or higher than PX. In addition, pressure PY can be defined as follows. The second pressure plate 210B and the second valve 190B are in a contact state in a case when the pressure in the second pressure control chamber 122B is lower than PY, and the second pressure plate 210B and the second valve 190B are in a non-contact state in a case where the pressure in the second pressure control chamber 122B is equal to or higher than PY. Further, pressure PZ can be defined as follows. The second valve 190B is in an opened state in a case when the pressure in the second pressure control chamber 122B is lower than PZ, and the second valve 190B is in a closed state in a case where the pressure in the second pressure control chamber 122B is equal to or higher than PZ.

In the present embodiment, the condition of $PX<PY$ is satisfied for PX and PY defined as described above. Specifically, the pressure P2*b* in the second pressure control chamber 122B when the second pressure plate 210B and the second valve 190B change from a contact state to a non-contact state is set to be higher than the pressure P2*a* in the first pressure control chamber 122A when the first valve 190A changes from an opened state to a closed state. With such a setting, the second pressure plate 210B is maintained in contact with the second valve 190B until the standby state that is stationary is reached after printing is stopped and the circulation pump 500 is stopped. In the standby state that is stationary, as well, the second pressure plate 210B is maintained in contact with the second valve 190B.

Figure 25:
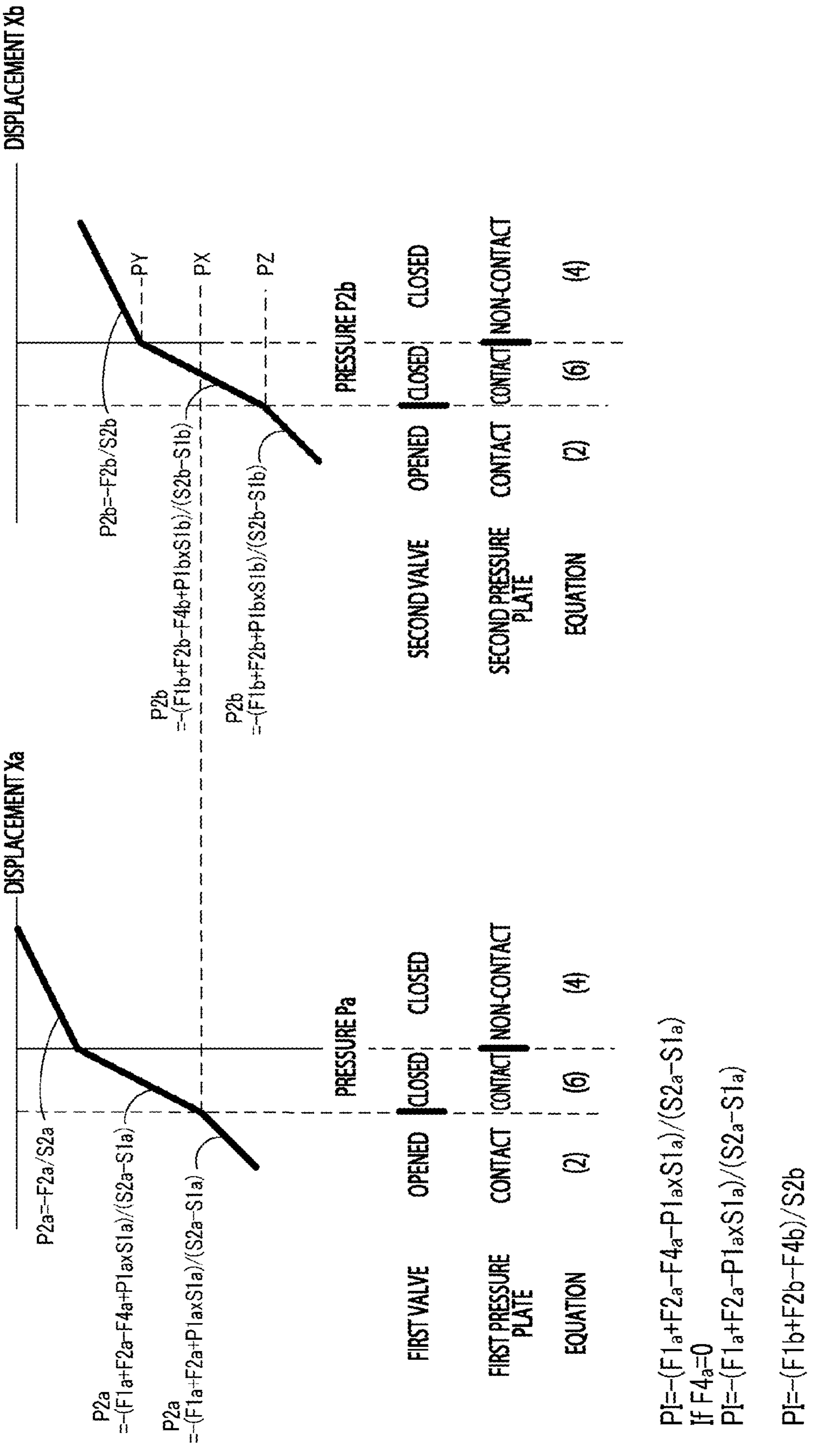
FIG. 25 is a graph illustrating the relation between displacement of the pressure plate and pressure in the pressure control chamber in each of a first pressure adjuster and a second pressure adjuster.
Figure 26:
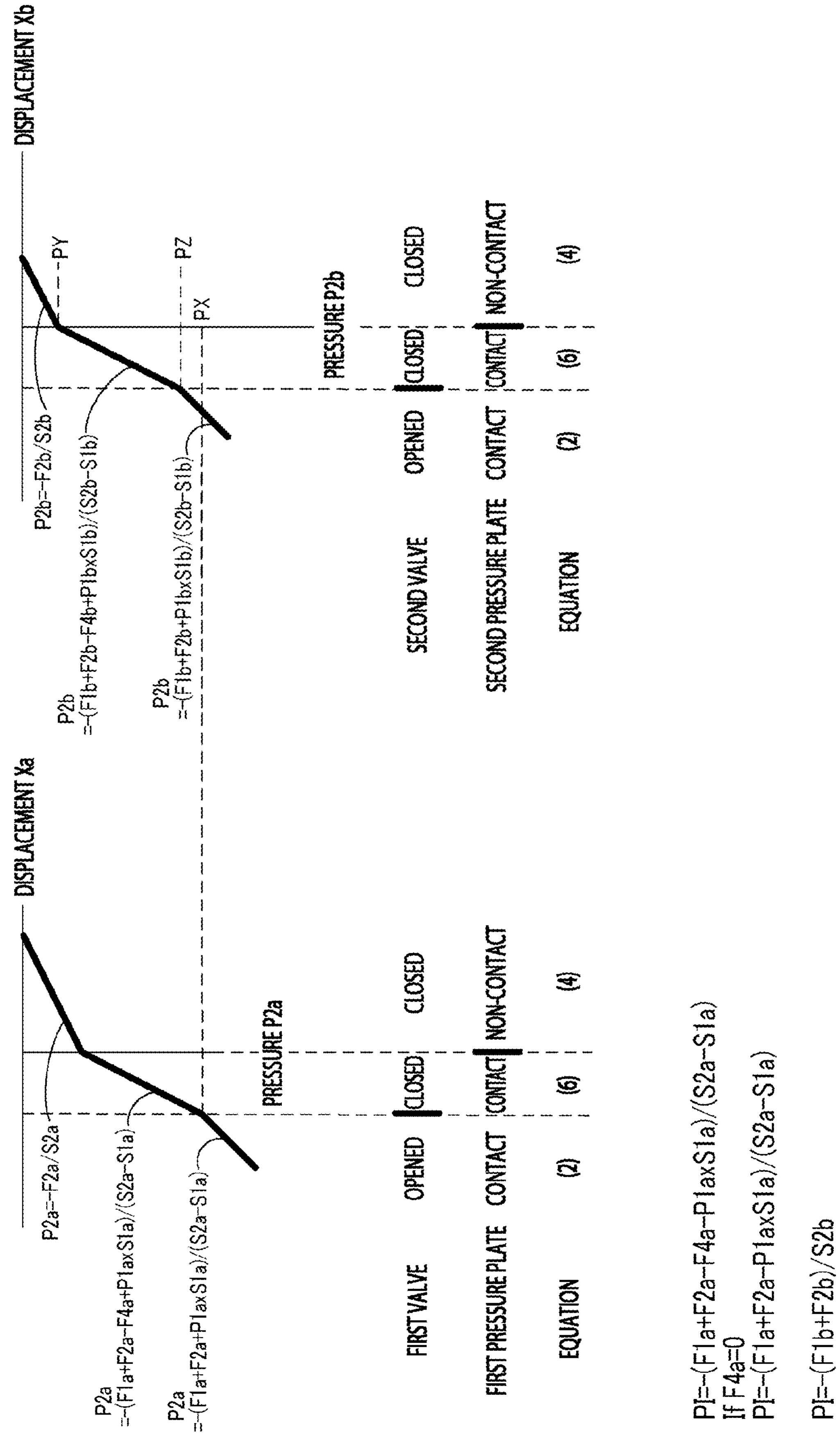
FIG. 26 is a graph illustrating the relation between displacement of the pressure plate and pressure in the pressure control chamber in each of the first pressure adjuster and the second pressure adjuster.

Although $PZ<PY$ is constantly satisfied, there are two configurations in accordance with the magnitude relation between PX and PZ. Specifically, there are the configuration of $PZ<PX<PY$ and the configuration of $PX<PZ<PY$. FIGS. 25 and 26 illustrate displacement of the pressure plates and the pressures in the pressure control chambers in the first pressure adjuster 120A and the second pressure adjuster 120B corresponding to these configurations.

As illustrated in FIG. 25, in the case of the configuration of $PZ<PX<PY$, the second pressure plate 210B and the second valve 190B are in a contact state and the second valve 190B is closed in the standby state. As illustrated in FIG. 26, in the case of the configuration of $PX<PZ<PY$, the second pressure plate 210B and the second valve 190B are in a contact state and the second valve 190B is opened in the standby state.

Figure 27:
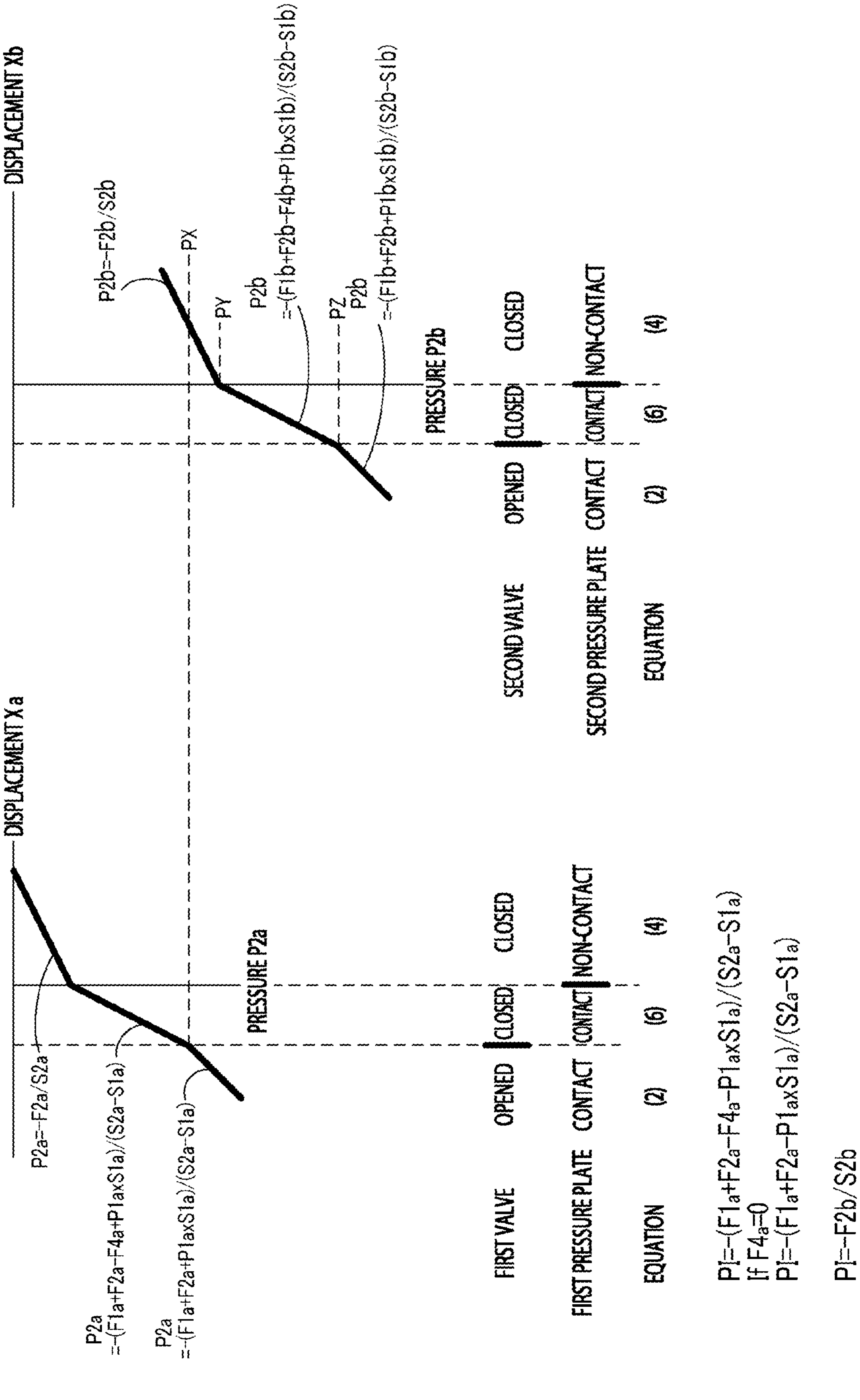
FIG. 27 is a graph illustrating the relation between displacement of the pressure plate and pressure in the pressure control chamber in each of the first pressure adjuster and the second pressure adjuster.

FIG. 27 illustrates displacement of the pressure plates and the pressures in the pressure control chambers in the first pressure adjuster 120A and the second pressure adjuster 120B corresponding to a configuration with which the relation of $PX<PY$ is not satisfied. As illustrated in FIG. 27, in the case of this configuration, the second pressure plate 210B and the second valve 190B are in a non-contact state and the second valve 190B is closed in the standby state.

As described above, the state illustrated in FIG. 24A becomes the printing stop and circulation stop state (standby state) as illustrated in FIG. 24B when printing is stopped and the circulation pump 500 is stopped. FIG. 24B illustrates the standby state in the configuration with which the relation of $PZ<PX<PY$ is satisfied, in particular. Although not illustrated, in the configuration with which the relation of $PX<PZ<PY$ is satisfied, the standby state is different as compared to FIG. 24B in that the second valve chamber 121B is in an opened state. When the circulation pump 500 is driven in any of the standby states, the circulation state (printing possible state) as illustrated in FIG. 24C is reached. At the initial time point when the circulation pump 500 becomes "ON", the pressure in the first pressure control chamber 122A and the pressure in the second pressure control chamber 122B are equal to each other. Thereafter, ink in the second pressure control chamber 122B is supplied to the first pressure control chamber 122A through the pump entrance flow path 170 and the pump exit flow path 180 by drive of the circulation pump 500. Accordingly, the first pressure plate 210A is gradually displaced in a direction in which the inner capacity of the first pressure control chamber 122A increases, whereas the second pressure plate 210B is gradually displaced in a direction in which the inner capacity of the second pressure control chamber 122B decreases. With each displacement, the pressure P2*a* in the first pressure control chamber 122A gradually increases (becomes weaker as negative pressure), and the pressure P2*b* in the second pressure control chamber 122B gradually decreases (becomes stronger as negative pressure). Thus, the differential pressure between the pressures P2*a* and P2*b* in the first pressure control chamber 122A and the second pressure control chamber 122B gradually increases. As the differential pressure gradually increases, the circulation flow rate of ink flowing from the first pressure control chamber 122A to the second pressure control chamber 122B through the discharge module 300 increases as well. When the circulation flow rate in the discharge module 300 reaches a threshold value or higher, ink thickening in the vicinity of the discharge port 13 is prevented, in other words, the printing possible state is reached. Thus, a time until the circulation flow rate in the discharge module 300 reaches a threshold value or higher and the printing possible state is reached after the circulation pump 500 is turned "ON" can be shortened. Accordingly, a first print out time that is a time until discharge of the first print media is completed after a print command can be shortened.

In the present embodiment, since the second pressure plate 210B and the second valve 190B are in a contact state in the standby state, the differential pressure per unit displacement of the second pressure plate 210B in the duration of returning from the standby state to the printing possible state is great. This is clear because, as for the second pressure adjuster 120B, the gradients of lines illustrated in the graphs in FIGS. 25 and 26 are greater than the gradients of lines illustrated in the graph in FIG. 27 at a part where pressure decreases with a starting point at the pressure PX. Thus, the time until the circulation flow rate in the discharge module 300 reaches a threshold value or higher and the printing possible state is reached after the circulation pump 500 is turned "ON" can be shortened. Details thereof will be described next.

The following describes change of the pressure P2*b* in the second pressure control chamber 122B after the circulation pump 500 is turned "ON". At the initial time point when the circulation pump 500 is turned "ON", the second pressure plate 210B of the second pressure control chamber 122B is in contact with the second valve 190B. The pressure P2*b* in the second pressure control chamber 122B gradually decreases as the inner capacity of the second pressure control chamber 122B gradually decreases. The speed of decrease of the pressure P2*b* in the second pressure control chamber 122B is determined as follows. Specifically, as indicated by Expression 6, the speed is determined by an increase of spring force F1*b*, an increase of spring force F2*b*, a decrease of an elastic force F4*b*, and a decrease of pressure receiving area S2*b* along with a decrease of the inner capacity. The spring force F1*b* is the spring force of the second valve spring 200B. The spring force F2*b* is the spring force of the second pressure adjustment spring 220B. The elastic force F4*b* is the elastic force of the second elastic part 901B of the second valve 190B. The pressure receiving area S2*b* is the pressure receiving area of the second pressure plate 210B.

In the present embodiment, the second pressure plate 210B of the second pressure control chamber 122B is in a contact state with the second valve 190B in the standby state. The two spring forces of the second valve spring 200B and the second pressure adjustment spring 220B increase with displacement of the second pressure plate 210B along with decrease of the inner capacity of the second pressure control chamber 122B. Thus, the change amount of pressure can be increased by increasing the increase amount of spring force per unit displacement of the second pressure plate 210B of the second pressure control chamber 122B, and as a result, the speed of decrease of the pressure P2*b* in the second pressure control chamber 122B can be increased.

In the case of PZ<PX<PY, the elastic force of the second elastic part 901B of the second valve 190B decreases with displacement of the second pressure plate 210B along with change of the inner capacity of the second pressure control chamber 122B. Such elastic force decrease contributes to increase in the speed of decrease of the pressure P2*b* in the second pressure control chamber 122B.

The pressure receiving area S2*b* of the second pressure plate 210B in the standby state in the present embodiment is smaller than the pressure receiving area S2*b* when the volume of the second pressure control chamber 122B is maximum. As a result, decrease of the pressure P2*b* in the second pressure control chamber 122B can be further speeded up.

Accordingly, the speed of decrease of the pressure P2*b* in the second pressure control chamber 122B is increased and the speed of increase of the differential pressure between the pressure P2*a* in the first pressure control chamber 122A and the pressure P2*b* in the second pressure control chamber 122B is increased. As a result, a time until the circulation flow rate reaches a threshold value or greater and the printing possible state is reached can be shortened, and, accordingly, the first print out time can be shortened.

For example, adjustment as follows can be performed so that the relation of PZ<PX<PY or the relation of PX<PZ<PY is satisfied. Specifically, a pressing force (spring force or elastic force) characteristic of at least one of the first valve spring 200A, the first pressure adjustment spring 220A, the first elastic part 901A, the second valve spring 200B, the second pressure adjustment spring 220B, and the second elastic part 901B can be adjusted. The pressing force characteristic includes a spring constant and a natural length. As an example, the natural length of the second pressure adjustment spring 220B can be adjusted to vertically shift the entire characteristic of the second pressure adjuster 120B illustrated in FIG. 25.

The lower limit value of PX−PY only needs to be a value with which the liquid discharge head 1 including the circulation unit 54 and the discharge module 300 normally operates in any of an operation state and a standby state. This is the same for configurations to be described later.

<Configuration (2) for Shortening First Print Out Time>

Figure 28A:
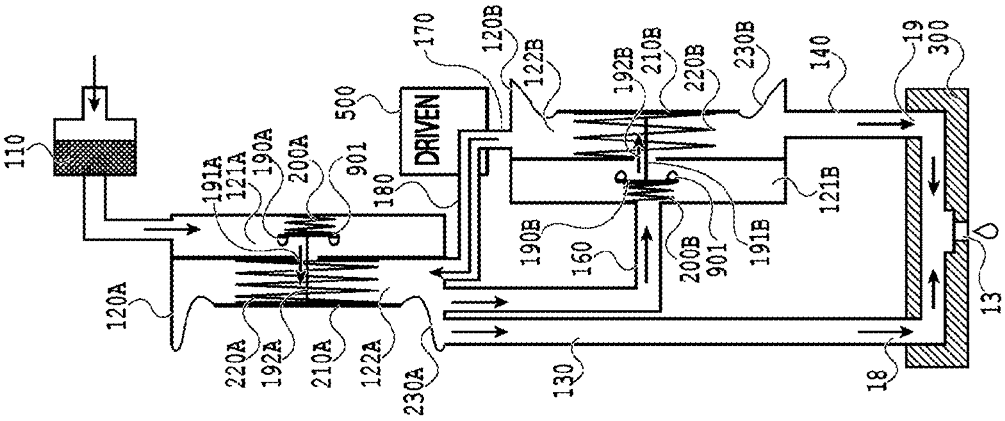
FIGS. 28A, 28B, and 28C are diagrams for description of the state of the liquid discharge head and ink flow in the liquid discharge head.
Figure 28B:
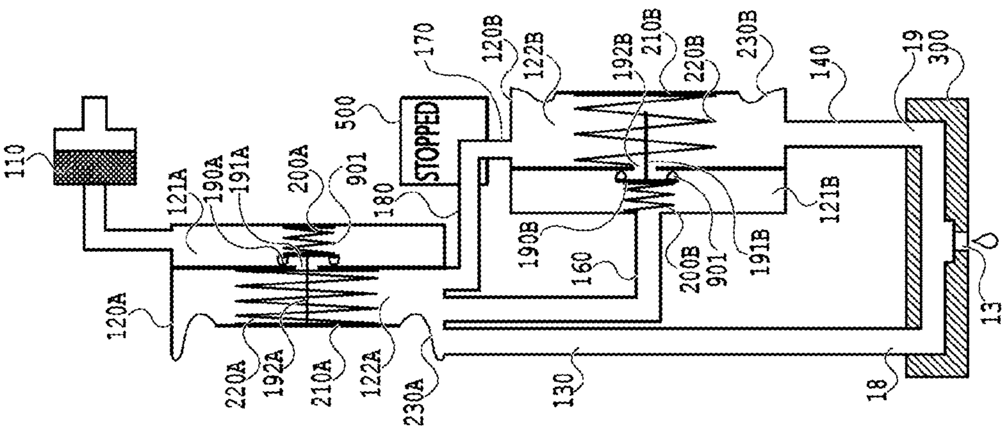
Figure 28C:
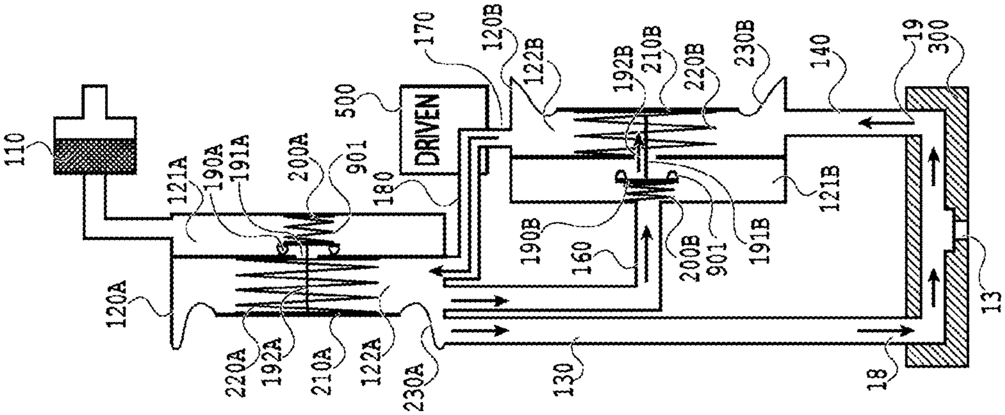

The above description is made on an example (Configuration (1)) the second pressure plate 210B of the second pressure control chamber 122B is in contact with the second valve 190B in the standby state. In Configuration (1), the second pressure plate 210B and the second valve 190B are continuously in a contact state in a duration until the differential pressure between the first pressure control chamber 122A and the second pressure control chamber 122B reaches differential pressure necessary for starting printing after operation of the circulation pump 500 is resumed. However, the present invention is not limited thereto. Another example (Configuration (2)) will be described below with reference to FIGS. 28A, 28B, and 28C. FIG. 28A illustrates the printing state, FIG. 28B illustrates the printing stop and circulation stop state (standby state), and FIG. 28C illustrates the circulation state (printing possible state). Configuration (2) is basically configured so that the second pressure plate 210B of the second pressure control chamber 122B is not in contact with the second valve 190B in the standby state illustrated in FIG. 28B. In a process in which the circulation pump 500 is driven to advance the state illustrated in FIG. 28B to the circulation state (printing possible state) as illustrated in FIG. 28C, the inner capacity of the second pressure control chamber 122B decreases. Through displacement of the second pressure plate 210B along with the decrease, the second pressure plate 210B becomes in contact with the second valve 190B. Even with such a basic configuration, a time until the second pressure plate 210B contacts the second valve 190B can be shortened when a condition described next is satisfied. After the second pressure plate 210B becomes in contact with the second valve 190B, the same operation as the operation of Configuration (1) is performed. Thus, even with such a basic configuration, certain effects can be achieved when the condition described next is satisfied.

The above-described condition is that the second pressure plate 210B and the second valve 190B switch from a non-contact state to a contact state before the differential pressure between the first pressure control chamber 122A and the second pressure control chamber 122B reaches a differential pressure necessary for starting printing after operation of the circulation pump 500 is resumed. Specifically, the condition is that the second pressure plate 210B and the second valve 190B switch from a non-contact state to a contact state halfway through the duration until the differential pressure between the first pressure control chamber 122A and the second pressure control chamber 122B reaches the differential pressure necessary for starting printing after operation of the circulation pump 500 is resumed. The differential pressure necessary for starting printing is typically less than a differential pressure in the printing state that is stationary. The differential pressure necessary for starting printing is different depending on the model of the liquid discharge apparatus, the kind of ink, environment (for example, environmental temperature), and the like. As described above, the printing possible state is achieved when the circulation flow rate reaches a threshold value or higher, and the differential pressure necessary for starting printing may be associated with the threshold value of the circulation flow rate for achieving the printing possible state.

t1 represents a time point when operation of the circulation pump 500 being stopped is resumed.

t2 represents a time point when the second pressure plate 210B and the second valve 190B switch from a non-contact state to a contact state.

t3 represents a time point when the differential pressure between the first pressure control chamber 122A and the second pressure control chamber 122B reaches the differential pressure necessary for starting printing.

The above-described condition is such that t2<t3 is satisfied. Thus, even with PX>PY, certain effects are achieved in a case when the time point t2 is followed by the time point t3 (in the case of t2<t3). The relation of PXc>PYc holds where PXc and PYc represent PX and PY, respectively, in the case of t2=t3, and the above-described condition can be expressed as $$PX - PY < |\Delta P|$$

where $$|\Delta P| = PXc - PYc > 0$$

In FIG. 27, in a case when $$PX - PY < |\Delta P|$$

is satisfied for the illustrated pressures PX and PY, the second pressure plate 210B and the second valve 190B are in a non-contact state in the standby state but are close to each other by a predetermined distance or shorter. The predetermined distance is the distance between the second pressure plate 210B and the second valve 190B in the standby state in the case of $$PX - PY = |\Delta P|.$$

<Configuration (3) for Shortening First Print Out Time>

Figure 29B:
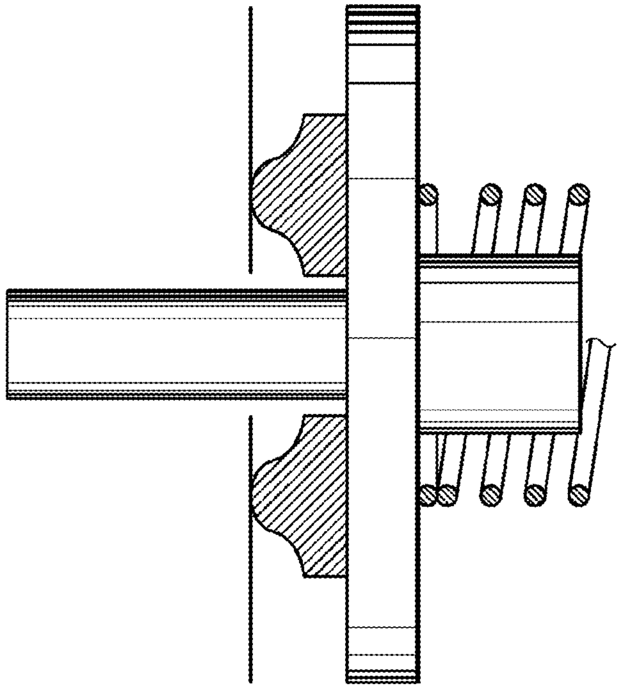
FIGS. 29A and 29B are diagrams schematically illustrating a valve.
Figure 29A:
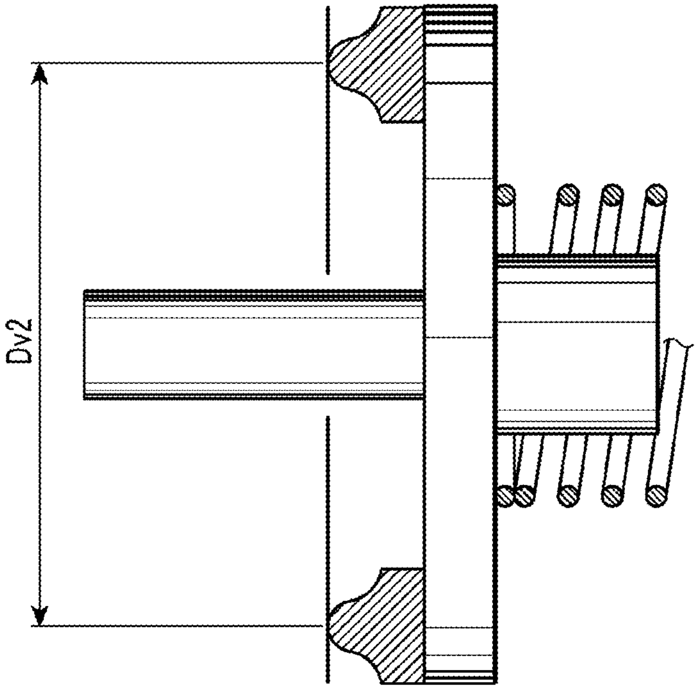

The following describes the elastic part 901 of the valve 190 with reference to FIGS. 29A to 30B. The elastic part 901 of the valve 190 has a ring shape and contacts the peripheral part of the communication port 191 of the partition 123 by the spring force of the valve spring 200, thereby blocking the communication port 191 as described above. Thus, the elastic part 901 elastically deforms in a pressing direction by the spring force of the valve spring 200 to increase close contact with the peripheral part of the communication port 191, thereby maintaining the blocking state. As described above, the inner capacity of the second pressure control chamber 122B decreases when operation of the circulation pump 500 is resumed from the standby state. The elastic force of the second elastic part 901B of the second valve 190B contributes to the speed of decrease of the pressure P2*b* in the second pressure control chamber 122B along with the decrease of the inner capacity. Thus, in order to increase the speed of decrease of the pressure P2*b* in the second pressure control chamber 122B, it is effective to increase the speed of decrease of the elastic force of the second elastic part 901B. For this, a change of the elastic force of the second elastic part 901B per unit displacement of the second pressure plate 210B may be increased. Specifically, the spring constant of the second elastic part 901B may be increased. FIG. 29A illustrates a state in which the elastic part 901 (elastic part 901A or elastic part 901B) is in contact with the partition 123 (partition 123A or 123B) but the elastic part 901 does not deform. FIG. 29B illustrates a state in which the elastic part 901 (elastic part 901A or elastic part 901B) is in contact with the partition 123 (partition 123A or 123B) and the elastic part 901 deforms by an elastic deformation amount d. In particular, the elastic deformation amount d is the amount of elastic deformation when the spring force of the valve spring 200 (first valve spring 200A or second valve spring 200B) and the elastic force of deformation of the elastic part 901 (elastic part 901A or elastic part 901B) are balanced.

The elastic part 901 does not deform in the state illustrated in FIG. 7B (state in which the pressure plate 210 is in contact with the valve 190 and the valve 190 is pressed by the pressure plate 210). The pressure plate 210 is not in contact with the valve 190 in the state illustrated in FIG. 7A. Then, the valve 190 is pressed by the pressing force of the valve spring 200, and the pressing force of the valve spring 200 and the elastic force of the elastic part 901 deformed by the elastic deformation amount d are balanced. In the graph illustrated in FIG. 23, the elastic part 901 deforms also in a region in which the pressure in the pressure control chamber 122 is higher than Pb (region in which the pressure plate 210 and the valve 190 are not in contact), and the elastic force of the elastic part 901 maintains a peak value illustrated in FIG. 23.

To increase the speed of decrease of the elastic force of the second elastic part 901B, the elastic deformation amount d of the second elastic part 901B for the same spring force of the second valve spring 200B is preferably set to be as small as possible. Specifically, the spring force of the second valve spring 200B and the elastic force of the second elastic part 901B are preferably balanced with slight displacement of the second pressure plate 210B from a position when no spring force is applied.

Figure 30A:
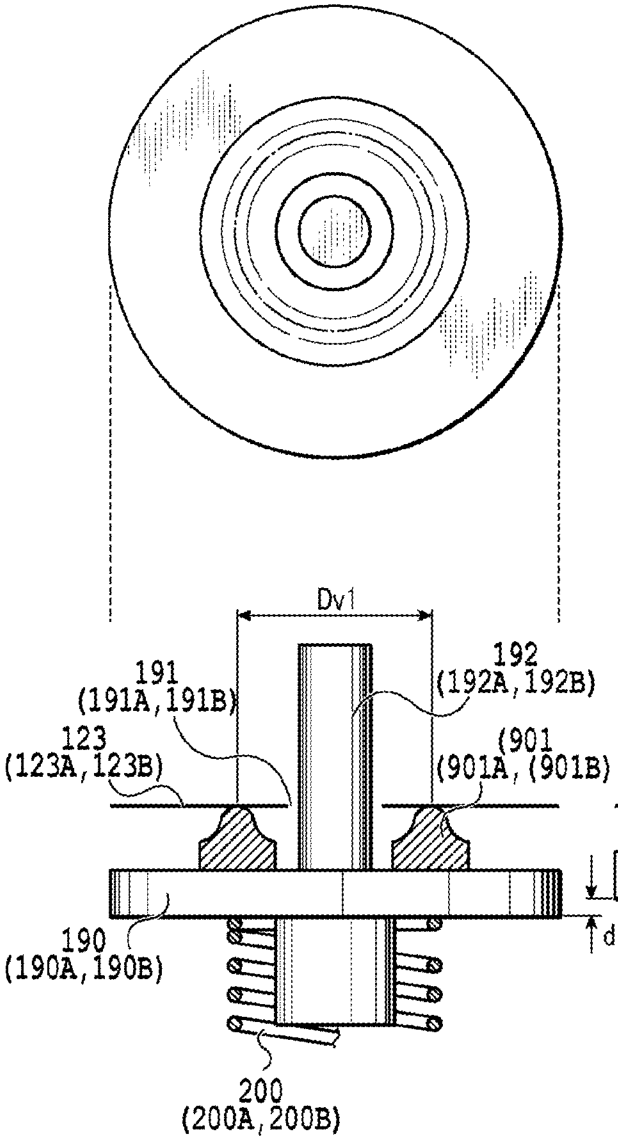
FIGS. 30A and 30B are diagrams schematically illustrating the valve.
Figure 30B:
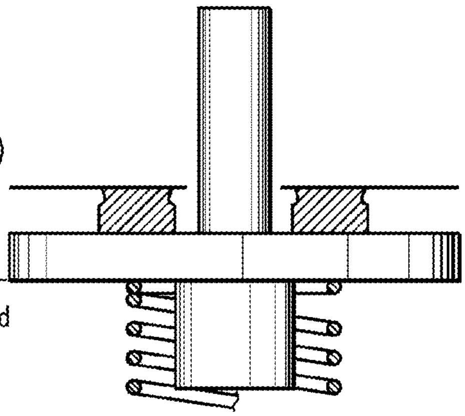

For example, a configuration change as follows is effective for decreasing the elastic deformation amount d of the second elastic part 901B by the spring force of the second valve spring 200B (increasing the spring constant of the second elastic part 901B). Specifically, it is effective to increase a diameter Dv1 of the second elastic part 901B to Dv2 as illustrated in FIGS. 30A and 30B. It is also effective to increase the cross-sectional area of the second elastic part 901B.

Figure 31:
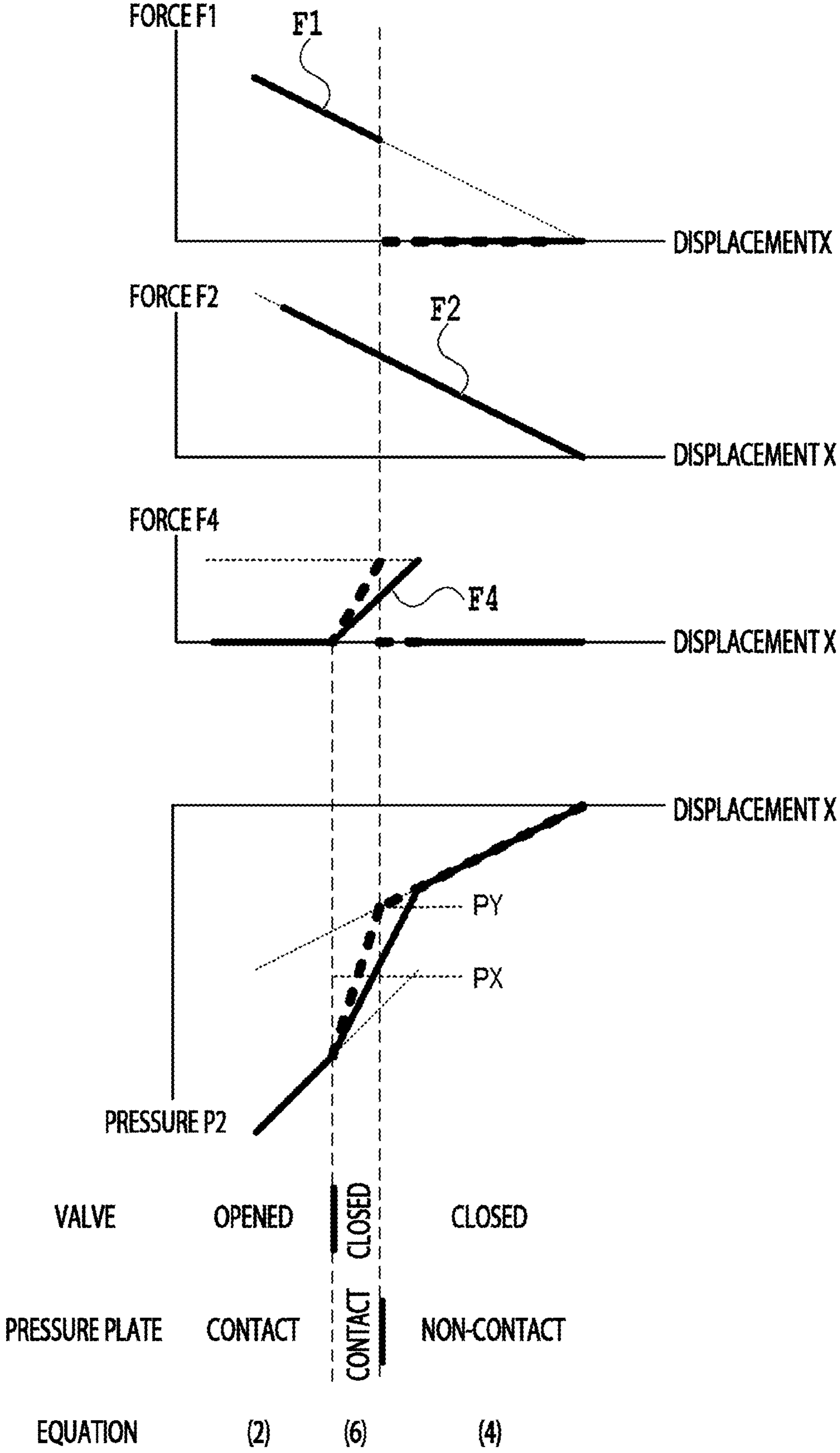
FIG. 31 is a graph illustrating the relation between displacement of the pressure plate and pressure in the pressure control chamber in the pressure adjuster.
Figure 32:
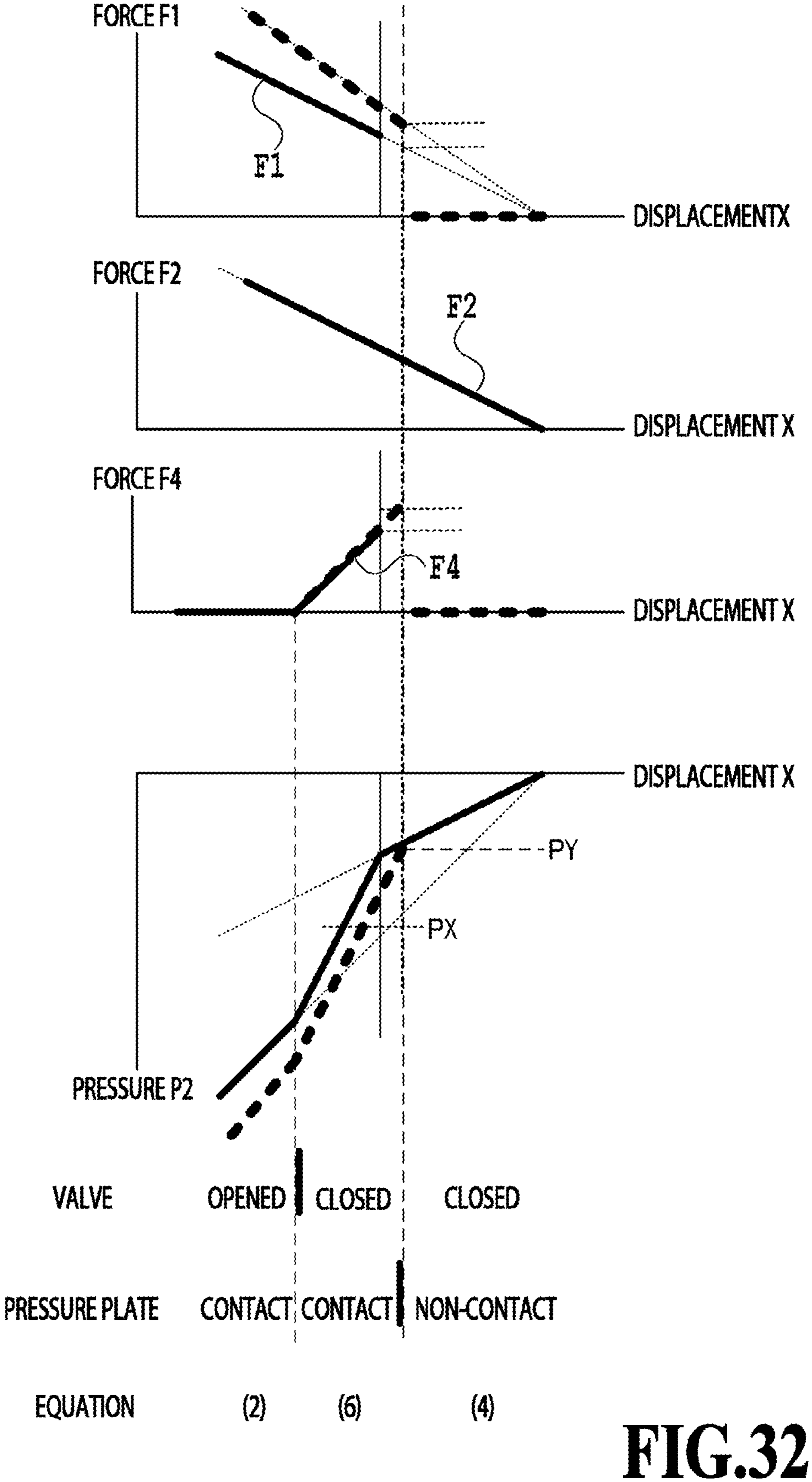
FIG. 32 is a graph illustrating the relation between displacement of the pressure plate and pressure in the pressure control chamber in the pressure adjuster.
Figure 33:
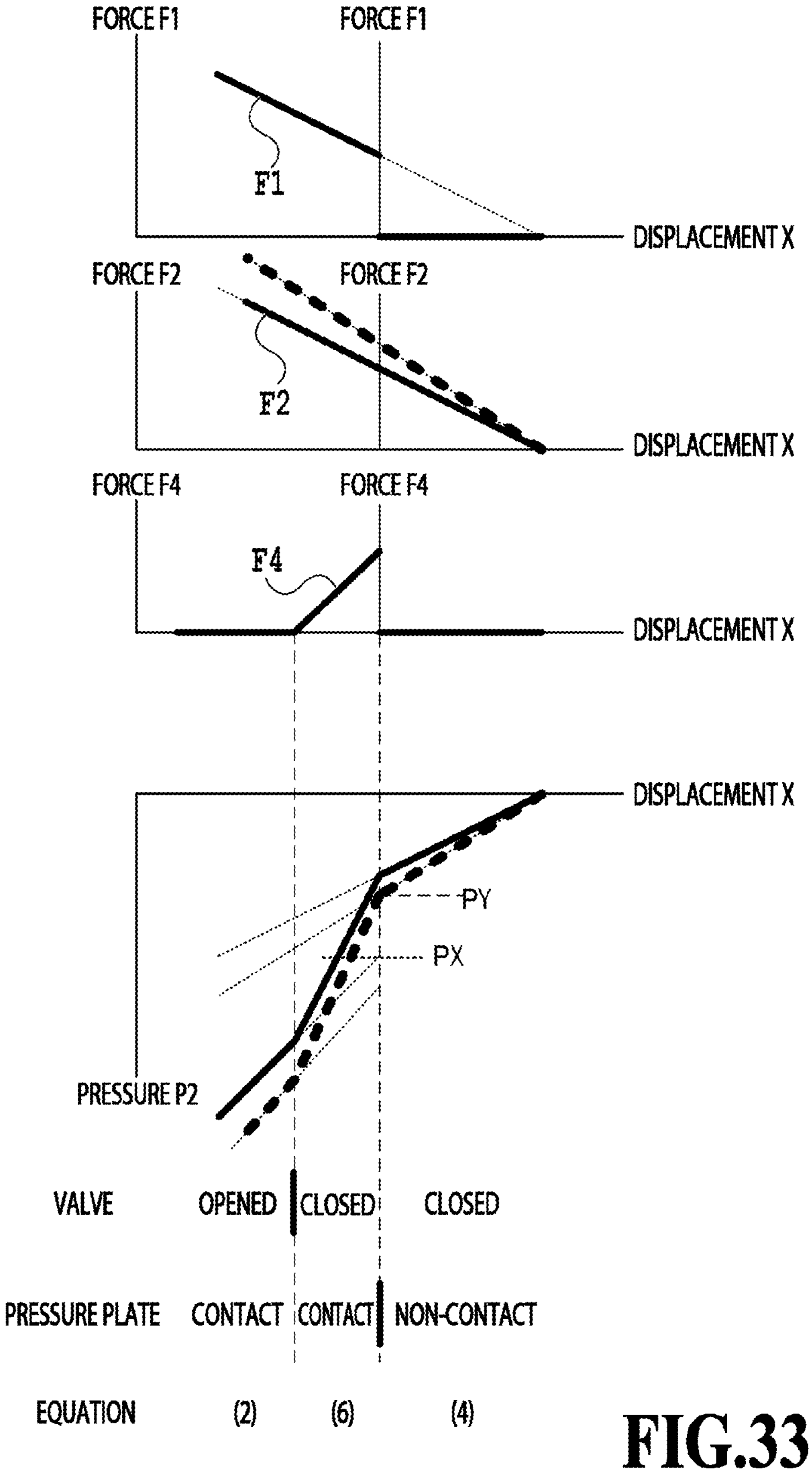
FIG. 33 is a graph illustrating the relation between displacement of the pressure plate and pressure in the pressure control chamber in the pressure adjuster.

For example, adjustments as follows may be performed to increase the decrease rate of the pressure in the second pressure control chamber 122B for the same amount of displacement of the second pressure plate 210B when the pressure in the second pressure control chamber 122B decreases from PX. As illustrated in FIG. 31, change (spring constant) of the elastic force of the second elastic part 901B per unit displacement of the second pressure plate 210B may be increased. As illustrated in FIG. 32, change (spring constant) of the spring force of the second valve spring 200B per unit displacement of the second pressure plate 210B may be increased. As illustrated in FIG. 33, change (spring constant) of the spring force of the second pressure adjustment spring 220B per unit displacement of the second pressure plate 210B may be increased.

Two or more of the above-described three adjustments related to elastic force or spring force may be combined.

Moreover, adjustment may be performed so that the magnitude of the spring force of the second valve spring 200B is maintained great to some extent in the duration until the differential pressure between the first pressure control chamber 122A and the second pressure control chamber 122B reaches the differential pressure necessary for starting printing after operation of the circulation pump 500 is resumed. In this manner, the duration until the differential pressure between the first pressure control chamber 122A and the second pressure control chamber 122B reaches the differential pressure necessary for starting printing can be shortened. For example, the spring force of the second valve spring 200B may be adjusted to be greater than the spring force of the first valve spring 200A in the duration.

The valve spring 200, the pressure adjustment spring 220, and the valve 190 do not necessarily need to be identical between the first pressure adjuster 120A and the second pressure adjuster 120B, but their materials, shapes, dimensions, and the like, may be different between both members. For example, it is effective to differentiate both members such that the spring constant of the second valve spring 200B of the second pressure adjuster 120B is greater than the spring constant of the first valve spring 200A of the first pressure adjuster 120A.

<Configuration (4) for Shortening First Print Out Time>

Another embodiment will be described below with reference to FIG. 34. The above description is made with an example in which the first pressure adjuster 120A is used as a unit for adjusting the pressure in the supply flow path 130, but the present invention is not limited thereto. In a configuration illustrated in FIG. 34, an external pressure adjuster 902 is disposed outside the liquid discharge head 1. The external pressure adjuster 902 communicates with a collection-distribution unit 906 of the liquid discharge head 1 through an external inflow flow path 903, an entrance 904, and a head side inflow flow path 905.

Ink having flowed in from the external pressure adjuster 902 reaches the collection-distribution unit 906 and then is supplied to the supply flow path 130 and the bypass flow path 160. In addition, ink collected from the second pressure control chamber 122B through the pump entrance flow path 170, the circulation pump 500, and the pump exit flow path 180 reaches the collection-distribution unit 906. The ink having reached the collection-distribution unit 906 from the second pressure control chamber 122B is turned and supplied to the supply flow path 130 and the bypass flow path 160.

The external pressure adjuster 902 is, for example, of a water head scheme using water head difference but may be of any scheme. The pressure in the inflow flow path 903 is controlled by the external pressure adjuster 902, and further, the pressures in the collection-distribution unit 906 and the supply flow path 130 communicating with the inflow flow path 903 are controlled. In the above-described state (standby state) in which printing is stopped and the circulation pump is stopped, ink supply from the external pressure adjuster 902 to the liquid discharge head is stopped as well. The pressure P2 in the second pressure control chamber 122B is equal to P4 where P4 represents the pressure in the supply flow path 130 in the state in which ink supply from the external pressure adjuster 902 is stopped. In the configuration illustrated in FIG. 34, the pressure P2*b* in the second pressure control chamber 122B when the second pressure plate 210B and the second valve 190B change from a contact state to a non-contact state can be defined as the pressure PY as in Configuration (1). Thus, with P4<PY in the configuration illustrated in FIG. 34, the second pressure plate 210B and the second valve 190B in the second pressure control chamber 122B are in a contact state in the stationary state when ink inflow from the collection-distribution unit 906 to the second pressure control chamber 122B is stopped. Thus, the above-described configurations (1) and (3) for shortening the first print out time are applicable to the present embodiment as well.

Figure 34:
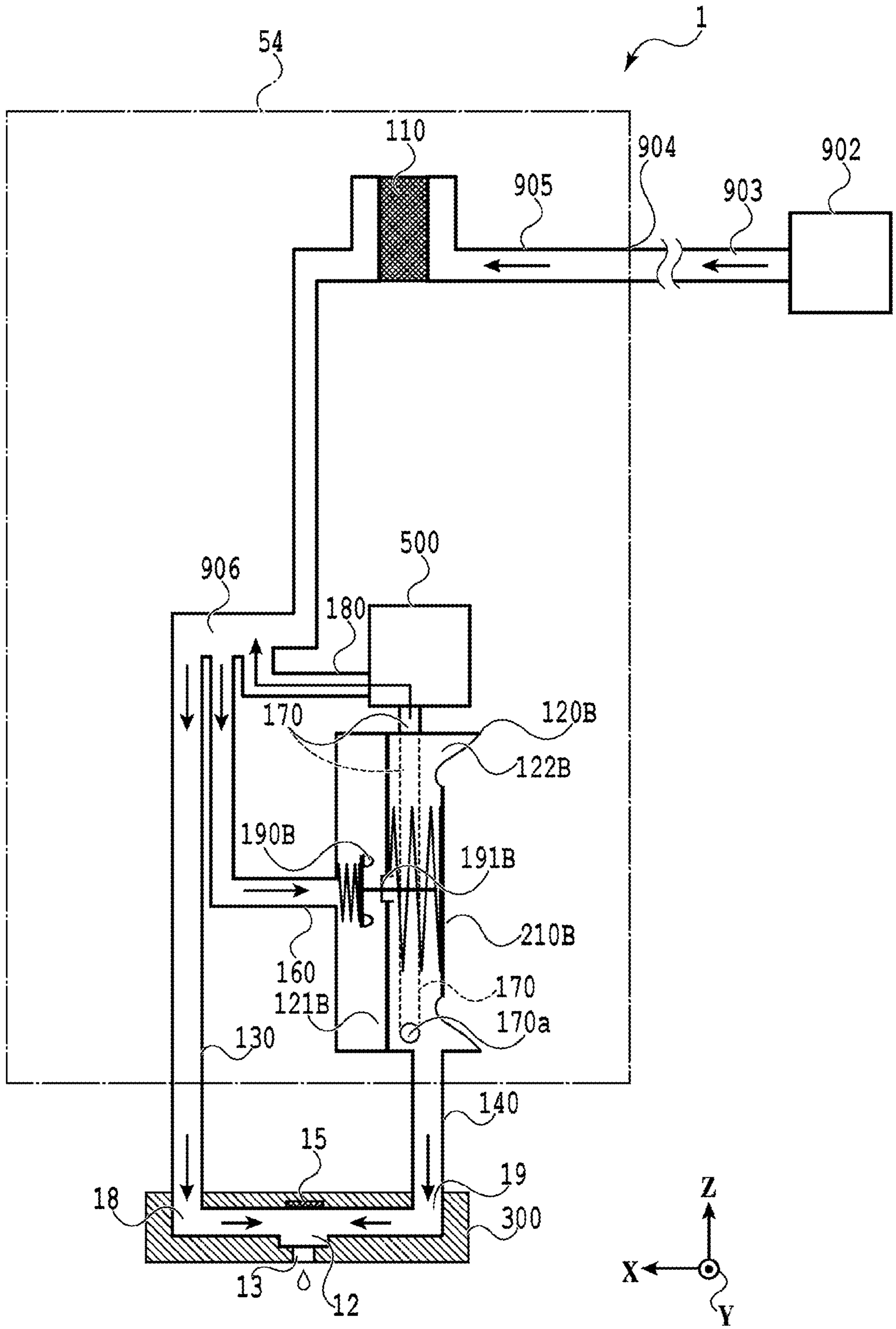
FIG. 34 is a diagram schematically illustrating a circulation path.

Moreover, in the configuration illustrated in FIG. 34, the pressure PY may be equal to or lower than the pressure P4. Specifically, in the configuration illustrated in FIG. 34, the second pressure plate 210B and the second valve 190B in the second pressure control chamber 122B may be in a non-contact state in the stationary state to which transition is made when ink inflow from the collection-distribution unit 906 to the second pressure control chamber 122B is stopped. In such a case, the above-described configuration (2) for shortening the first print out time is applicable to the present embodiment as well.

First Modification

Figure 35:
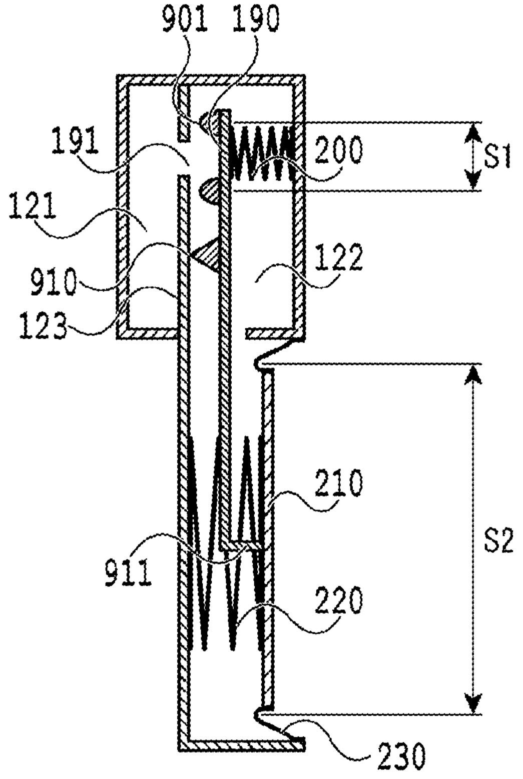
FIG. 35 is a diagram schematically illustrating the pressure adjuster.

A modification of the valve 190 will be described below with reference to FIG. 35. The present modification basically stabilizes the pressure in the pressure control chamber 122 by reducing pressure variation in the pressure control chamber 122 due to pressure variation in the valve chamber 121 by using the principle of leverage. One or both of the first pressure adjuster 120A and the second pressure adjuster 120B may have a form as illustrated in FIG. 35. In the form, the valve 190 and the valve spring 200 are disposed in the pressure control chamber 122. The valve 190 has such a lever structure that displacement of a part where the elastic part 901 of the valve 190 is disposed is smaller than displacement of the pressure plate 210. Specifically, in the present modification, the valve 190 is configured to be able to block the communication port 191 in the pressure control chamber 122. The valve 190 includes a pivot 910 and a pressure plate load part 911 that contacts the pressure plate 210, and is rotationally displaceable about the pivot 910. In this configuration as well, the ideas of force balance, and the like, described so far hold in the same manner as described below. Expressions 3 and 4 hold when the pressure plate 210 and the valve 190 are in a non-contact state. When the elastic part 901 of the valve 190 is not in contact with the peripheral part of the communication port 191 of the partition 123, $$P2 \times S2 + F2 + ((P1 - P2) \times S1 + F1) \times L1/L2 = 0 \tag{7}$$

holds. Expression 7 can be rewritten for P2 as follows $$P2 = -(F1 \times L1/L2 + F2 + P1 \times S1 \times L1/L2)/(S2 - S1 \times L1/L2) \tag{8}$$

When the elastic part 901 of the valve 190 is in contact with the peripheral part of the communication port 191 of the partition 123, $$P2 \times S2 + F2 + ((P1 - P2) \times S1 + F1 - F4) \times L1/L2 = 0 \tag{9}$$

holds. Expression 9 can be rewritten for P2 as follows.

$$P2 = -(F1 \times L1/L2 + F2 - F4 \times L1/L2 + P1 \times S1 \times L1/L2)/(S2 - S1 \times L1/L2) \tag{10}$$

In the above expressions,

P1: pressure (gauge pressure) in the first valve chamber 121A
P2: pressure (gauge pressure) in the first pressure control chamber 122A
F1: spring force of the valve spring 200
F2: spring force of the pressure adjustment spring 220
F4: elastic force of the elastic part 901 of the valve 190
S1: pressure receiving area of the valve 190
S2: pressure receiving area of the pressure plate 210

L1: arm length from the elastic part 901 of the valve 190 to the pivot 910

L2: arm length from the pressure plate load part 911 of the valve 190 to the pivot 910.

Thus, the above-described configurations (1) to (4) for shortening the first print out time are applicable although there occurs influence of a lever ratio (L1 to L2) along with lever rotational displacement.

Second Modification

Figure 36A:
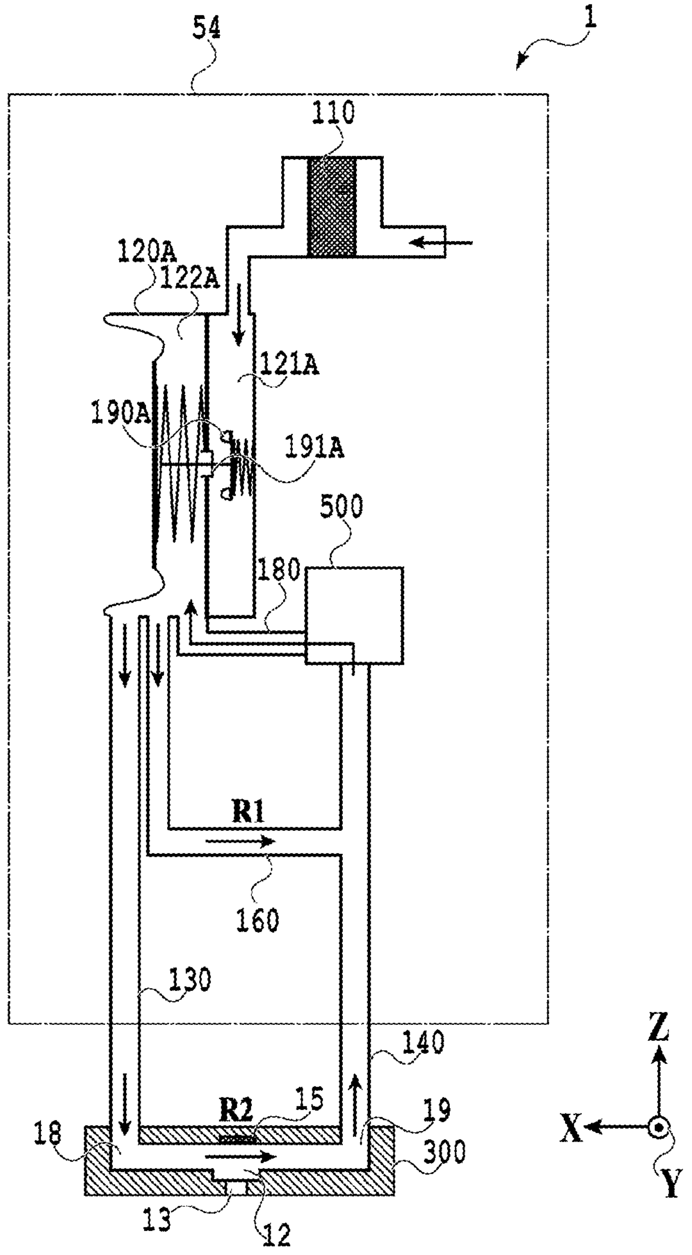
FIGS. 36A and 36B are diagrams schematically illustrating a circulation path.
Figure 36B:
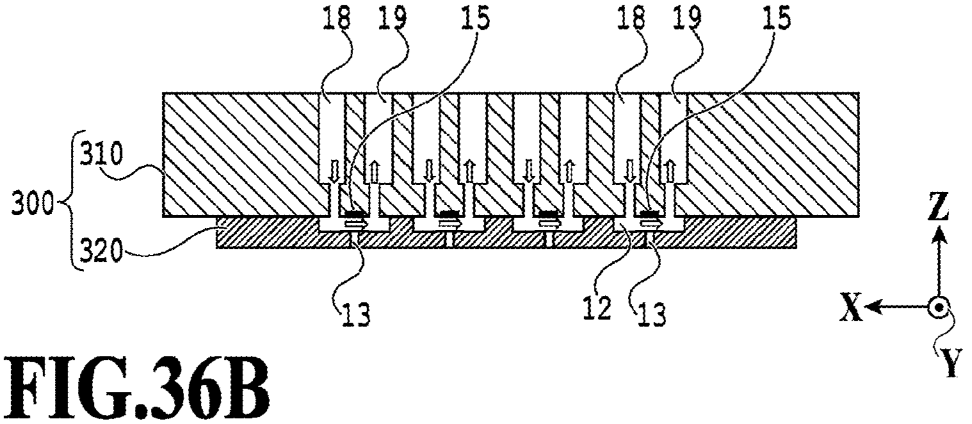
Figure 37A:
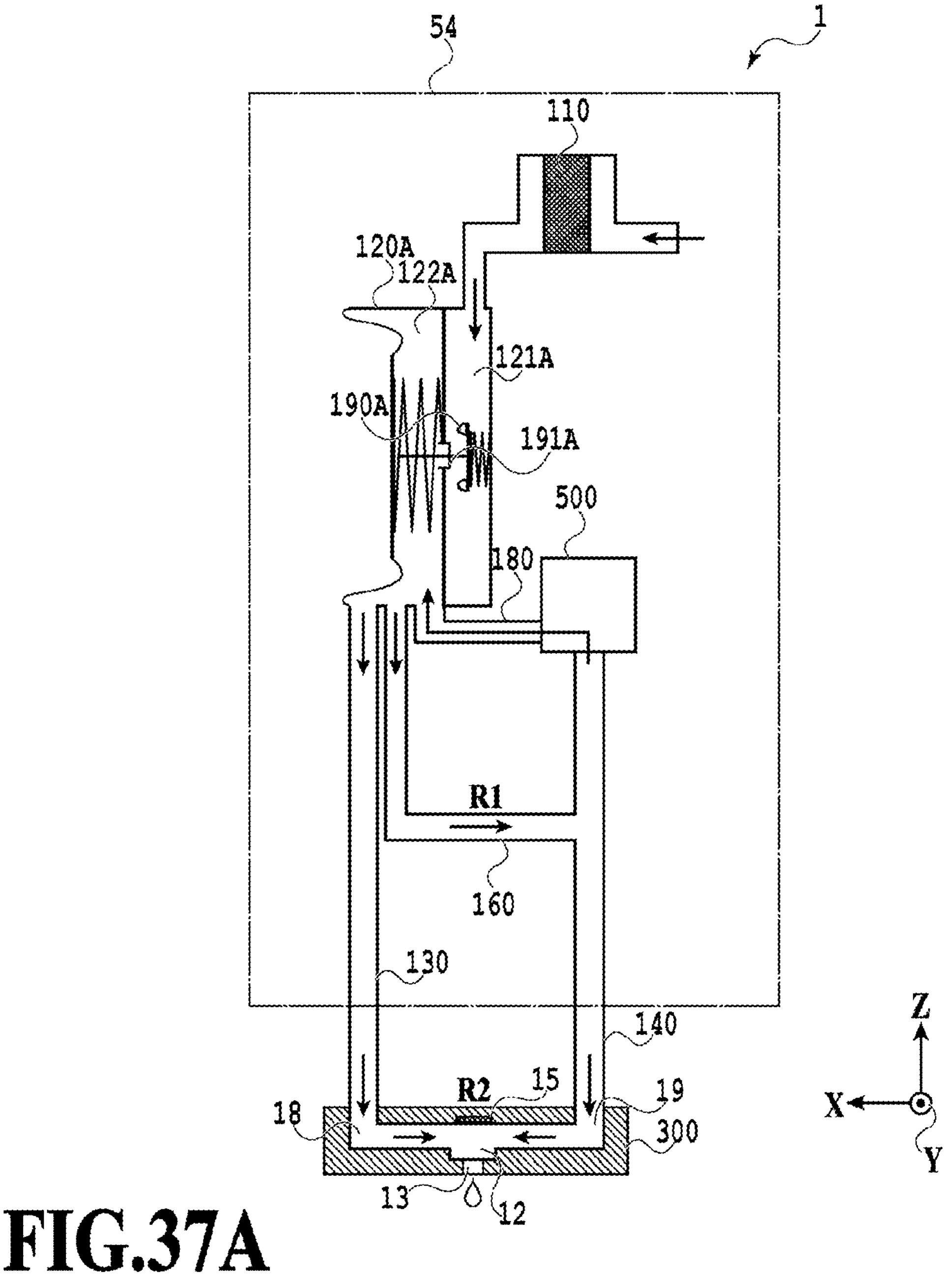
FIGS. 37A and 37B are diagrams schematically illustrating a circulation path.
Figure 37B:
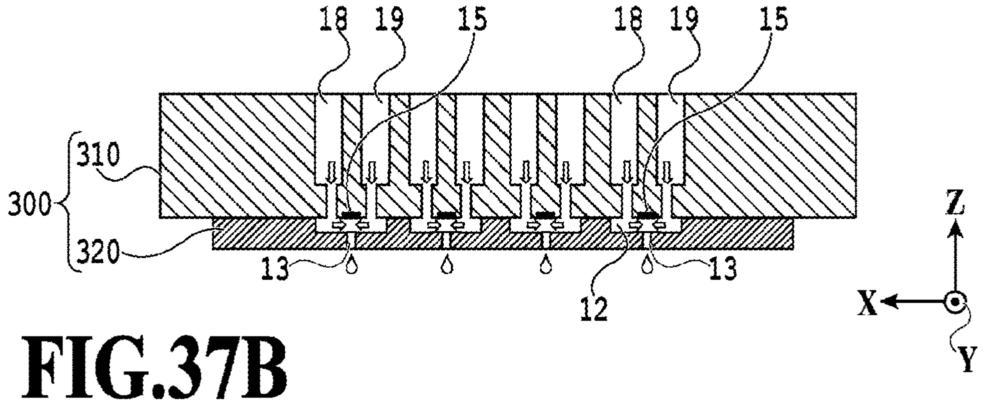

FIGS. 36A to 37B are diagrams schematically illustrating a circulation path in a second modification. FIGS. 36A and 36B illustrate the circulation path when discharge is not performed but circulation is performed. FIGS. 37A and 37B illustrate the circulation path when printing is performed at high duty. The second modification is a form in which the second pressure adjuster 120B is not disposed and the bypass flow path 160 and the collection flow path 140 are directly connected to each other.

In the second modification, R1 represents the flow resistance of a flow path flowing to the collection flow path 140 through the bypass flow path 160, and R2 represents the flow resistance of a flow path flowing from the supply flow path 130 to the collection flow path 140 through the discharge module 300. Since the amount of ink flowing to each flow path is inversely proportional to the flow resistance, the ratio of the flow rate of the flow path through the bypass flow path 160 to the flow rate of the flow path through the discharge module 300 is R2 to R1. Each flow resistance is set in accordance with this relation to have a circulation amount with which ink thickening in the vicinity of the discharge port 13 in the discharge module 300 can be prevented. Specifically, each flow resistance is set so that the flow speed of liquid in the pressure chamber is equal to or faster than a predetermined speed. The flow resistance R1 of the bypass flow path 160 can be controlled, for example, by changing the flow path cross-sectional area or the flow path length or by providing an aperture.

In the case of the second modification as well, both-side supply to the pressure chamber 12 is performed as illustrated in FIGS. 37A and 37B when print operation is performed at high duty. Specifically, ink supplied from the first pressure control chamber 122A to the supply flow path 130 is supplied to the discharge port 13 through the common supply flow path 18 of the discharge module 300. In addition, part of ink supplied from the first pressure control chamber 122A to the bypass flow path 160 is supplied to the first pressure control chamber 122A through the circulation pump 500 and the pump exit flow path 180. The other part of the ink supplied to the bypass flow path 160 is supplied to the collection flow path 140 and supplied to the discharge port 13 through the common collection flow path 19 of the discharge module 300. Accordingly, ink discharged from the discharge port 13 is supplied from both the supply flow path 130 and the collection flow path 140.

Third Modification

Figure 38A:
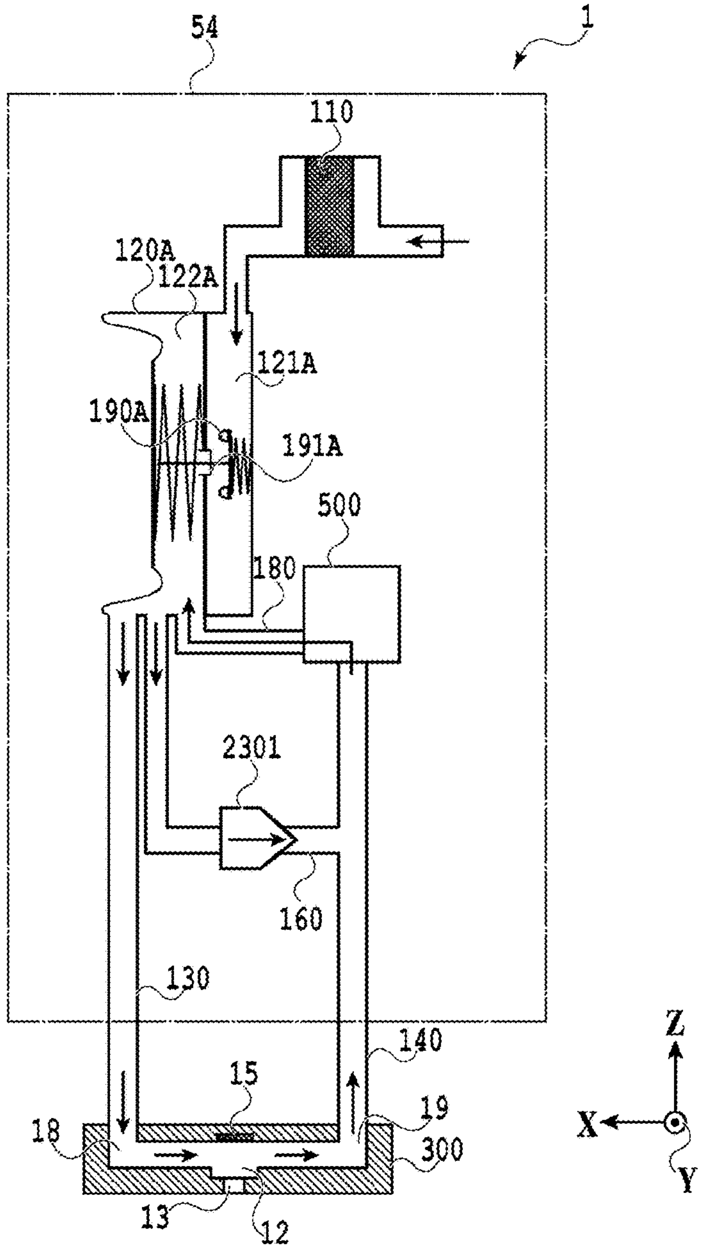
FIGS. 38A and 38B are diagrams schematically illustrating a circulation path.
Figure 38B:
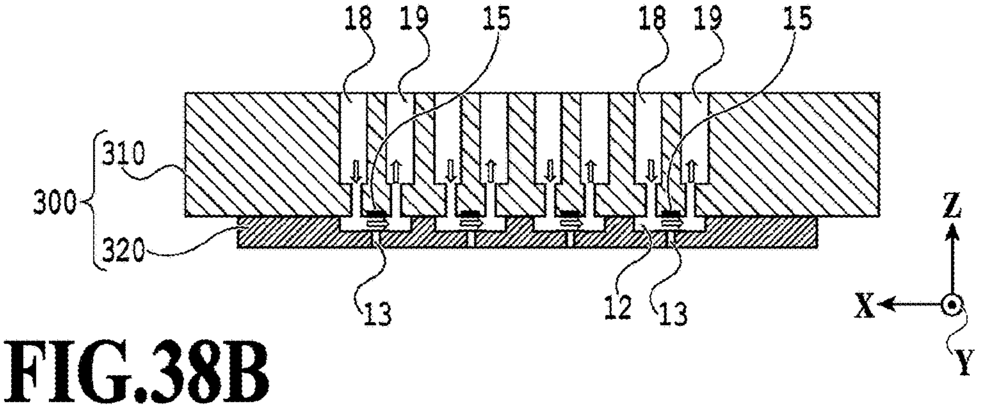
Figure 39A:
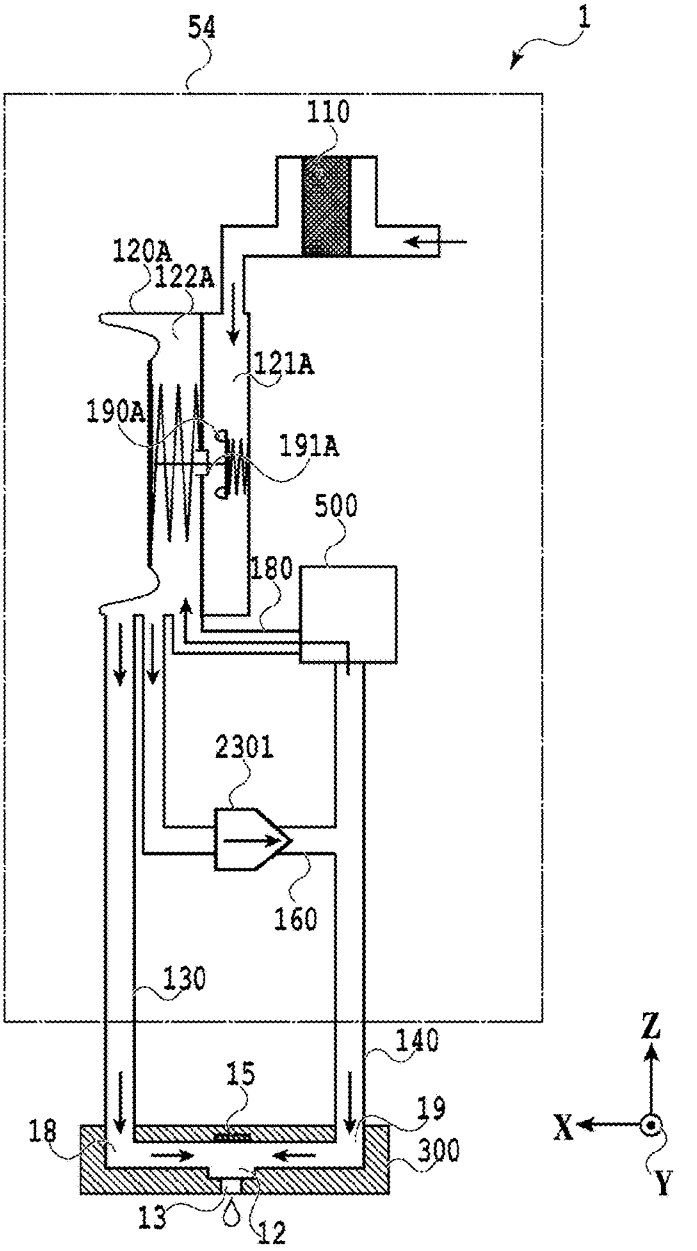
FIGS. 39A and 39B are diagrams schematically illustrating a circulation path.
Figure 39B:
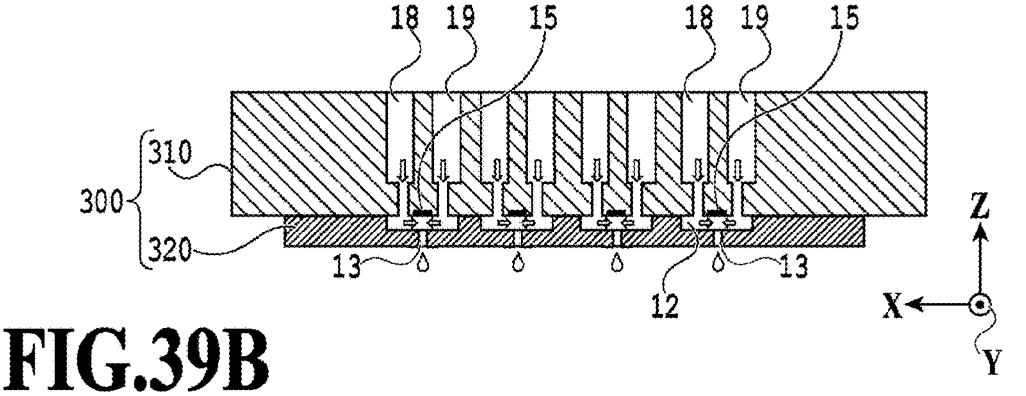

FIGS. 38A to 39B are diagrams schematically illustrating a circulation path in a third modification. FIGS. 38A and 38B illustrate the circulation path when discharge is not performed but circulation is performed. FIGS. 39A and 39B illustrate the circulation path when printing is performed at high duty. The third modification is a form in which the second pressure adjuster 120B is not disposed, the bypass flow path 160 and the collection flow path 140 are directly connected to each other, and a relief valve 2301 is disposed in the bypass flow path 160.

The relief valve 2301 is configured so that ink flows in from the upstream side of the relief valve to the downstream side when pressure on the downstream side of the relief valve becomes equal to or lower than a certain value. Specifically, the relief valve is configured to open when pressure on the collection flow path side becomes lower than pressure on the supply flow path side by a predetermined amount or greater. Ink supply flow is basically the same as in a configuration in which the second pressure adjuster 120B is disposed as illustrated in FIGS. 5, 20A, and 20B. The circulation amount in the discharge module 300 is determined by the differential pressure in control pressure between the first pressure control chamber 122A and the relief valve 2301. The control pressure of the relief valve 2301 is set to obtain a circulation amount with which ink thickening in the vicinity of the discharge port 13 in the discharge module 300 can be prevented.

In the third modification as well, both-side supply to the pressure chamber 12 is performed as illustrated in FIGS. 39A and 39B when print operation is performed at high duty. Specifically, ink supplied from the first pressure control chamber 122A to the supply flow path 130 is supplied to the discharge port 13 through the common supply flow path 18 of the discharge module 300. In addition, part of ink supplied from the first pressure control chamber 122A to the bypass flow path 160 passes through the relief valve 2301 and is supplied to the first pressure control chamber 122A through the circulation pump 500 and the pump exit flow path 180. The other part of the ink supplied to the bypass flow path 160 is passes through the relief valve 2301, is supplied to the collection flow path 140, and is supplied to the discharge port 13 through the common collection flow path 19 of the discharge module 300. Accordingly, ink discharged from the discharge port 13 is supplied from both the supply flow path 130 and the collection flow path 140.

Fourth Modification

Various modifications of a circulation flow path will be collectively described as a fourth modification below. As described above, in a configuration in which ink flows back from the collection flow path 140 toward the pressure chamber 12, the bypass flow path 160 needs to be provided and no mechanism that functions as a check valve needs to be provided between the pressure chamber 12 and the merging part of the bypass flow path 160. With a circulation flow path with which this relation is maintained, ink can be supplied to the pressure chamber 12 from both sides, and thus discharge stability can be improved.

Figure 40:
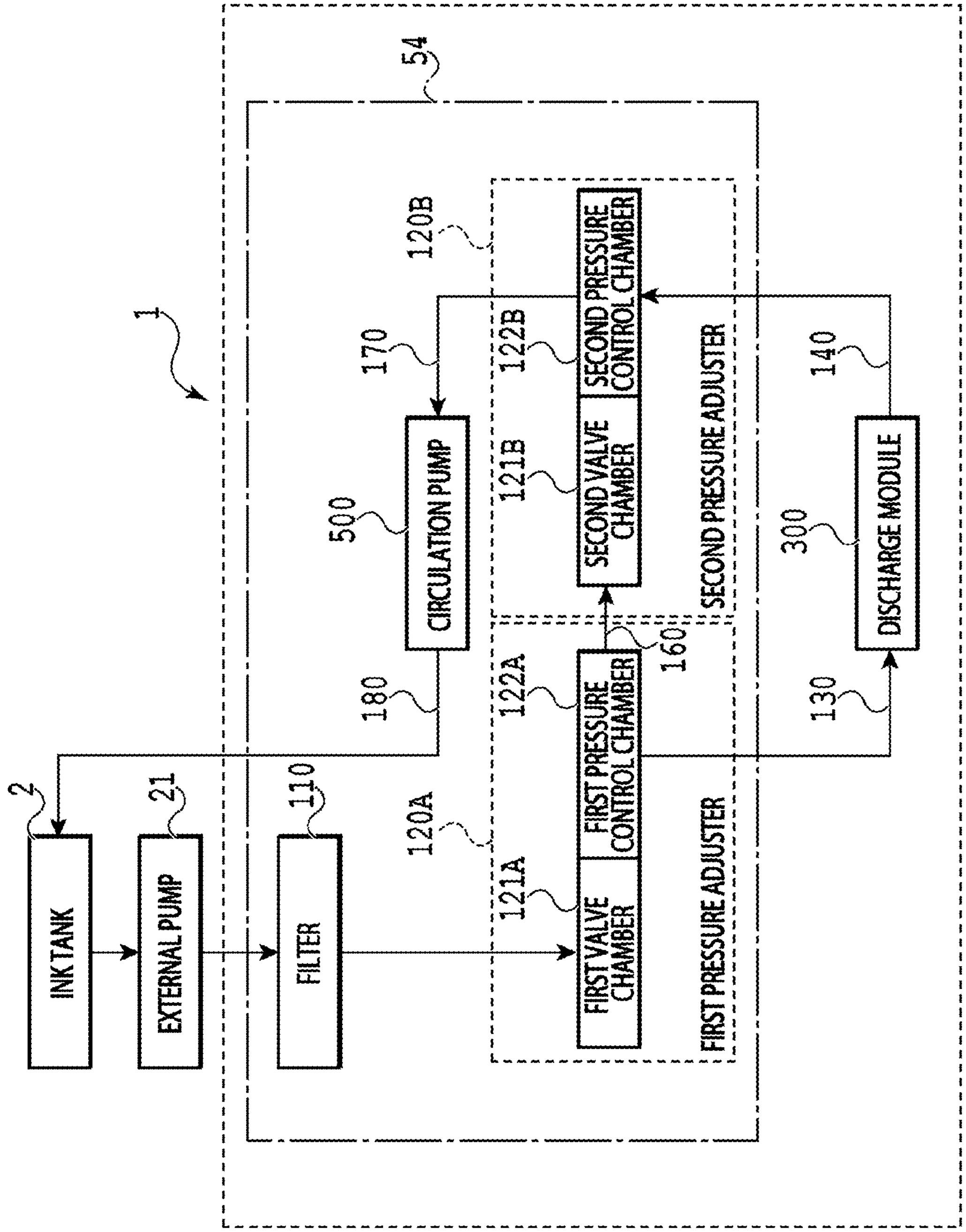
FIG. 40 is a block diagram schematically illustrating a circulation path.

FIG. 40 is a block diagram schematically illustrating a circulation path. FIG. 40 illustrates a configuration in which the pump exit flow path 180 positioned on the downstream side of the circulation pump 500 is connected not to the first pressure control chamber 122A but to the ink tank 2.

Figure 41:
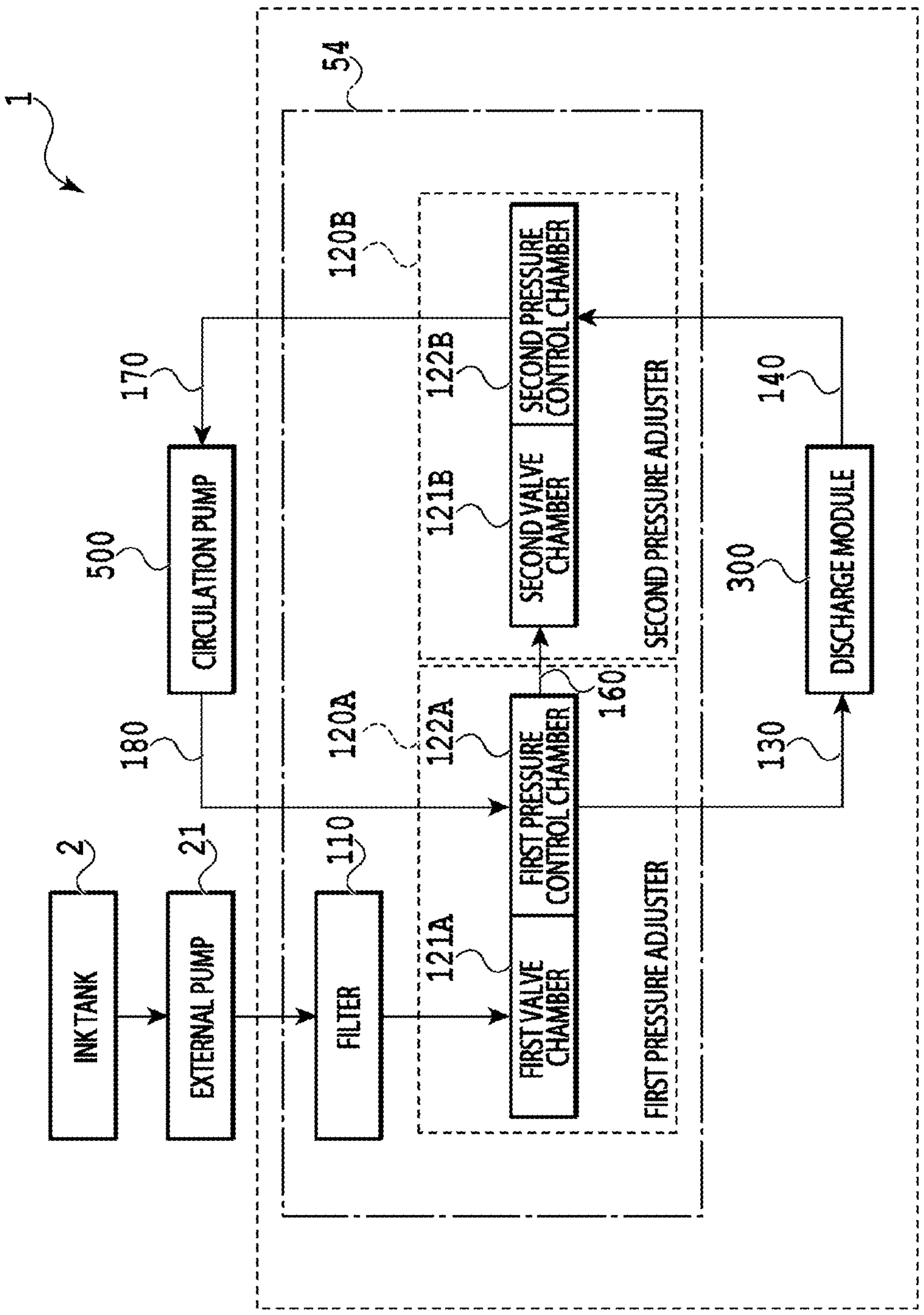
FIG. 41 is a block diagram schematically illustrating a circulation path.

FIG. 41 is a block diagram schematically illustrating a circulation path. FIG. 41 illustrates a configuration in which the circulation pump 500 mounted in the liquid discharge head 1 is installed on the body side of the liquid discharge apparatus 50. In this configuration, part of the pump entrance flow path 170 and the pump exit flow path 180 is disposed outside the liquid discharge head 1.

Figure 42:
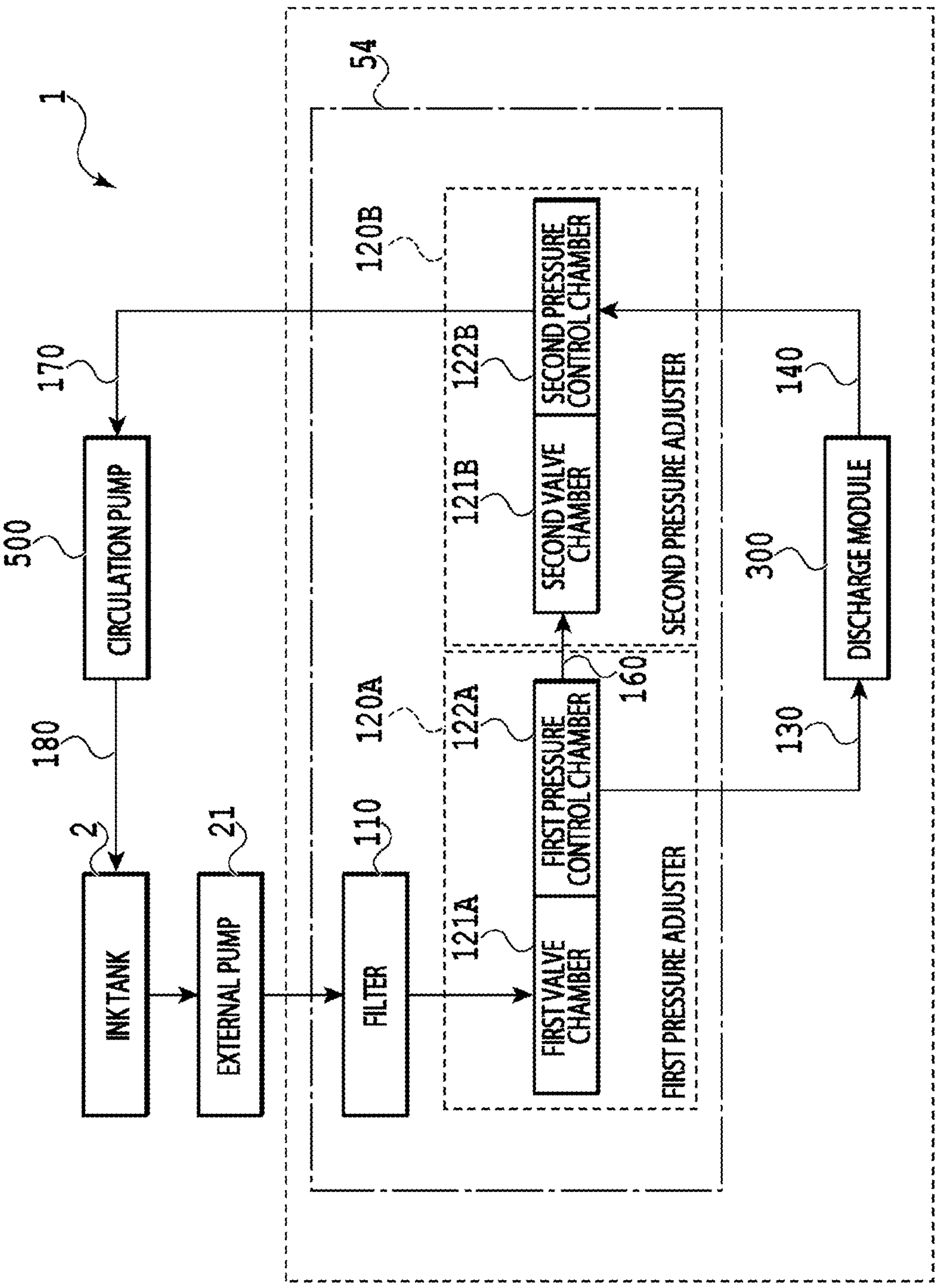
FIG. 42 is a block diagram schematically illustrating a circulation path.

FIG. 42 is a block diagram schematically illustrating a circulation path. FIG. 42 illustrates a configuration in which the circulation pump 500 mounted in the liquid discharge head 1 is installed on the body side of the liquid discharge apparatus 50 and the pump exit flow path 180 is connected to the ink tank 2.

In any of the configurations illustrated in FIGS. 40 to 42, similarly to a configuration described so far, discharge stability can be improved. Moreover, Configurations (1) to (4) for shortening the first print out time are applicable to any of the configurations illustrated in FIGS. 40 to 42.

Fifth Modification

Figure 43:
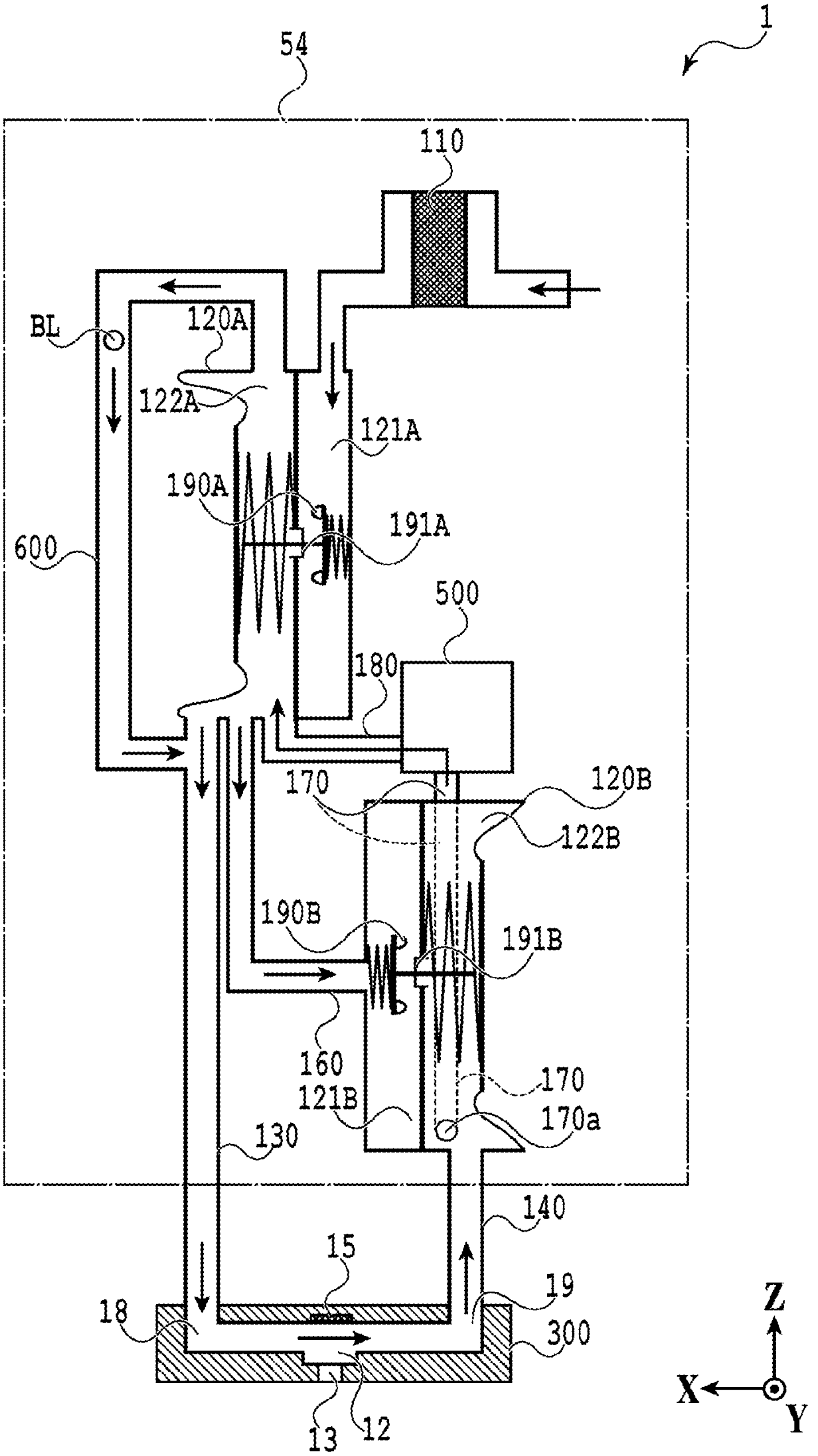
FIG. 43 is a diagram schematically illustrating a circulation path.

FIG. 43 is a diagram schematically illustrating a circulation path in a fifth modification. The fifth modification is a form in which a second supply flow path 600 providing communication between the first pressure control chamber 122A in the first pressure adjuster 120A and the supply flow path 130 is provided.

One end part of the second supply flow path 600 communicates with an upper end part of the first pressure control chamber 122A in the direction of gravity, and the other end part communicates with an upper end part of the supply flow path 130 in the direction of gravity. Since such a second supply flow path 600 is provided, air bubbles having flowed in from the upstream side of the first pressure adjuster 120A or air bubbles generated in a circulation flow path can be efficiently discharged to the outside.

Specifically, the first pressure control chamber 122A of the first pressure adjuster 120A is disposed on the upper side in the direction of gravity in the liquid discharge head 1. With this configuration, air bubbles BL having flowed into the first pressure adjuster 120A together with ink from the upstream side of the liquid discharge head 1 or air bubbles BL having flowed into the first pressure control chamber 122A from the circulation flow path float to an upper part of the first pressure control chamber 122A or an upper part of the second supply flow path 600 and are collected. The collected air bubbles BL do not move to the discharge module 300 for the flow speed of liquid flowing to the supply flow path 130 and the second supply flow path 600 in ink discharge operation.

The air bubbles BL collected to the upper parts of the first pressure control chamber 122A and the second supply flow path 600 can be discharged together with ink by performing suction processing of forcibly sucking ink from the discharge port in a state in which liquid discharge operation is not performed. The suction processing is performed by disposing a cap member in close contact with the discharge port surface of the liquid discharge head 1 at which the discharge port is formed and by applying, to the discharge port, negative pressure of a negative pressure source connected to the cap member so that ink is forcibly sucked from the discharge port. The speed of ink flow generated in the flow path at the suction is higher than the speed of ink flow generated by normal ink discharge operation. Accordingly, the air bubbles BL collected to the upper parts of the first pressure control chamber 122A and the second supply flow path 600 reach the pressure chamber 12 through the second supply flow path 600 and the supply flow path 130 together with ink, and thereafter, are discharged from the discharge port 13 together with ink. The suction processing is typically executed, for example, in suction recovery processing performed to recover discharge performance by discharging, from the discharge port, thickened ink, or the like, generated at the discharge port, the pressure chamber, or the like, or in initial filling processing of filling the flow path with ink.

In this manner, since the second supply flow path is formed, air bubbles mixed in ink in the liquid discharge head 1 can be collected and discharged all at once by the suction processing, and thus air bubble discharge processing can be efficiently performed. Moreover, Configurations (1) to (4) for shortening the first print out time are applicable to the fifth modification.

Sixth Modification

The liquid discharge head 1 illustrated in FIG. 1A is, for example, what is called a serial-type liquid discharge head configured to discharge ink while moving in the main scanning direction, but is not limited thereto. The liquid discharge head 1 may be what is called a full-line-type liquid discharge head formed with discharge ports across the width of the print media M and capable of discharging ink on the entire range of the print media M in the width direction without movement in the main scanning direction.

Seventh Modification

In the above description, the circulation pump 500 is provided inside the circulation unit 54. However, the circulation pump 500 may be provided outside the circulation unit 54.

Other Embodiments

In the above-described embodiments, the liquid discharge head is constituted by combining circulation units, circulation pumps, and discharge modules, but another device or apparatus may be constituted by combining circulation units with another unit including pressure chambers.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

What is claimed is:

1. A circulation unit comprising:

a first pressure adjuster for adjusting pressure of a liquid, the first pressure adjuster including a first valve chamber, a first pressure control chamber, a first communication port, a first valve, a first flexible member, and a first pressure plate, the first communication port providing communication between the first valve chamber and the first pressure control chamber, the first valve being configured to open and to close the first communication port, the first flexible member serving as a surface of the first pressure control chamber and being displaceable, the first pressure plate serving as another surface of the first pressure control chamber and being displaceable in coordination with the first flexible member;

a second pressure adjuster for adjusting pressure of a liquid, the second pressure adjuster including a second valve chamber, a second pressure control chamber, a second communication port, a second valve, a second flexible member, and a second pressure plate, the second communication port providing communication between the second valve chamber and the second pressure control chamber, the second valve being configured to open and to close the second communication port, the second flexible member serving as a surface of the second pressure control chamber and being displaceable, the second pressure plate serving as another surface of the second pressure control chamber and being displaceable in coordination with the second flexible member;

an inflow flow path providing communication between an entrance and the first valve chamber;

a first flow path providing communication between a pressure chamber and the first pressure control chamber;

a second flow path providing communication between the pressure chamber and the second pressure control chamber;

a third flow path providing communication between the second pressure control chamber and a circulation pump for circulating liquid;

a fourth flow path providing communication between the circulation pump and the first pressure control chamber; and a bypass flow path providing communication between the first pressure control chamber and the second valve chamber, wherein the first valve is in an opened state in a case where pressure in the first pressure control chamber is lower than PX, the first valve is in a closed state in a case when pressure in the first pressure control chamber is equal to or higher than PX, the second pressure plate and the second valve are in a contact state in a case when pressure in the second pressure control chamber is lower than PY, the second pressure plate and the second valve are in a non-contact state in a case when pressure in the second pressure control chamber is equal to or higher than PY, and PX and PY satisfy a relation:

$$PX - PY < |\Delta P|$$

where $|\Delta P|$ is an upper limit value of PX−PY, which is equal to or greater than zero and with which the second pressure plate and the second valve switch from a non-contact state to a contact state before a differential pressure between the first pressure control chamber and the second pressure control chamber reaches a differential pressure necessary for starting printing after operation of the circulation pump being stopped is resumed.

2. The circulation unit according to claim 1, wherein PX and PY satisfy a relation:

$$PX - PY < 0.$$

3. The circulation unit according to claim 1, wherein the second valve is in an opened state in a case when pressure in the second pressure control chamber is lower than PZ, the second valve is in a closed state in a case when pressure in the second pressure control chamber is equal to or higher than PZ, and PX and PY further satisfy a relation:

$$PZ < PX.$$

4. The circulation unit according to claim 1, wherein pressure in the first pressure control chamber and pressure in the second pressure control chamber are PX in a standby state in which discharge of liquid from a discharge port communicating with the pressure chamber is stopped and the circulation pump is stopped.

5. The circulation unit according to claim 1, wherein the first pressure adjuster further includes a first pressure adjustment pressing member that presses the first pressure plate in a direction in which the capacity of the first pressure control chamber increases, and a first valve pressing member that presses the first valve in a closing direction and presses the first pressure plate in the direction in which the capacity of the first pressure control chamber increases when the first pressure plate and the first valve are in a contact state, the second pressure adjuster further includes a second pressure adjustment pressing member that presses the second pressure plate in a direction in which the capacity of the second pressure control chamber increases, and a second valve pressing member that presses the second valve in a closing direction and presses the second pressure plate in the direction in which the capacity of the second pressure control chamber increases when the second pressure plate and the second valve are in a contact state, the first valve includes a first elastic member for blocking the first communication port in a closed state, and the second valve includes a second elastic member for blocking the second communication port in a closed state.

6. The circulation unit according to claim 5, wherein a pressing force characteristic of at least one of the first pressure adjustment pressing member, the first valve pressing member, the first elastic member, the second pressure adjustment pressing member, the second valve pressing member, and the second elastic member is adjusted so that PX and PY satisfy a relation:

$$PX - PY < |\Delta P|.$$

7. The circulation unit according to claim 5, wherein a pressing force characteristic of at least one of the first pressure adjustment pressing member, the first valve pressing member, the first elastic member, the second pressure adjustment pressing member, the second valve pressing member, and the second elastic member is adjusted so that PX and PY satisfy a relation:

$$PX - PY < 0.$$

8. The circulation unit according to claim 5, wherein the second valve is in an opened state in a case when pressure in the second pressure control chamber is lower than PZ, the second valve is in a closed state in a case when pressure in the second pressure control chamber is equal to or higher than PZ, and a pressing force characteristic of at least one of the first pressure adjustment pressing member, the first valve pressing member, the first elastic member, the second pressure adjustment pressing member, the second valve pressing member, and the second elastic member is adjusted so that PX and PZ satisfy a relation:

$$PZ < PX.$$

9. The circulation unit according to claim 5, wherein the amount of deformation of the second elastic member by pressing force of the second valve pressing member when the second pressure plate and the second valve are in a non-contact state is equal to or less than the amount of deformation of the first elastic member by pressing force of the first valve pressing member when the first pressure plate and the first valve are in a non-contact state.

10. The circulation unit according to claim 5, wherein a pressing force of the second valve pressing member is stronger than a pressing force of the first valve pressing member.

11. The circulation unit according to claim 5, wherein the spring constant of the second valve pressing member is greater than the spring constant of the first valve pressing member.

12. The circulation unit according to claim 5, wherein the first valve and the first valve pressing member are disposed in the first pressure control chamber, and the first valve has such a lever structure that displacement of the first elastic member is less than displacement of the first pressure plate.

13. The circulation unit according to claim 5, wherein the second valve and the second valve pressing member are disposed in the second pressure control chamber, and the second valve has such a lever structure that displacement of a part where the second elastic member is disposed is less than displacement of the second pressure plate.

14. A circulation unit comprising:

a first pressure adjuster for adjusting pressure of a liquid, the first pressure adjuster including a first valve chamber, a first pressure control chamber, a first communication port, a first valve, a first flexible member, and a first pressure plate, the first communication port providing communication between the first valve chamber and the first pressure control chamber, the first valve being configured to open and to close the first communication port, the first flexible member serving as a surface of the first pressure control chamber and being displaceable, the first pressure plate serving as another surface of the first pressure control chamber and being displaceable in coordination with the first flexible member;

a second pressure adjuster for adjusting pressure of a liquid, the second pressure adjuster including a second valve chamber, a second pressure control chamber, a second communication port, a second valve, a second flexible member, and a second pressure plate, the second communication port providing communication between the second valve chamber and the second pressure control chamber, the second valve being configured to open and to close the second communication port, the second flexible member serving as a surface of the second pressure control chamber and being displaceable, the second pressure plate serving as another surface of the second pressure control chamber and being displaceable in coordination with the second flexible member;

an inflow flow path providing communication between an entrance and the first valve chamber;

a first flow path providing communication between a pressure chamber and the first pressure control chamber;

a second flow path providing communication between the pressure chamber and the second pressure control chamber;

a third flow path providing communication between the second pressure control chamber and a circulation pump for circulating liquid;

a fourth flow path providing communication between the circulation pump and the first pressure control chamber; and a bypass flow path providing communication between the first pressure control chamber and the second valve chamber, wherein the first valve is in a closed state and the second pressure plate and the second valve are in a non-contact state in a standby state in which discharge of liquid from a discharge port communicating with the pressure chamber is stopped and the circulation pump is stopped, and the second pressure plate and the second valve switch from a non-contact state to a contact state halfway through a duration until a differential pressure between the first pressure control chamber and the second pressure control chamber reaches a differential pressure necessary for starting printing after operation of the circulation pump being stopped in the standby state is resumed.

15. A circulation unit comprising:

a first pressure adjuster for adjusting pressure of liquid, the first pressure adjuster including a first valve chamber, a first pressure control chamber, a first communication port, a first valve, a first flexible member, and a first pressure plate, the first communication port providing communication between the first valve chamber and the first pressure control chamber, the first valve being configured to open and to close the first communication port, the first flexible member serving as a surface of the first pressure control chamber and being displaceable, the first pressure plate serving as another surface of the first pressure control chamber and being displaceable in coordination with the first flexible member;

a second pressure adjuster for adjusting pressure of liquid, the second pressure adjuster including a second valve chamber, a second pressure control chamber, a second communication port, a second valve, a second flexible member, and a second pressure plate, the second communication port providing communication between the second valve chamber and the second pressure control chamber, the second valve being configured to open and to close the second communication port, the second flexible member serving as a surface of the second pressure control chamber and being displaceable, the second pressure plate serving as another surface of the second pressure control chamber and being displaceable in coordination with the second flexible member;

an inflow flow path providing communication between an entrance and the first valve chamber;

a first flow path providing communication between a pressure chamber and the first pressure control chamber;

a second flow path providing communication between the pressure chamber and the second pressure control chamber;

a third flow path providing communication between the second pressure control chamber and a circulation pump for circulating liquid;

a fourth flow path providing communication between the circulation pump and the first pressure control chamber; and a bypass flow path providing communication between the first pressure control chamber and the second valve chamber, wherein the first valve is in a closed state and the second pressure plate and the second valve are in a contact state in a standby state in which discharge of liquid from a discharge port communicating with the pressure chamber is stopped and the circulation pump is stopped, and the second pressure plate and the second valve are in a contact state in a duration until a differential pressure between the first pressure control chamber and the second pressure control chamber reaches a differential pressure necessary for starting printing after operation of the circulation pump being stopped in the standby state is resumed.

16. A circulation unit comprising:

a pressure adjuster for adjusting pressure of liquid, the pressure adjuster including a valve chamber, a pressure control chamber, a communication port providing communication between the valve chamber and the pressure control chamber, a valve configured to open and to close the communication port, a flexible member serving as a surface of the pressure control chamber and being displaceable, and a pressure plate serving as another surface of the pressure control chamber and being displaceable in coordination with the flexible member;

a collection-distribution unit for supplying liquid back to a pressure chamber, the liquid being collected from the pressure chamber by a circulation pump for circulating liquid;

an inflow flow path providing communication between an entrance and the collection-distribution unit;

a first flow path providing communication between the pressure chamber and the collection-distribution unit;

a second flow path providing communication between the pressure chamber and the pressure control chamber;

a third flow path providing communication between the pressure control chamber and the circulation pump;

a fourth flow path providing communication between the circulation pump and the collection-distribution unit; and a bypass flow path providing communication between the collection-distribution unit and the valve chamber, wherein the pressure plate and the valve are in a non-contact state in a standby state in which discharge of liquid from a discharge port communicating with the pressure chamber is stopped and the circulation pump is stopped, and the pressure plate and the valve switch from a non-contact state to a contact state halfway through a duration until a differential pressure between the collection-distribution unit and the pressure control chamber reaches a differential pressure necessary for starting printing after operation of the circulation pump being stopped in the standby state is resumed.

17. A circulation unit comprising:

a pressure adjuster for adjusting pressure of a liquid, the pressure adjuster including a valve chamber, a pressure control chamber, a communication port providing communication between the valve chamber and the pressure control chamber, a valve configured to open and to close the communication port, a flexible member serving as a surface of the pressure control chamber and being displaceable, and a pressure plate serving as another surface of the pressure control chamber and being displaceable in coordination with the flexible member;

a collection-distribution unit for supplying liquid back to a pressure chamber, the liquid being collected from the pressure chamber by a circulation pump for circulating liquid;

an inflow flow path providing communication between an entrance and the collection-distribution unit;

a first flow path providing communication between the pressure chamber and the collection-distribution unit;

a second flow path providing communication between the pressure chamber and the pressure control chamber;

a third flow path providing communication between the pressure control chamber and the circulation pump;

a fourth flow path providing communication between the circulation pump and the collection-distribution unit; and a bypass flow path providing communication between the collection-distribution unit and the valve chamber, wherein the pressure plate and the valve are in a contact state in a standby state in which discharge of liquid from a discharge port communicating with the pressure chamber is stopped and the circulation pump is stopped, and the pressure plate and the valve are continuously in a contact state in a duration until a differential pressure between the collection-distribution unit and the pressure control chamber reaches a differential pressure necessary for starting printing after operation of the circulation pump being stopped in the standby state is resumed.

18. A liquid discharge head comprising:

a circulation unit; and a discharge module, wherein the circulation unit includes:

a first pressure adjuster for adjusting pressure of a liquid, the first pressure adjuster including a first valve chamber, a first pressure control chamber, a first communication port, a first valve, a first flexible member, and a first pressure plate, the first communication port providing communication between the first valve chamber and the first pressure control chamber, the first valve being configured to open and to close the first communication port, the first flexible member serving as a surface of the first pressure control chamber and being displaceable, the first pressure plate serving as another surface of the first pressure control chamber and being displaceable in coordination with the first flexible member;

a second pressure adjuster for adjusting pressure of a liquid, the second pressure adjuster including a second valve chamber, a second pressure control chamber, a second communication port, a second valve, a second flexible member, and a second pressure plate, the second communication port providing communication between the second valve chamber and the second pressure control chamber, the second valve being configured to open and to close the second communication port, the second flexible member serving as a surface of the second pressure control chamber and being displaceable, the second pressure plate serving as another surface of the second pressure control chamber and being displaceable in coordination with the second flexible member;

an inflow flow path providing communication between an entrance and the first valve chamber;

a first flow path providing communication between a pressure chamber and the first pressure control chamber;

a second flow path providing communication between the pressure chamber and the second pressure control chamber;

a third flow path providing communication between the second pressure control chamber and a circulation pump for circulating liquid;

a fourth flow path providing communication between the circulation pump and the first pressure control chamber; and a bypass flow path providing communication between the first pressure control chamber and the second valve chamber, the first valve is in an opened state in a case when pressure in the first pressure control chamber is lower than PX, the first valve is in a closed state in a case when pressure in the first pressure control chamber is equal to or higher than PX, the second pressure plate and the second valve are in a contact state in a case when pressure in the second pressure control chamber is lower than PY, the second pressure plate and the second valve are in a non-contact state in a case when pressure in the second pressure control chamber is equal to or higher than PY, and PX and PY satisfy a relation:

$$PX - PY < |\Delta P|$$

where $|\Delta P|$ is an upper limit value of PX−PY, which is equal to or greater than zero and with which the second pressure plate and the second valve switch from a non-contact state to a contact state before a differential pressure between the first pressure control chamber and the second pressure control chamber reaches a differential pressure necessary for starting printing after operation of the circulation pump being stopped is resumed, and the discharge module includes a discharge port for discharging a liquid;

the pressure chamber communicating with the discharge port; and a discharge element for discharging liquid from the discharge port through the pressure chamber.

19. The liquid discharge head according to claim 18, wherein the circulation pump is installed inside the circulation unit.

20. A liquid discharge apparatus comprising:

the liquid discharge head according to claim 18;

a carriage for scanning the liquid discharge head in a main scanning direction; and a conveyance unit configured to convey a print media in a sub scanning direction.

* * * * *